(12) United States Patent
Sharp et al.

(10) Patent No.: US 11,513,998 B2
(45) Date of Patent: *Nov. 29, 2022

(54) NARROWING INFORMATION SEARCH RESULTS FOR PRESENTATION TO A USER

(71) Applicant: Highspot, Inc., Seattle, WA (US)

(72) Inventors: Oliver Sharp, Seattle, WA (US); David Wortendyke, Seattle, WA (US); Scot Gellock, Seattle, WA (US); Robert Wahbe, Seattle, WA (US)

(73) Assignee: Highspot, Inc., Seattle, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/157,807

(22) Filed: Jan. 25, 2021

(65) Prior Publication Data
US 2021/0149840 A1 May 20, 2021

Related U.S. Application Data

(63) Continuation of application No. 16/039,937, filed on Jul. 19, 2018, now Pat. No. 10,909,075, which is a
(Continued)

(51) Int. Cl.
*G06F 16/00* (2019.01)
*G06F 16/14* (2019.01)

(52) U.S. Cl.
CPC .................... *G06F 16/14* (2019.01)

(58) Field of Classification Search
CPC ........... G06F 16/24578; G06F 16/9535; G06F 21/604; G06F 16/00; G06F 16/22;
(Continued)

(56) References Cited

U.S. PATENT DOCUMENTS 6,751,600 B1 6/2004 Wolin
7,814,425 B1 10/2010 O'Shaugnessy
(Continued)

FOREIGN PATENT DOCUMENTS

JP 2012185780 A 9/2012

OTHER PUBLICATIONS

International Search Report and Written Opinion for International Application No. PCT/US2013/076962, dated Apr. 22, 2014, 11 pages.
(Continued)

*Primary Examiner* — Shyue Jiunn Hwa
(74) *Attorney, Agent, or Firm* — Perkins Coie LLP

(57) ABSTRACT

The disclosed technology provides systems and methods for filtering information based on a set of properties. The information consists of a set of items that the user is interacting with, such as documents, presentations, audio and video files, and the like. The properties can be specified by the user (by, for example, putting a set of items in lists and folders), based on actions taken by users in the system (such as commenting on, or liking, or viewing an item), or can represent a variety of other characteristics. Related properties can also be grouped together. Furthermore, the disclosed techniques provide mechanisms for automatically identifying useful properties and providing an indication of those useful properties to a user to use in narrowing results.

20 Claims, 40 Drawing Sheets

Related U.S. Application Data continuation of application No. 14/658,062, filed on Mar. 13, 2015, now Pat. No. 10,055,418.

(60) Provisional application No. 61/953,258, filed on Mar. 14, 2014.

(58) Field of Classification Search
CPC ........... G06F 16/2425; G06F 16/24542; G06F 16/258; G06F 16/27; G06F 16/335; G06F 16/35; G06F 16/353; G06F 16/9024; G06F 16/90348; G06F 16/95; G06F 16/951; G06F 21/31; G06F 21/33; G06F 21/6209; G06F 21/6218; G06F 21/6245; G06F 21/6272; G06F 21/629; G06F 2221/2111; G06F 9/06; G06F 16/248; G06F 2221/2141; G06F 16/11; G06F 16/144; G06F 16/168; G06F 16/245; G06F 16/252; G06F 16/256; G06F 16/285; G06F 16/3325; G06F 16/3329; G06F 16/3338; G06F 16/337; G06F 16/338; G06F 16/38; G06F 16/4387; G06F 16/48; G06F 16/73; G06F 16/78; G06F 16/9537; G06F 21/6227; G06F 2221/2117; G06F 2221/2143; G06F 2221/2145; G06F 2221/2151; G06F 3/0482; G06F 40/284; G06F 40/295; G06F 7/24

See application file for complete search history.

(56) References Cited

U.S. PATENT DOCUMENTS

| | | |
|---|---|---|
| 7,970,721 B2 | 6/2011 | Leskovec et al. |
| 8,014,634 B1 | 9/2011 | Chan |
| 8,402,375 B1 | 3/2013 | Skare |
| 8,447,760 B1 | 5/2013 | Tong |
| 8,510,313 B2 | 8/2013 | Vaughan |
| 8,554,601 B1 | 10/2013 | Marsh |
| 8,655,709 B2 | 2/2014 | Kumaran |
| 8,872,804 B2 | 10/2014 | Cummings |
| 9,727,618 B2 | 8/2017 | Sharp |
| 9,984,310 B2 | 5/2018 | Hoffman |
| 10,726,297 B2 | 7/2020 | Hoffman |
| 10,909,075 B2 | 2/2021 | Sharp |
| 2002/0091991 A1 | 7/2002 | Castro |
| 2004/0267700 A1 | 12/2004 | Dumais |
| 2005/0267799 A1 | 12/2005 | Chan et al. |
| 2006/0085427 A1 | 4/2006 | D'Urso |
| 2006/0129538 A1 | 6/2006 | Baader et al. |
| 2006/0248045 A1 | 11/2006 | Toledano |
| 2007/0033517 A1 | 2/2007 | O'Shaugnessy |
| 2007/0079384 A1 | 4/2007 | Grinstein |
| 2007/0088583 A1 | 4/2007 | Chen |
| 2007/0088820 A1 | 4/2007 | Kwak |
| 2007/0150515 A1 | 6/2007 | Brave et al. |
| 2007/0240203 A1* | 10/2007 | Beck .................. G16H 10/60 726/4 |
| 2008/0140684 A1 | 6/2008 | O'Reilly |
| 2008/0154873 A1 | 6/2008 | Redlich |
| 2008/0306954 A1 | 12/2008 | Hornqvist |
| 2008/0313716 A1 | 12/2008 | Park |
| 2009/0019026 A1 | 1/2009 | Valdes-Perez et al. |
| 2009/0063475 A1 | 3/2009 | Pendse |
| 2009/0106697 A1 | 4/2009 | Ward |
| 2009/0164431 A1 | 6/2009 | Zivkovic et al. |
| 2009/0178144 A1 | 7/2009 | Redlich |
| 2009/0222551 A1 | 9/2009 | Neely |
| 2010/0070488 A1 | 3/2010 | Sylvain |
| 2010/0076274 A1 | 3/2010 | Severson |
| 2010/0082622 A1 | 4/2010 | Irie |
| 2010/0146593 A1 | 6/2010 | Stahl |
| 2010/0198869 A1 | 8/2010 | Kalaboukis et al. |
| 2010/0235351 A1 | 9/2010 | Iwasa et al. |
| 2010/0250556 A1 | 9/2010 | Park |
| 2010/0281389 A1 | 11/2010 | Hutchinson |
| 2011/0107260 A1 | 5/2011 | Park |
| 2011/0161362 A1 | 6/2011 | Lipscombe |
| 2011/0191679 A1 | 8/2011 | Lin |
| 2011/0225153 A1 | 9/2011 | Haseyama |
| 2011/0238754 A1 | 9/2011 | Dasilva |
| 2011/0251875 A1 | 10/2011 | Cosman |
| 2012/0001919 A1* | 1/2012 | Lumer ................... G06F 16/35 345/440 |
| 2012/0066645 A1 | 3/2012 | Laurie |
| 2012/0117475 A1 | 5/2012 | Lee |
| 2012/0131495 A1 | 5/2012 | Goossens |
| 2012/0143859 A1 | 6/2012 | Lymperopoulos et al. |
| 2012/0143880 A1 | 6/2012 | Sweeney |
| 2012/0158751 A1 | 6/2012 | Tseng |
| 2012/0191715 A1 | 7/2012 | Ruffner |
| 2012/0197855 A1 | 8/2012 | Chen |
| 2012/0271819 A1 | 10/2012 | Qiu et al. |
| 2012/0278761 A1 | 10/2012 | John |
| 2012/0278329 A1 | 11/2012 | Borggaard et al. |
| 2012/0290565 A1 | 11/2012 | Wana |
| 2012/0290614 A1 | 11/2012 | Nandakumar et al. |
| 2012/0310926 A1 | 12/2012 | Gannu et al. |
| 2012/0313948 A1 | 12/2012 | Bergman et al. |
| 2013/0036114 A1 | 2/2013 | Wong et al. |
| 2013/0054583 A1 | 2/2013 | Macklem et al. |
| 2013/0110813 A1 | 5/2013 | Holm et al. |
| 2013/0124653 A1 | 5/2013 | Vick |
| 2013/0218923 A1 | 8/2013 | Kaul et al. |
| 2013/0226995 A1 | 8/2013 | Etheredge |
| 2013/0254280 A1 | 9/2013 | Yang et al. |
| 2013/0262588 A1 | 10/2013 | Barak et al. |
| 2013/0268479 A1 | 10/2013 | Andler |
| 2013/0297582 A1 | 11/2013 | Zukovsky |
| 2013/0297590 A1 | 11/2013 | Zukovsky |
| 2013/0325858 A1 | 12/2013 | Xu |
| 2014/0006399 A1 | 1/2014 | Vasudevan |
| 2014/0019497 A1 | 1/2014 | Cidon et al. |
| 2014/0040246 A1 | 2/2014 | Rubinstein et al. |
| 2014/0089048 A1 | 3/2014 | Bruich |
| 2014/0089402 A1 | 3/2014 | Liyanage |
| 2014/0164338 A1 | 6/2014 | Hickman et al. |
| 2014/0181204 A1 | 6/2014 | Sharp |
| 2014/0189516 A1 | 7/2014 | Guo |
| 2014/0280629 A1 | 9/2014 | Rubinstein et al. |
| 2014/0359424 A1 | 12/2014 | Lin |
| 2015/0046528 A1* | 2/2015 | Piepgrass ............... G06Q 50/01 709/204 |
| 2015/0177933 A1 | 6/2015 | Cueto |
| 2015/0213204 A1 | 7/2015 | Bose |
| 2016/0042253 A1 | 2/2016 | Sawhney |
| 2016/0162591 A1 | 6/2016 | Dokania |
| 2016/0196336 A1 | 7/2016 | Allen et al. |
| 2016/0231884 A1 | 8/2016 | Plakhov et al. |
| 2018/0293306 A1 | 10/2018 | Park |
| 2020/0334496 A1 | 10/2020 | Hoffman |

OTHER PUBLICATIONS

International Search Report and Written Opinion for International Application No. PCT/US2014029505, dated Jul. 7, 2014, 11 pages.
Screenshot of main page of Speaker Deck website. Taken Dec. 10, 2014 https://speakerdeck.com/.
Screenshot of Frequently Asked Questions page of Speaker Deck website. Taken Dec. 10, 2014 https://speakerdeck.com/faq#file_types.

* cited by examiner

*FIG. 9B* highspot ⊙ Spots & People [vpn] 🔍 SEARCH [Add] 👤 Oliver

⌂ 〉 Juniper Case Studies 〉 "vpn" | Share Spot | Nexus Path
All Items | Follow Spot ●

Search Results For — 1800
- ⊙ Juniper Case Studies (31)
- 🏛 Nexus Path (35)
- ○ Stops
- 👤 People    [More]

Narrow By
- 📁 Country
  - ☐ United States (13)
  - ☐ China (6)
  - ☐ South Korea (6)
  - ☐ Canada (2)
  - ☐ Singapore (2)
  - ☐ Taiwan (2)
  - ☐ The Netherlands (2)
  - ☐ Australia (1)
  - ☐ Japan (1)
  - ☐ Thailand (1)
- 📁 Enterprise
  - ☐ Education and Research (9)

Showing 31 results

— 1810
Daewoo Engineering and Construction Deploy's Korea's Largest SSL VPN
E&C decided to implement an SSL VPN for its ?simplicity and security.? Lee said. An SSL VPN leverages a Secure Sockets Layer (SSL), a common protocol supported by all
Product: VPN Appliance | Country: South Korea | Enterprise: Construction — 1820
Juniper Networks Enables Secure Remote Access For the Thai Technology Institute
to go with the Web version of a VPN?an SSL VPN solution?since most of the users would have a Web browser. Besides providing secure remote access, another challenge
Country: Thailand | Enterprise: Education and Research | Product: Secure Services Gateway | Product: VPN Appliance | Product: routers | Product: Integrated Services Gateway

*FIG. 18*

NARROWING INFORMATION SEARCH RESULTS FOR PRESENTATION TO A USER

RELATED APPLICATIONS

This application is a continuation of U.S. patent application Ser. No. 16/039,937, filed on Jul. 19, 2018, entitled "NARROWING INFORMATION SEARCH RESULTS FOR PRESENTATION TO A USER," which is a continuation of U.S. patent application Ser. No. 14/658,062, filed on Mar. 13, 2015, entitled "NARROWING INFORMATION SEARCH RESULTS FOR PRESENTATION TO A USER," which claims the benefit of U.S. Provisional Patent Application No. 61/953,258, filed on Mar. 14, 2014, entitled "NARROWING INFORMATION SEARCH RESULTS FOR PRESENTATION TO A USER," each of which are herein incorporated by reference in its entirety.

This application is related to U.S. patent application Ser. No. 14/136,322 filed on Dec. 20, 2013, entitled "INTEREST GRAPH-POWERED SEARCH,"; U.S. Patent Provisional Application No. 61/745,365 filed on Dec. 21, 2012, entitled "INTEREST GRAPH-POWERED SEARCH," U.S. Provisional Patent Application No. 61/800,042, filed Mar. 15, 2013, entitled "INTEREST GRAPH-POWERED FEED,"; U.S. Provisional Patent Application No. 61/800,322, filed Mar. 15, 2013, entitled "INTEREST GRAPH-POWERED BROWSING,"; U.S. Provisional Patent Application No. 61/800,497, filed Mar. 15, 2013, entitled "INTEREST GRAPH-POWERED SHARING,"; and U.S. Provisional Patent Application No. 61/914,266, filed Dec. 10, 2013, entitled "SKIM PREVIEW,"; each of which is herein incorporated by reference in its entirety.

BACKGROUND

Currently, internal networks within organizations do not automatically find the information or data (e.g., business information) that employees need to do their jobs and present it for discovery. Intranet services do not gather information about users, search through information available across the company, and find the most relevant documents and other business information. Users must seek out the information they need and are often left unaware of highly relevant information that they could benefit from.

The need exists for a system that learns about the interests of each employee and identifies the most compelling and relevant information that is accessible to them (from within the company and from outside it).

Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 1B is a display screen showing search results.

FIGS. 2A and 2B are display screens showing an ability for user-specified groupings of information.

FIG. 3 is a display screen showing the following of spots or people.

FIG. 5 is a display screen showing types of display documents.

FIG. 6 is a display screen showing items viewed, commented on, etc.

FIG. 8 is a display screen showing presentation of a search box to a user.

FIGS. 9A and 9B are display screens showing how the system may handle multiple properties being shown to a user.

FIG. 18 is a display page illustrating a query and results page.

DETAILED DESCRIPTION

A. Overview

Figure 1A:
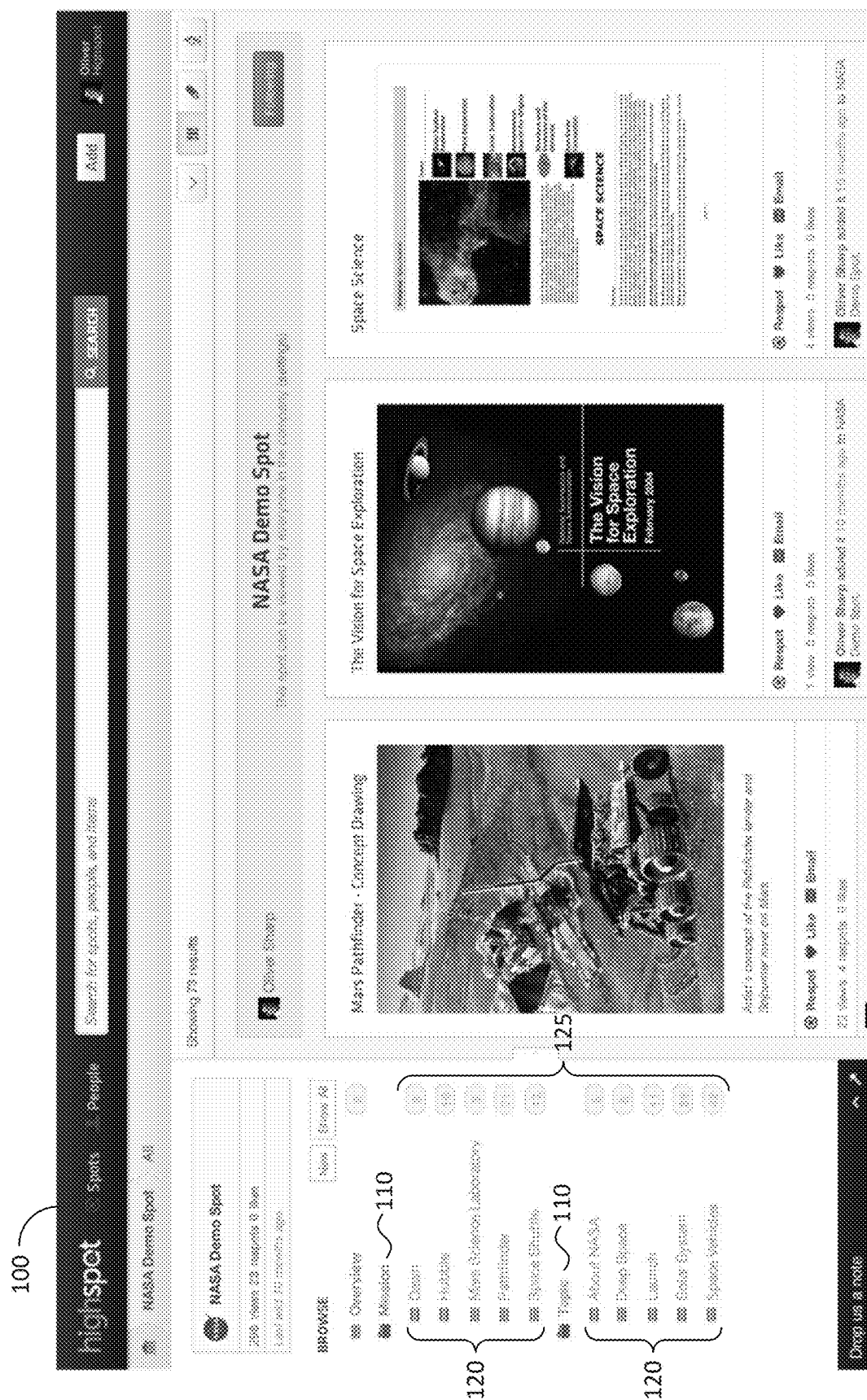
FIG. 1A is a display page illustrating an example of a collection of information or a "spot" for display to a user.

A narrow-by facility providing system, methods, and mechanism for filtering information based on a set of properties is described below, and referred to at times as narrow-by. The information consists of a set of items that the user is interacting with, such as documents, presentations, audio and video files, and the like. The properties can be specified by the user (by, for example, putting a set of items in lists and folders), based on actions taken by users in the system (such as commenting on, or liking, or viewing an item), or they can represent a variety of other characteristics. Related properties can also be grouped together. Furthermore, the disclosed techniques provide mechanisms for automatically identifying useful properties and providing an indication of those useful properties to a user to use in narrowing results.

When any set of items is being presented, the system may automatically compute which properties are useful for narrowing it down. These useful properties are presented to the user, who can select from among them. The system also informs the user how many items will remain if any option is selected. Upon selection by the user, the result set is then narrowed down to just those items that match. This is a fast way to reduce a set of items to the ones that the user wishes to see or act upon. Narrow-by can be used to help users perform a variety of applications, including searching, browsing, and managing sets of items.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may be emphasized below; however, any terminology intended to be interpreted in any restricted manner will be overtly and specifically defined as such in this Detailed Description section.

In general, narrow-by is a technique for reducing a set of items, representing business information, to ones that a user wishes to see or to act upon. The described system takes an item set and, based on various properties of those items, presents properties that are useful for narrowing down the set. The system computes a number of items that will be available if any of those properties are selected. The resulting list of properties is presented to the user, who can optionally select properties to refine the set of results.

A goal of narrow-by is to reduce the full result set. A particular property is deemed to be "useful" in this context if it applies to a non-zero proper subset of the current result set—in other words, it applies to more than zero of the items but fewer than the total number of items. In some embodiments, a property may be determined to be useful if it applies to more than zero items but fewer than some predetermined threshold number or percentage of the total number of items, such as 1000 items, 10,000 items, 75% of the total number of items, 99% of the total number of items, and so on. When the user selects such a property, indicating that only items with that property should be shown, the number of items in the result set will be reduced, but not to zero.

Narrow-by is a powerful tool for viewing and managing business information. For example, FIG. 1A shows a NASA spot 100, i.e., a collection of information items related to space exploration. A spot is the name used herein for a collection of items, typically related to one another. This particular spot is organized using item folders 110 (such as "Mission") and item lists 120 (such as "Pathfinder"). Items in the spot can be placed into lists so that any particular item may be in zero, one, or many item lists at the same time. An item list may be grouped with others in an item folder, or it can be stand-alone (as shown in the example, with the list "Overview"). Such stand-alone lists are called top-level lists.

Figure 1B:
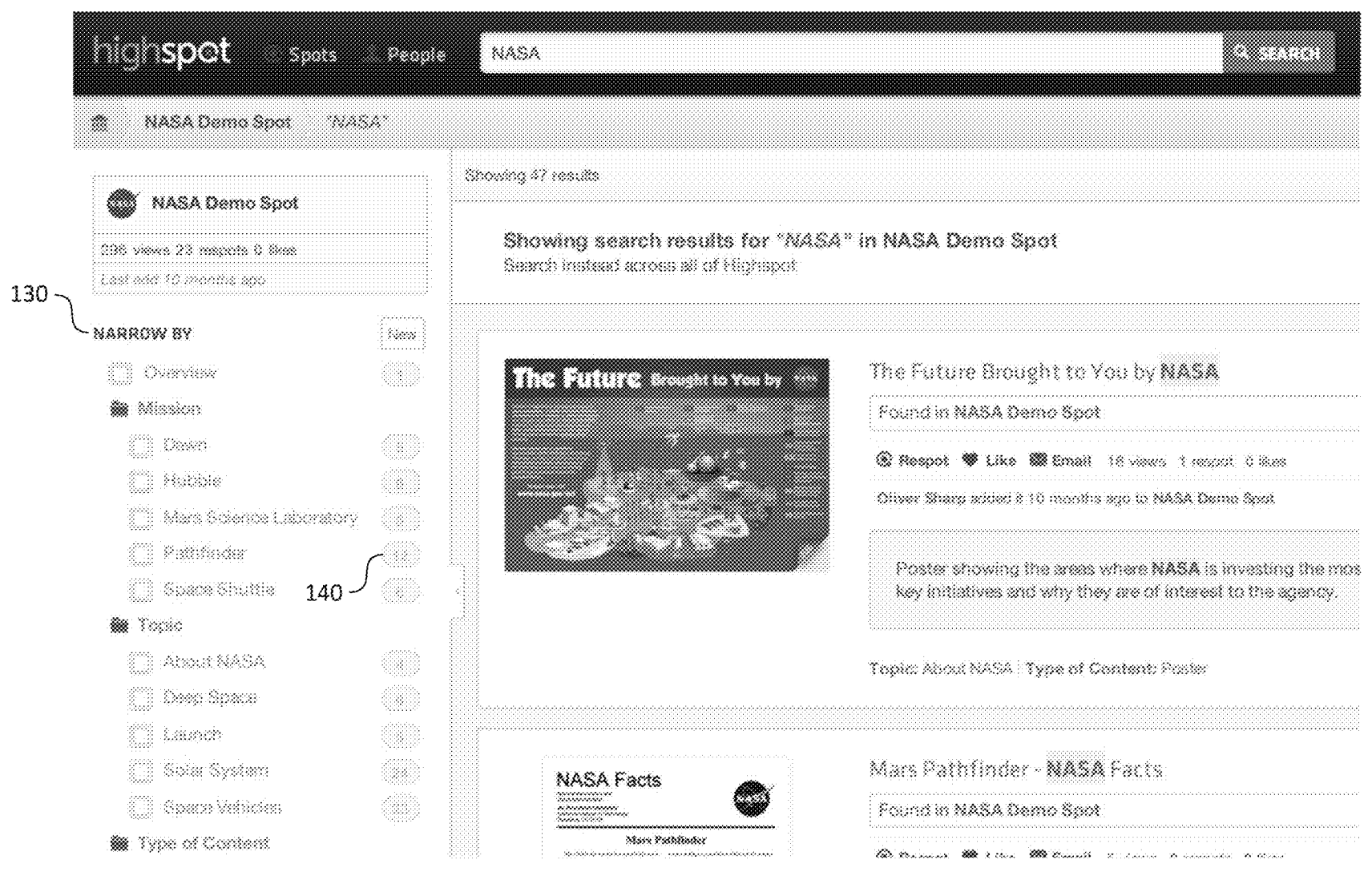

FIG. 1B shows results of searching for the word "NASA" in this spot. The narrow-by area 130 of the screen is called out. The search yielded 47 results across the spot. Because those items have been put in a variety of item lists and item folders, the system determines that the result set can be narrowed down. For example, it shows that 12 of the 47 results are in the item list "Pathfinder."

Figure 1C:
FIG. 1C is a display screen showing narrowing of search results.

FIG. 1C shows what happens when the user clicks on the checkbox 150 next to the Pathfinder list: the result set has been narrowed to only the 12 items in that list. Note that the result set can be further adjusted by using narrow-by. Eight of the 12 items are also in the "Space Vehicles" list 160, in the "Topic" folder 170. Clicking on that box would further restrict the result set to the eight. Alternatively, another option can be chosen from the "Mission" folder, such as "Hubble." In that case, the system will add the six results that are in the "Hubble" list, indicated by the "+6" count next to that list.

This model may be called "ANDs of ORs," meaning that results will be shown that are in any of the chosen lists within a folder (the logical OR of list membership within a folder) but must be in one of the lists selected in every folder (the logical AND of folder membership). It is possible to use alternative models, such as "ANDs of ANDs," meaning that an item only appears if it is in every list that the user selects. If two lists in a folder are chosen, the item will appear if it is in both of them, rather than in either of them, as is true for the "ANDs of ORs" model.

Note also in FIG. 1C that lists like "Deep Space" in the "Topic" folder have been grayed out and do not show a number. That is because there are no items from the result set in those lists. The system may keep them visible, because it can be jarring for users to have lists and folders moving around and popping in and out of visibility as checkboxes are selected, but it also indicates that they are no longer useful with the restricted result set that is currently being displayed.

B. Properties

A variety of types of properties can be used to narrow down a set of items. Properties can stand on their own or can be grouped together. For the purpose of the explanation below, the word property list refers to items that have a particular property. When properties are grouped together, the group is a property folder. For any particular result set, the system considers the property lists that correspond to properties held by one or more of those items.

These are the types of properties supported in the system:

1. User-Defined Properties

The system may allow users to use item lists, which can further be organized into folders 110 of lists as shown in, for example, FIGS. 1A-1C. Users can place items into zero, one, or many item lists. An item about the Mars Pathfinder mission can be placed in the "Pathfinder" list in the "Mission" folder, the "Solar System" list in the "Topic" folder, and so forth.

When items are placed in an item list, the system represents that by associating a property with each of those items. Hence, the property list of items containing that property corresponds exactly to the item list. Similarly, if item lists are grouped into item folders, the system groups the corresponding property lists into a property folder.

Item lists and item folders can be created by the user or by another user, or they can be predefined by the system. For example, a collection of case studies might be organized using a "Country" folder, containing a list of names of all the countries in the world.

Lists and folders are only one type of property that users can define. Items are also added to particular collections (i.e., "spots") and can be associated with different authors. In general, users can attach a wide variety of metadata properties to an item, which can consist of strings (like the name of the author), numbers (like a date), colors (as in priority), status (whether an item has been modified), comments, and the like.

2. User-Defined Properties of Groupings

Figure 2A:
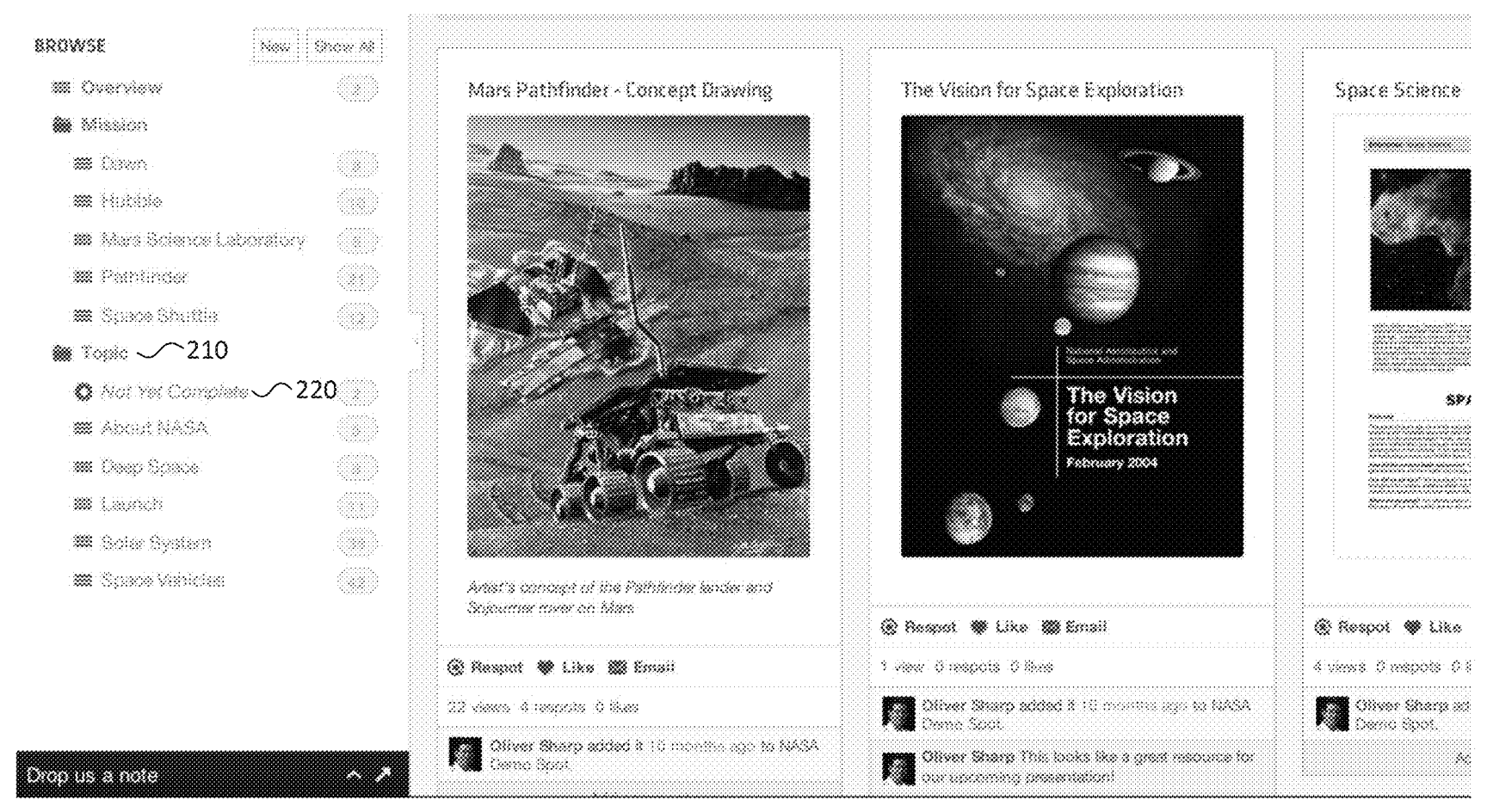
Figure 2B:

The system may allow the user to specify properties for certain groupings, which then are presented in narrow-by view. For example, in FIG. 2A, a user has specified that the "Topic" folder 210 should be complete. This is an assertion that every item in the spot should appear in at least one of the item lists of the "complete" folder (e.g., "Topic" in this example). If an item is not in any list in that folder, the folder is not yet complete, and the system presents those items to the user in a special system-created list called "Not Yet Complete" 220. When the user has put every item in one or more lists in that folder, the "Not Yet Complete" list 220 becomes empty and will not be displayed. In FIG. 2A, this folder is missing two items. FIG. 2B shows what happens when that system list is selected: the two missing items 230 and 240 are displayed on the right-hand side.

Figure 3:
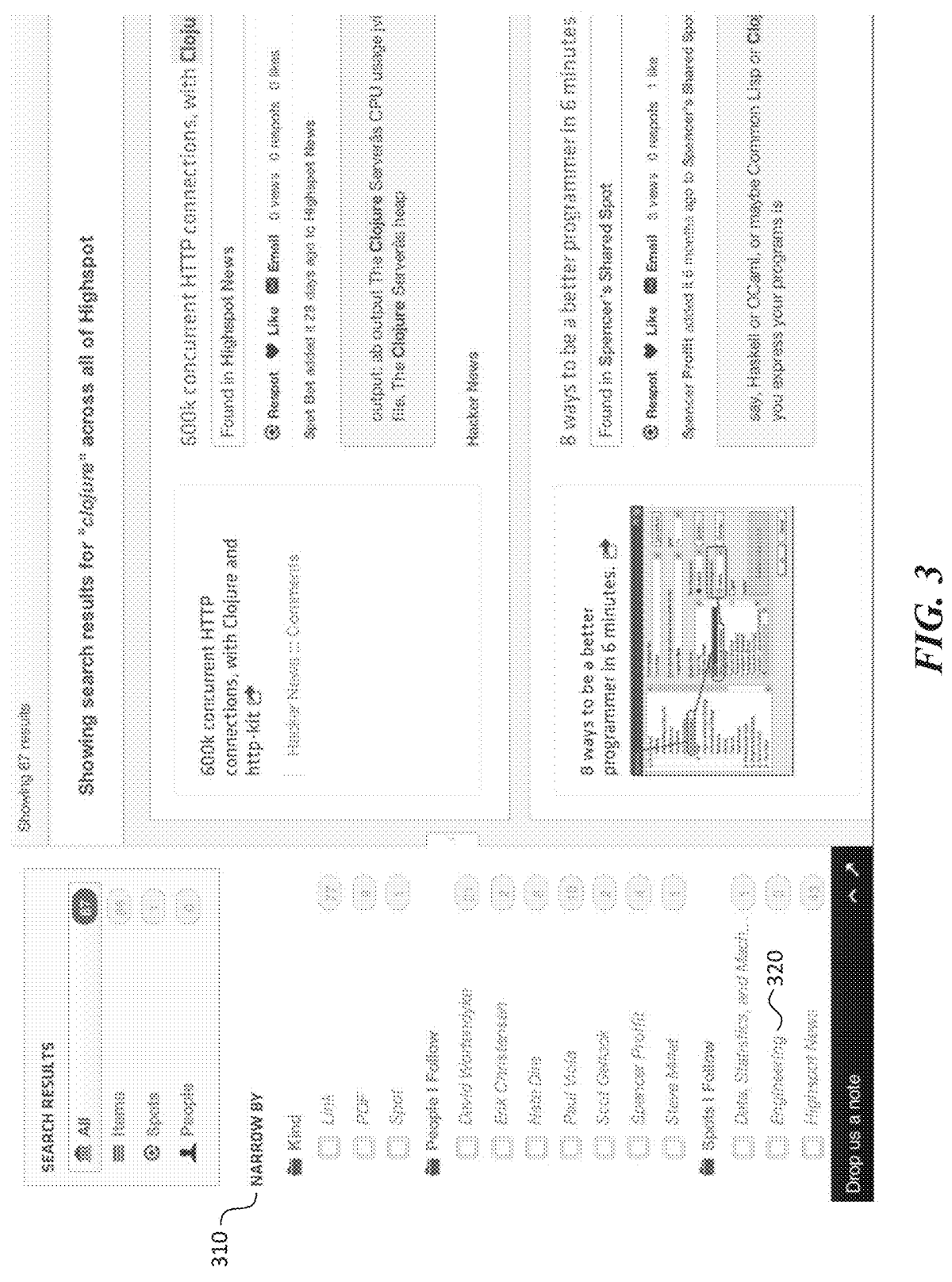

Another kind of user-defined property is shown in FIG. 3. The system allows users to follow spots or people, meaning that the user is interested in a particular collection of information or in the activities of a particular person. The user will see updates and/or activities i) related to that collection and/or ii) performed by that person. In FIG. 3, the user has done a search for the term "clojure," which yielded 87 results. The system has calculated which of the items are in spots that the user follows or were acted on by people the user follows. These are listed in the narrow-by area 310: for example, in this case the user follows the spot "Engineering" 320, which contains 3 of the items in the result set. If the user selects that spot's checkbox, only those 3 items from the original set are displayed. Similarly, the user can click the checkbox of a particular person, and only see the relevant items that the person has acted upon.

3. Relationships

Figure 4:
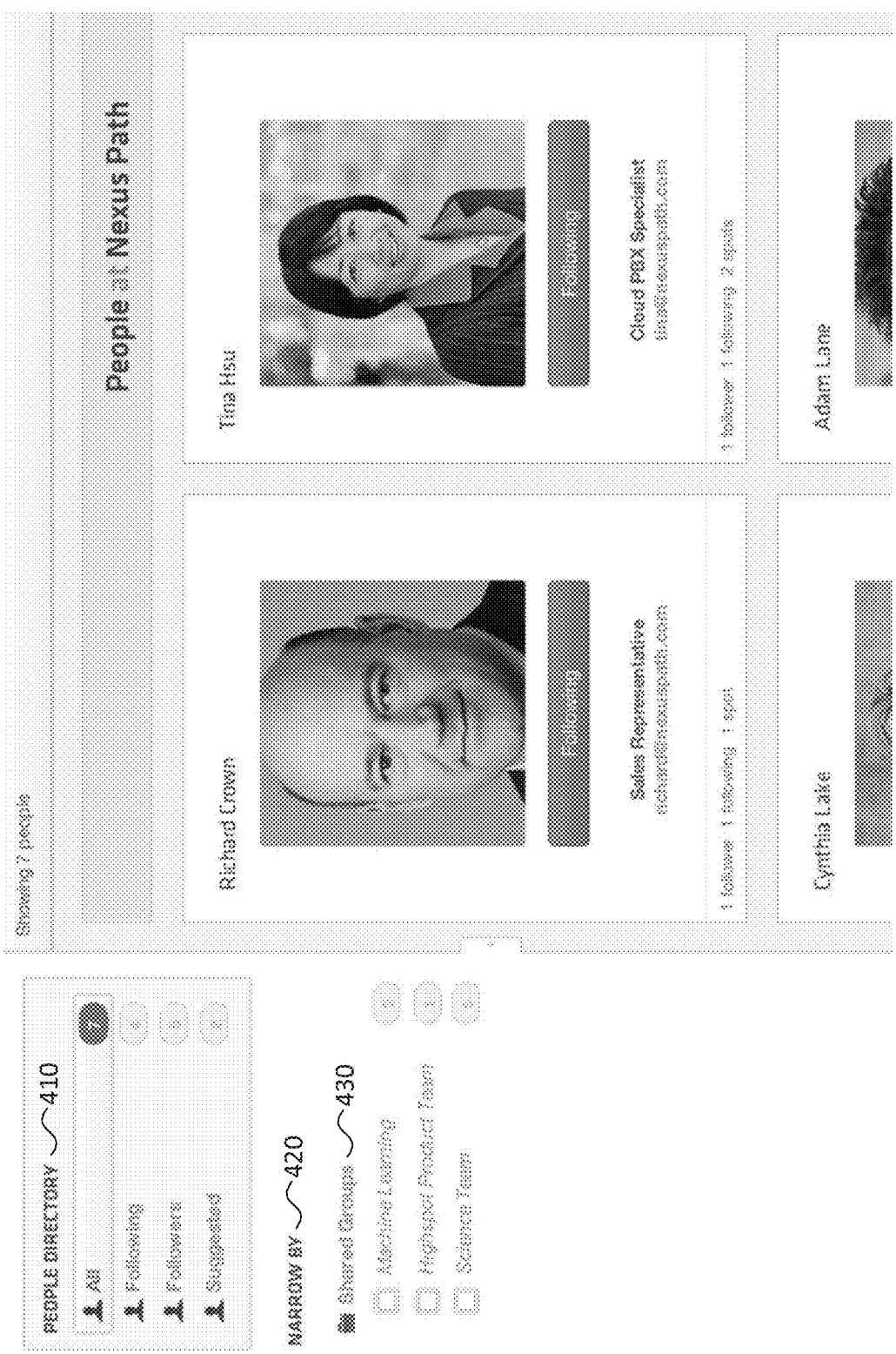
FIG. 4 is a display screen showing a directory of people.

The system may compute properties based on relationships that it knows exist between users. For example, in FIG. 4 the people directory is shown 410, listing people in the system. On the lower left, the narrow-by view 420 shows a section called "Shared Groups" 430, which specifies groups that both the user and some of the other people being shown belong to. The user can narrow down the list of people by selecting a group in order to find the right person in the directory.

4. Inherent Properties of the Item

Figure 5:
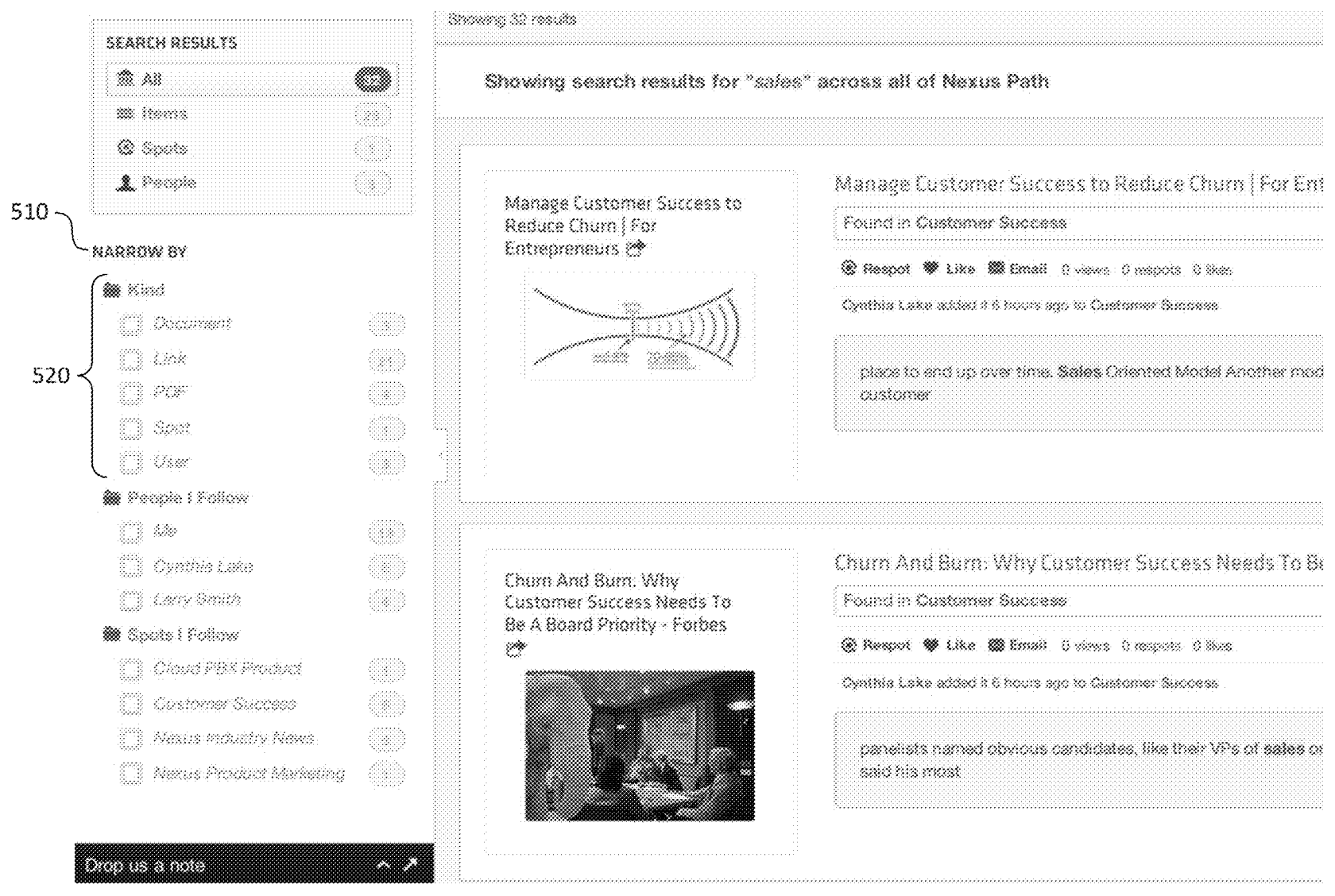

Some characteristics of an item can be computed by analyzing the item. For example, FIG. 5 shows a narrow-by 510 that lists the type or kind 520 of item: Document, Link to a web page, PDF, Spot (i.e., collection of items), and User. Other inherent properties the system could present include the item's length (in bytes, or characters, or pages, or other measurement), the nature of its contents (images, or equations, or what language(s) it is written in, or whether it is a 3D image), the date it was authored or uploaded, and so forth.

5. User Activities Associated with the Item

The system may allow users to act on items in a variety of ways. For example, items can be added, organized, viewed, edited, commented on, liked, shared with others, or copied into new collections. In addition, the user that performs the acts can have various relationships to the current user; the user might be the current user, or be in a group with the user, or be followed by the user, or be an influential member of the user's community, or have a high affinity to the user that the system has determined through analysis. All of these properties can be used to narrow down a particular result set.

Figure 6:
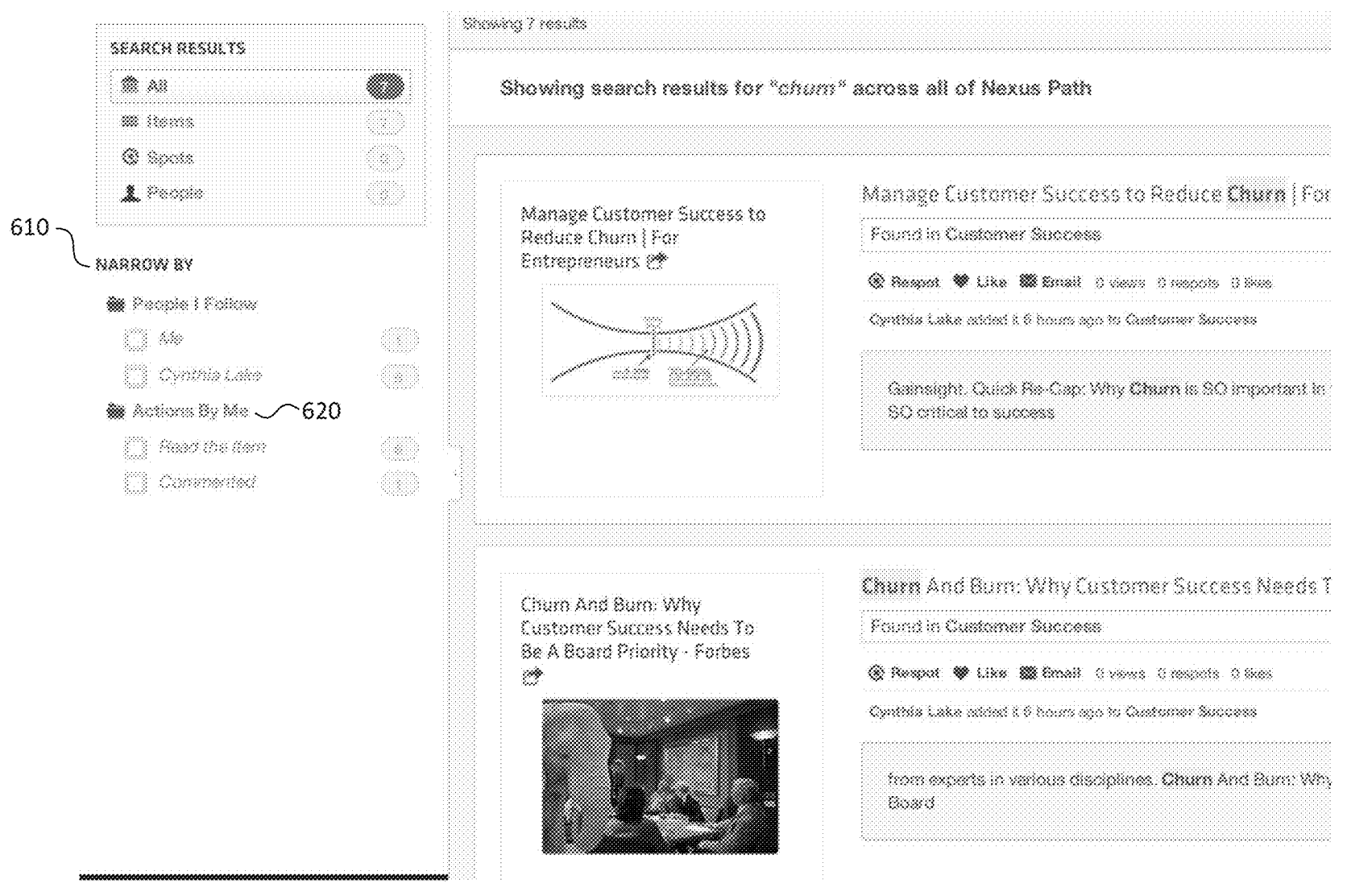

FIG. 6 shows an example where some of the items in the result set have been viewed, commented on, and so forth. In this example, the narrow-by 610 includes "Actions By Me" 620 folder. With a click, the user can narrow down the results to only show, for example, items that he or she has viewed or otherwise interacted with in the past. It could also show "Acted On By" and list people that the user follows. Accordingly, with a click a user can show only those items that somebody the user follows has, for example, commented on or otherwise acted on.

6. Computed Properties

The system can use a variety of analysis techniques to compute properties of an item. For example, it might use a technique like "basket analysis," which identifies relationships such as finding pairs of items that have been acted on by the same person. Such an analysis identifies affinities between items—it finds pairs of items that are often of interest to the same person, for example.

One way such analyses could be used in narrow-by is to compute a level of affinity between items (e.g. "high," "medium," and "low"). These can be presented as narrow-by options. The same approach could be applied to collections of items, to other people, and so forth.

There are many other kinds of computed properties the system might discover and present to the user: for example, how similar items are to the current item or items being displayed, whether items are different versions of the current item, or whether an item is identical to one that has been sent to the current user in email, perhaps as an attachment.

C. Presentation

FIG. 1A shows that every list shown in the narrow-by area may have an associated count 125 next to it. This indicates to the user how many of the items in their current result set will continue to be in it if that option is selected.

If the user selects multiple properties within a single property folder, items will be shown that have any of those properties. In FIG. 3, there is a narrow-by section called "Kind." If the user selects both "Presentation" and "PDF," all items of either kind will be included in the result set. To reflect that, once a user has selected one checkbox in a property group, the display for the other properties in that group changes to the form "+N," indicating that clicking on another box will add an additional N items to the result set.

In logic terminology, the semantics are "ANDs of ORs." For example, if the user selects a top-level list called "A," a list "1" in folder "B," and lists "3" and "4" in folder "C," an item will be shown if its properties match the expression ("A" AND "B.1" AND ("C.3" OR "C.4")).

Once the user has selected a property, any other properties that are no longer useful are disabled. In other words, when the new result set contains zero items with that property, or when every member of the new result set has the property, it is no longer helpful for further refining the result set. FIG. 1C demonstrates this, as described above. After the user selected "Pathfinder" 150, none of the 12 remaining items were in the list "Deep Space" 165, so it was disabled in narrow-by. If the user unselects "Pathfinder," "Deep Space" 165 is re-enabled as a selection option.

D. Applications

Narrow-by can be applied in a wide range of applications. In each of these applications, the items may represent a file (such as a presentation), a link to a web page, a person, a collection of items, or other entity that a user may wish to interact with.

Search—FIG. 1B shows the result of a search within a collection of items. FIG. 3 shows a search across multiple collections of items. In each case, the system identifies properties of the items in the result set that can be used to refine the search.

Browse—FIG. 2B shows the result of clicking on "Not Yet Complete," a system-defined list in a space exploration spot. Note that the items that are in that list have other properties that can be used to further refine the result set. Items may have a "Type of Content," which is a user-defined list. In this case, the two items being displayed represents two different types of content. The system mixes together user-defined and system-defined lists to help users quickly identify the set of items that they are interested in.

Figure 7:
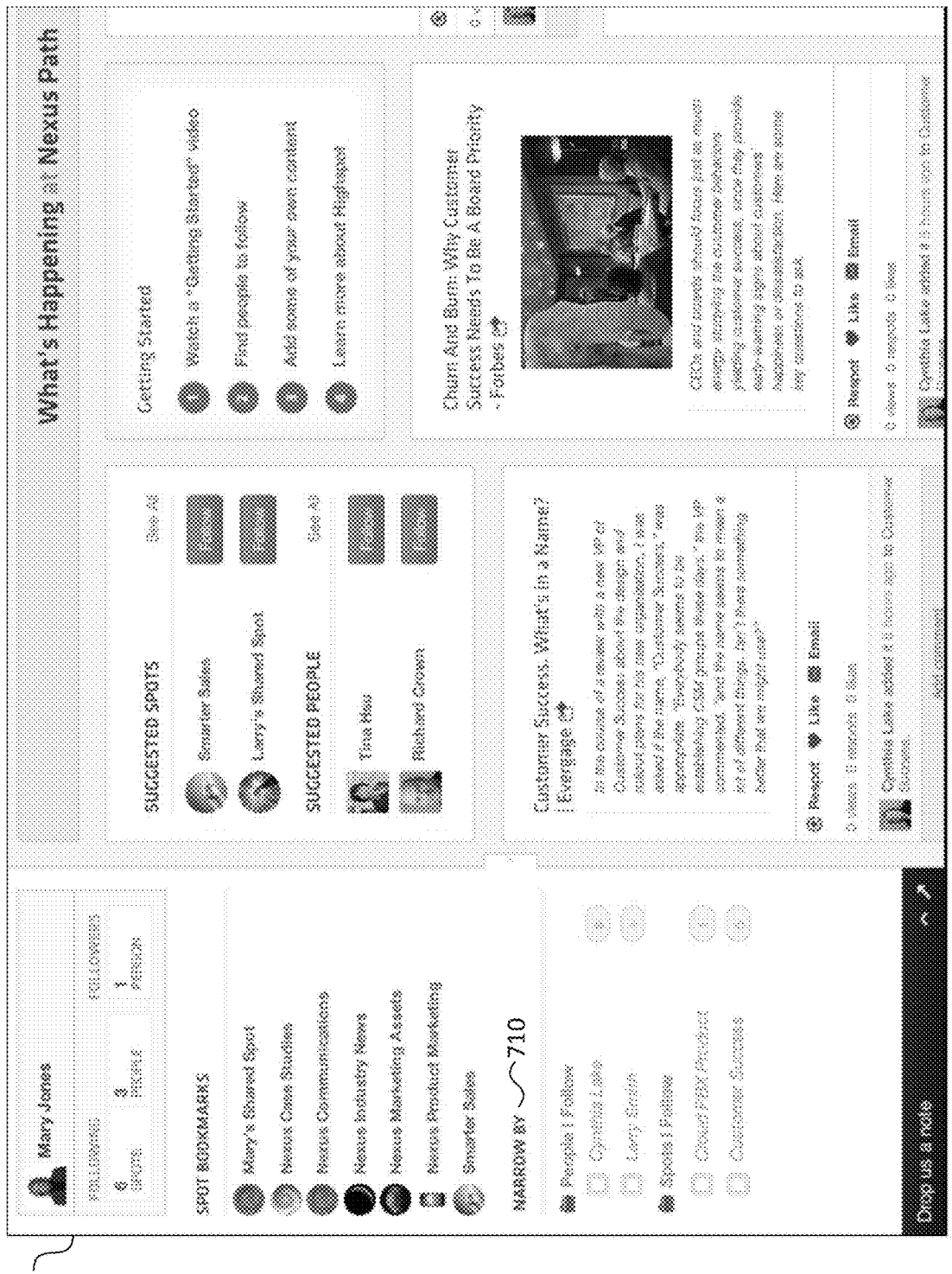
FIG. 7 is a display screen showing automatic suggestions of items for display to a user.

Discover—The system can auto-suggest a set of items, through a feed, as shown in FIG. 7. The feed 700 contains those items that the system believes the user may find interesting, based on previous activity, social relationships, and the like. The items on the feed can be refined based on narrow-by 710 options. In this case, the system identifies which items in the feed come from spots or people the user is following. It can also show any of the other properties that have been mentioned elsewhere in this document.

Once the result set is narrowed down, the user can apply various operations to the results. For example, the user might view them, or download them to a computer or a device, or copy them to a different collection, or delete them, or add them to a user-defined grouping such as a list.

E. Implementation

The system can be implemented by using an indexing system supporting faceting, such as Lucene/SOLR. Faceting is a feature of an index that computes how many of the result values have a particular characteristic. Lucene allows facets to be manifest, meaning that they have been explicitly attached to an item and placed into the index, or computed, meaning that they are calculated during the query process.

1. Query the Index for Faceted Results
   a. In Lucene, items are associated with a set of fields that are used for faceting. The system creates one for every manifest facet that will be presented to the user. For example, if the user places an item in a list, that is stored in a field. Other examples include the spot that the item belongs to, who created the item, who has viewed the item, and so forth.
   b. Based on the context that the result is being used in, the system determines which fields to perform faceting on. For example, take the lists and folders that a user defines within a spot (such as "Mission" and "Pathfinder" in FIG. 1A). If the user searches for items within that spot, those lists and folders will be shown to the user as appropriate for narrowing the results, and hence they need to be fields that faceting is applied to. However, if the user searches for items across multiple spots, the folders and lists inside those spots may use the same names for conflicting meanings and so displaying them may be confusing. For example, there might be another spot about landmarks, and a "Mission" in that context might refer to religious outposts constructed by the Spanish in California. To avoid grouping together names from different contexts, which might conflict, the system does not show list or folder properties from different spots in the same context. Hence, the list and folder property fields need not be faceted for that kind of search. FIG. 3 shows a search across multiple spots—it looks for matching items across the entire domain—and the narrow-by area only shows properties that are known to be applicable across spots, such as the type of content or who owns it.
   c. Next, the system builds up the Lucene query. It requests that the return values be faceted in two ways:
      Each of the fields chosen in step 2 is listed as a field facet.
      Any computed facet is represented as a query facet. For example, the "advanced folder" semantics shown in FIG. 2A (e.g., "Not Yet Completed") are based on how many lists a particular item is in. If a folder is marked as "complete," every item is supposed to be in a list in that folder. If it is marked as "exclusive,"

no item should be in more than one list. Exceptions are included in system lists called "Not Yet Complete" (for items in no list) and "Not Yet Exclusive" (for items in multiple lists). The system computes these system lists using query facets. It does so by creating a temporary field per item for each folder. As the query is computed, the system tracks how many lists within that folder contain the item, using a value that is one of {0, 1, and "many"}. The query then facets on that calculated field being equal to 0 (meaning the item is in no lists) and "many" (meaning the item is in multiple lists). These facets then represent the count for the two lists "Not Yet Complete" and "Not Yet Exclusive."

d. Submit the query.

2. Post-Process Query Results

Lucene Returns:

The result set containing items that match the query.

A table listing the facet folders and lists, with counts. For example, in FIG. 1B, Lucene has computed the set of items within the NASA spot that contain the term "NASA." The facet count shows the folders and lists that these items are in. In this example, 12 of them are in the "Pathfinder" list within the "Mission" folder).

The system can now mask particular facets, based on what it chooses to display to the user. For example, the system might decide to show a maximum of five lists in a particular folder, perhaps choosing those lists that have the largest number of items in them.

The system can also compute values that are not stored in the Lucene index. For example, if the user is following a set of spots, that information is not in the index. The system takes the set of spots that the items are in, and looks up the ones that the user has chosen to follow. These are then displayed as options for the user to select, as shown in FIG. 3 (in the area titled "Spots I Follow").

The results are then rendered, with the facets shown on the left-hand side, organized into folders and lists. Each list shows a checkbox next to it that the user can select.

3. Respond to User Selection of Checkboxes

When the user clicks on a checkbox, it can be one of the following:

4. Top Level List, as the Only Selection

A "top-level" list represents a stand-alone property that has not been grouped. By selecting it, the user is requesting that only items with this property to be displayed.

The system resubmits the query to Lucene, specifying that this property be present. If the property corresponds to a field facet, the system changes the facet request into a filter. Lucene will only return items that match. If the property corresponds to a query facet, the system creates a custom filter that first computes the value (as above) and then filters out items that do not match.

The counts on all the properties are updated to match the facet values returned from the new query. If a property is no longer useful (i.e., the new result list has zero items with the property or all the items in the new result list have the property) it is disabled for selection.

5. A Top-Level List, after Something Else was Already Selected Previously

Take the query that was submitted last, and extend it with an AND clause. For example, suppose that a top-level list "A" was selected earlier and now top-level list "B" is being selected. The new query would add the filter ("A" AND "B"), matching only items that have both of those properties.

6. First List in a Folder

Extend the existing filter, if there is one, with the selected property. Then, resubmit the query once for each other list in the folder, specifying each as a filter. Track the size of the result set. When displaying the other checkboxes, show the delta for each. FIG. 1C shows an example of how the system displays this visually (e.g., "+6" for "Hubble").

To use a simplified example for explanation, suppose a folder "A" contains four lists, "1," "2," "3," and "4," and that such grouped properties are represented in Lucene as "<Folder>.<List>." If the user selects list "1," create four queries. Execute the first one, which contains the filter specifying that Lucene should only return items that contain property "A.1." Suppose there are 10 results from that query.

Next, execute a query for items that contain ("A.1" OR "A.2"). Suppose that there are 12 items. Next to item 2, display "+2" so the user knows that clicking on the additional list will add two items. Similarly, execute queries for ("A.1" OR "A.3") and ("A.1" OR "A.4").

7. Another List in a Folder, after One has Already been Selected

As above, execute a query that specifies each of the selected lists with an OR clause. And resubmit the query for every unchecked list to compute the counts.

For example, suppose there is a top-level list "B" and a folder "C" that contains lists "1," "2," and "3." The user already selected the top-level list and list "1." Now, list "2" is also selected. The initial query to submit is ("B" AND ("C.1" OR "C.2")). This represents items that are in list B and in list 1 or list 2 of folder C. Suppose there are five results. Then submit ("B" AND ("C.1" OR "C.2" OR "C.3")), and suppose there are eight results. The system would then display the five results from the first query and would place a "+3" next to list "3."

F. Enhancements

The system can be enhanced by automatically suggesting which lists or properties the user might find most effective to use narrow-by. This could be based on analyzing the history of the user's prior activity, knowing, for example the users or collections whose content is most likely to be of interest. The system could sort those "suggested" properties to appear earlier, or it could color code them so that they are more visually prominent.

Figure 8:
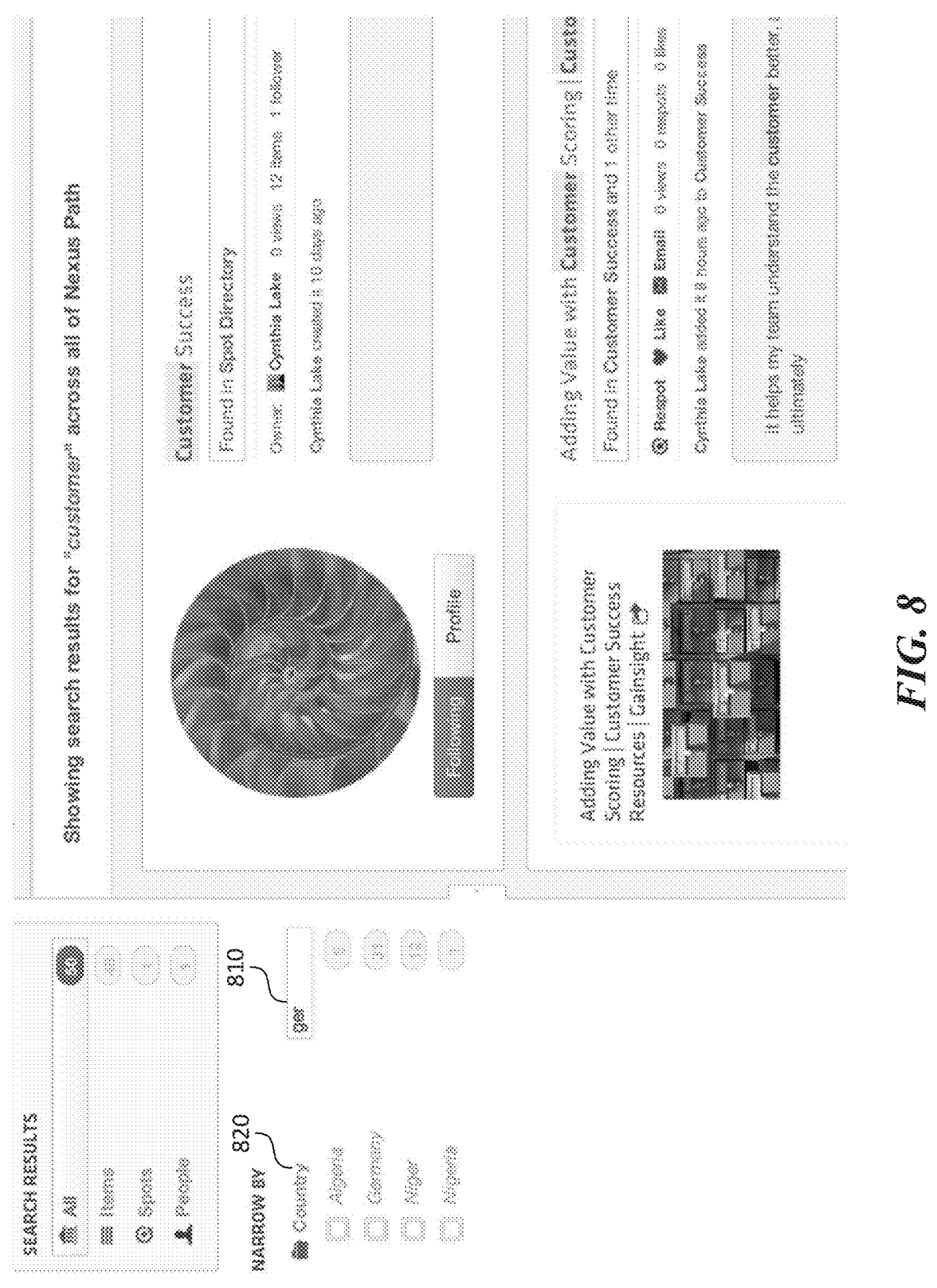

The system can handle large numbers of properties by presenting a search box 810 to the user, rather than listing them explicitly. For example, see FIG. 8, where items have been given a property to reflect which of 300 countries are relevant to it. The countries have been grouped together into an item folder called "Country" 820. Next to the folder name, in this example, there is a search box. If the user wishes to find, say, Germany, he or she can type in the search box. As shown in the Figure, the system will then show every item list in the Country folder that matches the phrase that was typed. In this example, the user has typed "ger" in the search box, and four countries that have those letters as part of their names are displayed. The user can keep typing to narrow the list down further. When the desired country has been found, the user can select it; in this case, by clicking the "Germany" checkbox, only the 31 items in the list will be displayed.

Another feature is that if a user selects an item, the properties the item has can be denoted visually (by, for example, turning them blue and making them bold). This allows the user to quickly identify items similar to the one of interest, by selecting particular properties that the one of interest has. The result set will narrow down to the others that share that property.

Figure 9A:
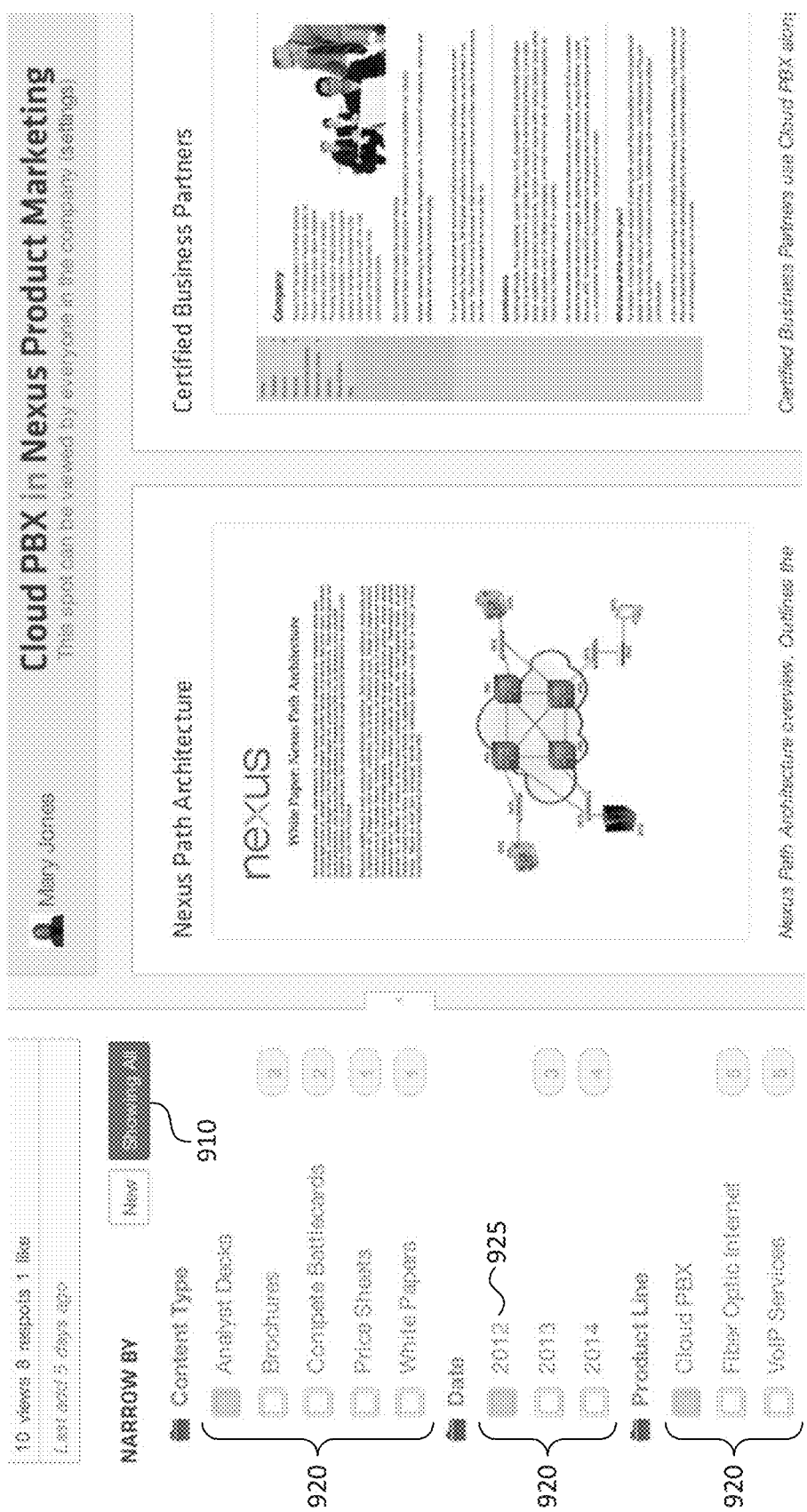
Figure 9B:
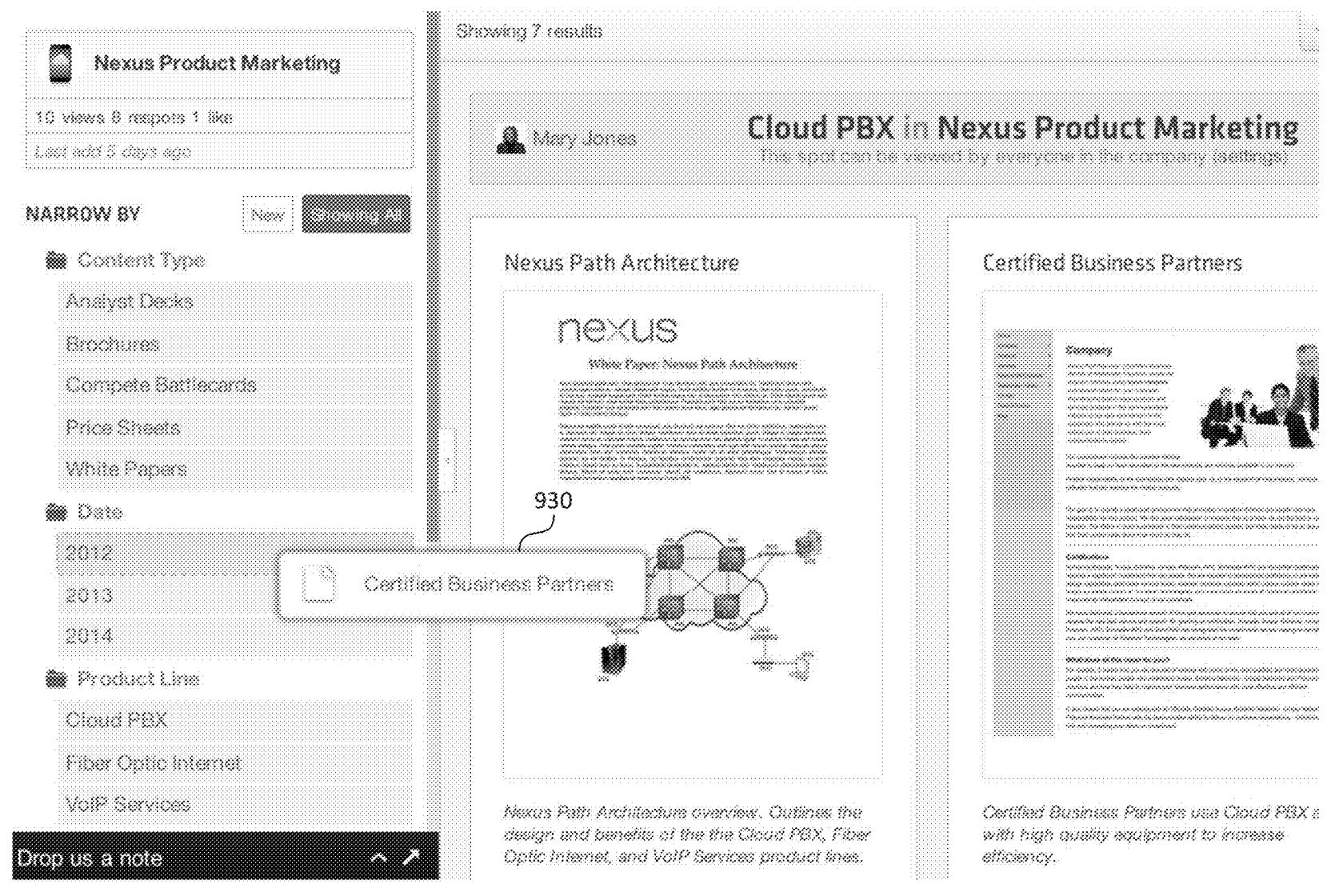

The user can request that all properties be shown, even if they are not useful. This allows the set of properties to be edited, and the item to be dragged on top of properties that it does not have in order to associate the item with the properties. FIG. 9A shows the result of clicking the "Show All" button 910 next to the words "Narrow By"—note that the button 910 has been highlighted and switched to say "Showing All." Now all the lists are shown, including the year 2012 list 925 in the "Date" folder, which holds none of the items currently being displayed. FIG. 9B shows an item 930 being dragged to that list, which will associate the dragged item and the "dragged to" list with each other. This allows an editor to add items to any list even when the narrow-by view is being displayed.

Figure 10:
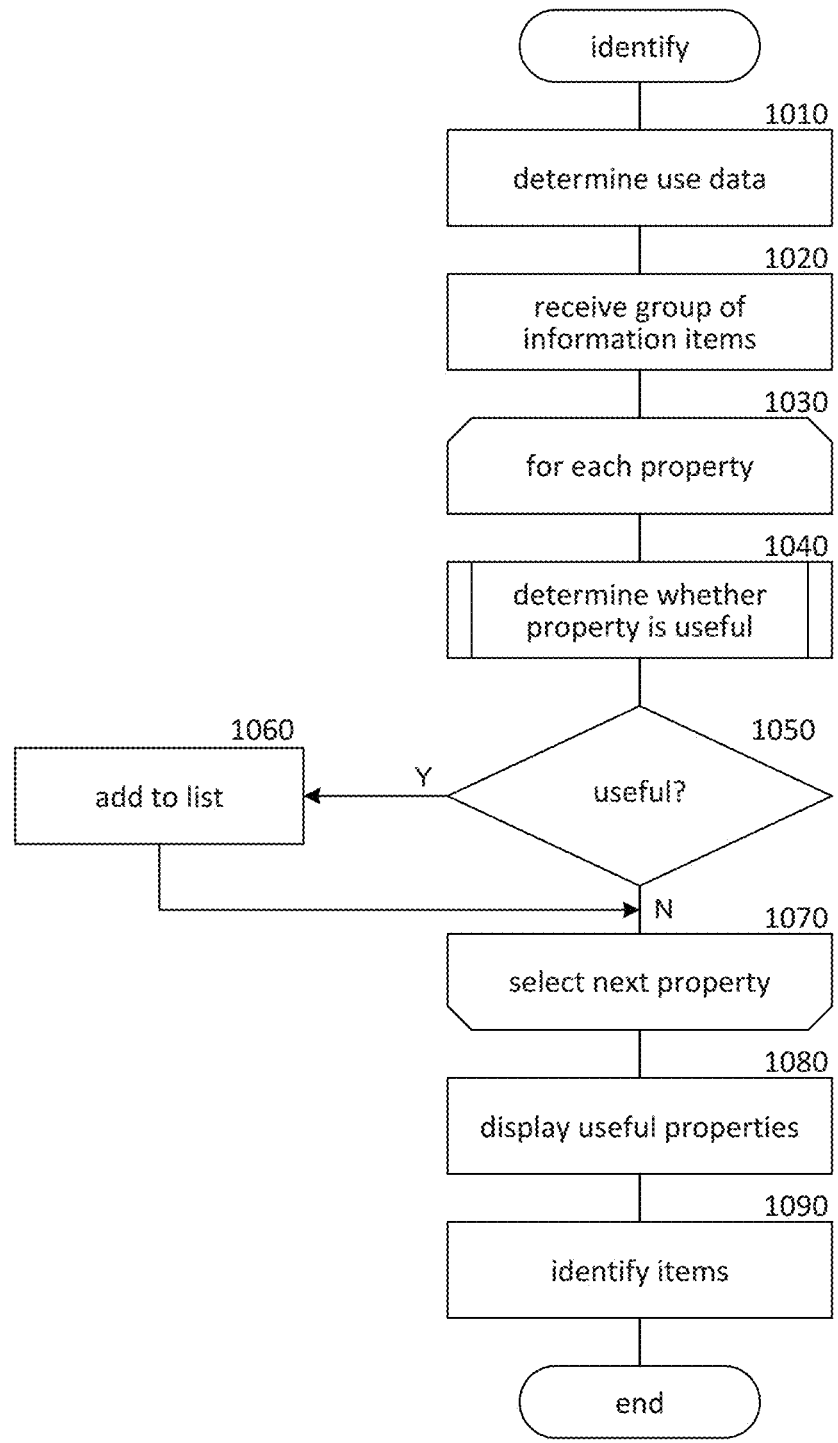
FIG. 10 is a block diagram illustrating the processing of an identify information items component.

FIG. 10 is a block diagram illustrating the processing of an identify information items component in accordance with some embodiments of the disclosed technology. The facility invokes the component to identify information items based on useful properties among a set of properties. In block 1010, the component determines use data characterizing relationships among information. For example, the component may determine how users have interacted with information items within an organization, relationships between information items, relationships between users, relationships between information items and users, accessibility or privileges information, and so on. In block 1020, the component receives an indication of a group of information items, such as a group of information items accessible by a particular user, metadata pertaining to the information items, links to the information items, a listing of the information items, and so on. In blocks 1030 to 1070, the component loops through each of a set of properties to identify useful properties. The properties may be culled from properties associated with the group of information items. In block 1040, the component invokes a determine property usefulness component to determine whether the currently-selected property is useful. In decision block 1050, if the property is determined to be useful, then the component continues at block 1070, else the component continues at block 1060. In block 1060, the component adds the currently selected property to a list of useful properties. In block 1070, the component selects the next property and then loops back to block 1030. If all of the properties have already been selected, then the component continues at block 1080. In block 1080, the component provides an indication of useful properties, such as displaying or sending a list of the useful properties. In block 1090, the component identifies information items associated with the useful properties. For example, the component may identify items that match one or more selected useful properties, such as useful properties selected by a user. In some embodiments, a means for identifying information items is one or more computers or processors configured to carry out the algorithm disclosed in FIG. 10 and this paragraph.

Figure 11:
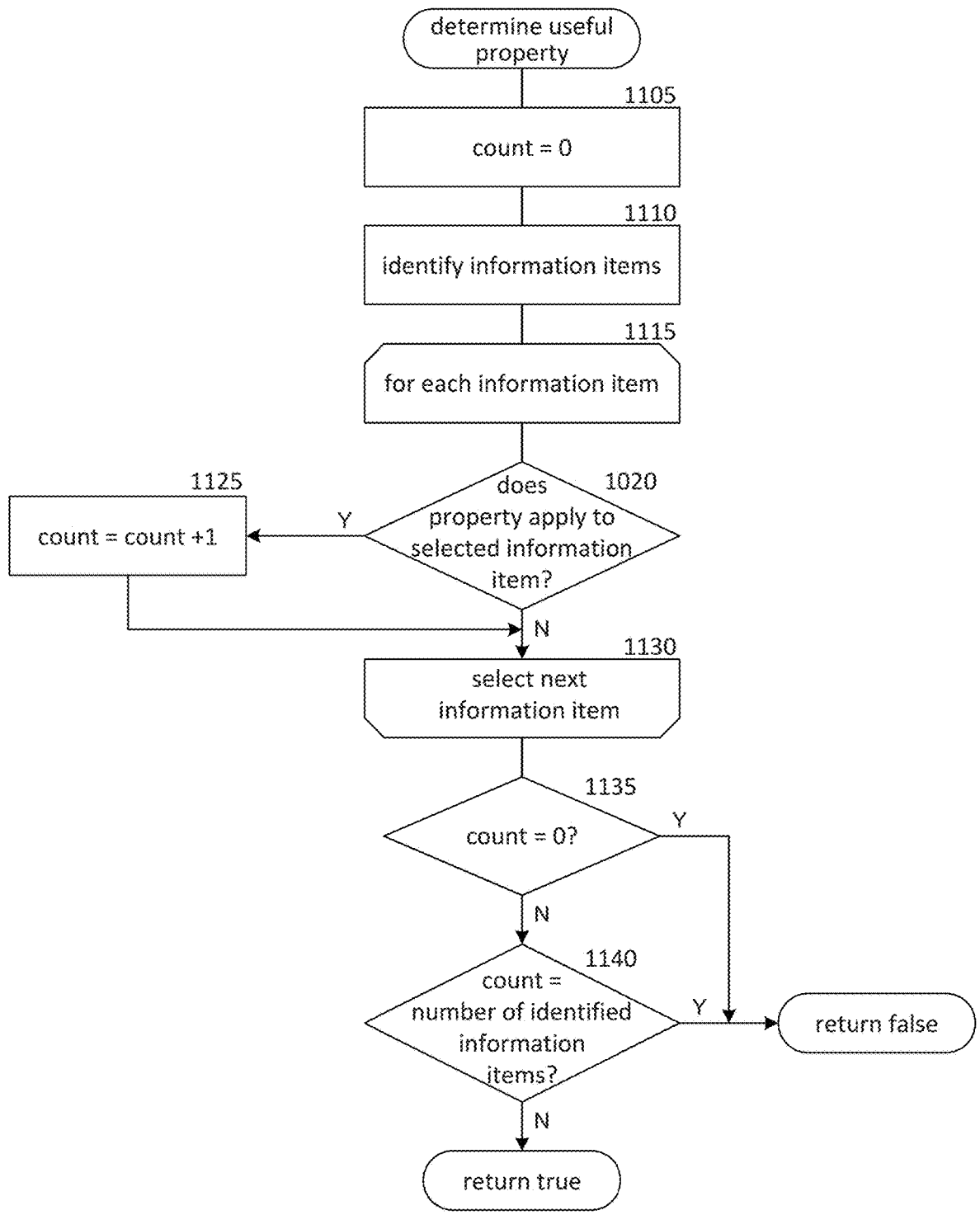
FIG. 11 is a block diagram illustrating the processing of a determine property usefulness component.

FIG. 11 is a block diagram illustrating the processing of a determine property usefulness component in accordance with some embodiments of the disclosed technology. The facility invokes the component to determine whether a particular property is useful. In block 1105, the component initializes a count variable to zero. In block 1110, the component identifies relevant information items, such as a group of information that a user is interacting with, information items identified as a result of a search or query, information items accessible to the user, all information items within an organization, and so on. In blocks 1115 to 1130, the component loops through each information item to determine whether the property applies to the information item. In decision block 1120, if the property applies to the currently-selected information item then the component continues at block 1125, else the component continues at block 1130. In block 1125, the component increments the count variable. In block 1130, the component selects the next information item and then loops back to block 1115. If all of the information items have already been selected, then the component continues at block 1130. In decision block 1135, if the count variable is equal to zero, then the component returns false and completes, else the component continues at decision block 1140. In decision block 1140, if the count variable is equal to the number of information items identified in block 1110, then the component returns false and completes, else the component returns true and completes. In some embodiments, a means for determining property usefulness is one or more computers or processors configured to carry out the algorithm disclosed in FIG. 11 and this paragraph.

G. Interest Graph Powered-Browsing and Information Feed

The technology described herein allows users to browse through collections of content, organized and sorted on their behalf by other users and by the system. The information includes documents and presentations, web sites and pages, audiovisual media streams, and other suitable information. Each item is presented with social signal that represents the way that the community inside and outside the organization has been interacting with that information. For example, the system shows how frequently an item has been viewed. Within organizations, there are often restrictions as to what data is available to each person, so each user is only allowed to see the items that they have access to. The disclosed system enforces these access rights.

This disclosure describes the creation and use of an interest graph within a company, and between companies, to drive information browsing. An interest graph expresses the affinity between people and information—the likelihood that a particular piece of information is of interest to a particular person. The information might be a document, a presentation, a video, an image, a web page, a report, or the like. The information might also be a collection of items, or a link to a collection of items or to a person. The interest graph is based at least in part on an understanding of relationships, monitoring of user behavior, and analysis of each piece of information. In some examples, there are three steps for computing the interest graph. The first step is to generate the data; the system provides mechanisms for the user to quickly browse, share, and organize information. By using those features, the users create a large amount of data, much of which is currently unavailable inside of a company. The next step is to gather the data, where the system logs user activities in a set of data structures. The third step is to compute the interest graph. By running a series of computations over the information gathered from users, the system computes data structures that are used for a variety of ranking operations. The disclosed techniques honor access restrictions that users specify for each item, so that only authorized people will see any piece of information.

H. Browsing

Figure 12:
FIG. 12 is a display page illustrating a collection of information called a "spot" in accordance with an embodiment of the present technology.
Figure 13:
FIG. 13 is a display page illustrating a sub-collection of information called a "spotlist" in accordance with an embodiment of the present technology.

One way that users find useful and compelling content online is to browse through collections of content. In the system, the collections are called spots, which can be further organized by placing content items into spotlists. A content item can be placed into any number of spotlists. Spotlists can also be gathered into folders. A spotlist is a list of content items. The user navigates by choosing a collection by, for example, viewing a directory of spots, finding a link to the collection on another spot, having the system suggest a collection, searching, having a link shared with them by another user, and so on. Users can either look at the spot as a whole, or can look at a sub-collection by choosing a spotlist or a folder. FIG. 12 shows a spot home page, which is the default view in the system when a user visits a spot in some embodiments. On the left, under the word "Browse", a set of spotlists and folders are presented. For example, the spotlist "Implementor" is a spotlist with 48 items in it and is in a folder called "Audience". If the user clicks on a spotlist (e.g., "Implementor," "Decision Maker," "Proof of Concept"), the system displays the items in that list. FIG. 13 shows the result of clicking on the spotlist called "Business Intelligence".

Figure 14:
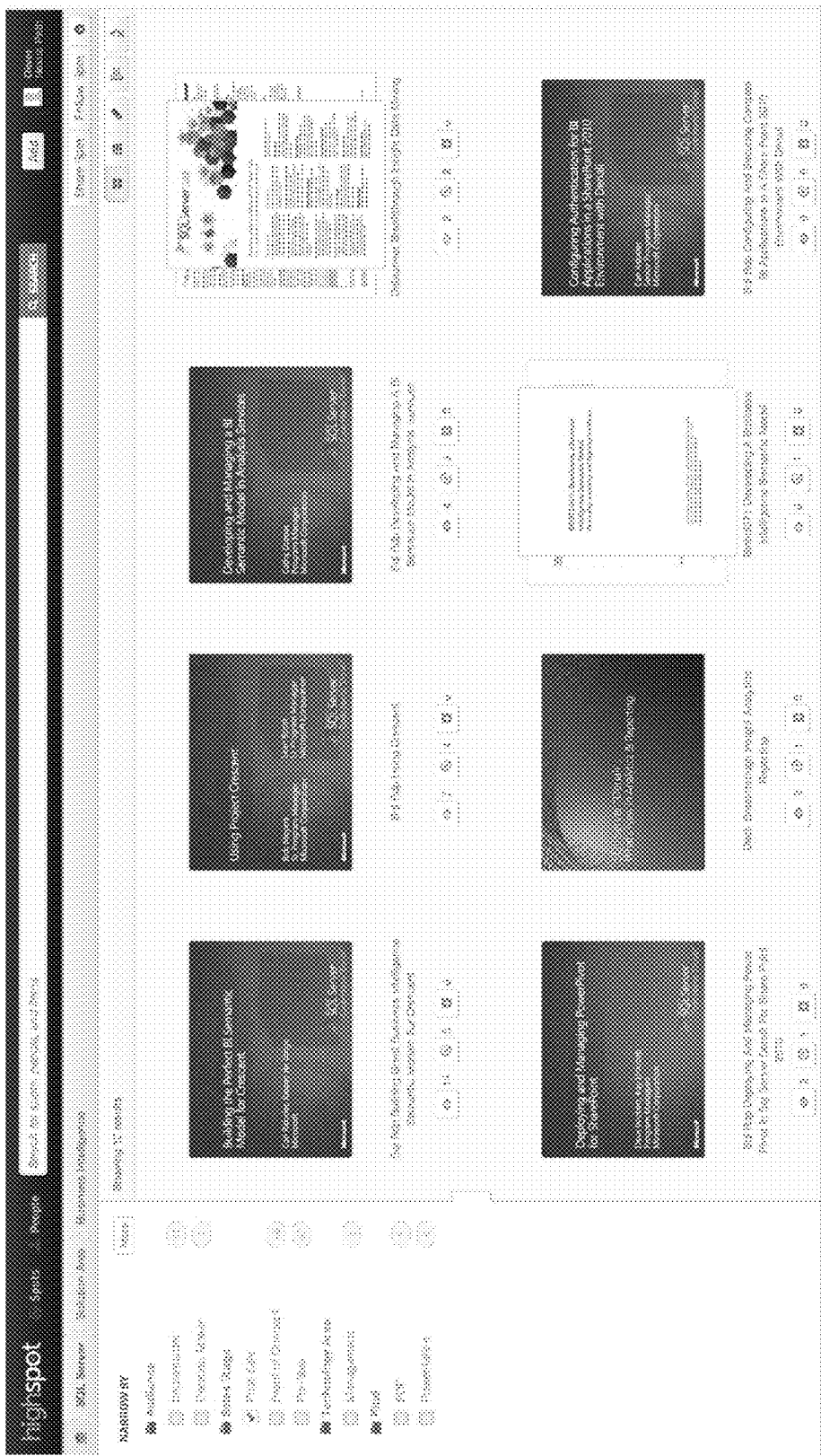
FIG. 14 is a display page illustrating a group of results filtered down via "narrow-by" in accordance with an embodiment of the present technology.

One of the ways the system helps users refine a particular group of results is with a technique called narrow-by. When a particular set of items is being presented, the system computes every spotlist that any item in the set belongs to. For example, an item might belong to a spotlist that relates to its target audience (such as "Implementor" and "Decision Maker" in FIG. 12). The item might also belong to a spotlist related to a topic it covers (such as "Business Intelligence"), or a region of the world that it is relevant for, or the like. If a spotlist contains only a subset of the items, it will be offered as a checkbox item that can be used to restrict the set of results. This is shown in FIG. 13; in this case, there were 21 items in the "Business Intelligence" spotlist, but only 10 of them are presentations. In some cases, a spotlist, such as the "Presentation" spotlist, is a smart spotlist, meaning that its contents are automatically computed by the system rather than specified by the user. Other spotlists, such as the "Post-sale" spotlist, are user spotlists, where items are assigned to different spotlists by a user. In this example, 12 of the 21 business intelligence items are also in the post-sale spotlist. The user can ask the system to narrow down the results based at least in part on one of these other spotlists by clicking the checkbox next to the spotlist name. FIG. 14 shows what happens in some embodiments if the user selects the "post-sale" checkbox—the result set is reduced to only twelve items. The user can further constrain the results by clicking other checkboxes, or return to the full set by unchecking "post-sale".

At any given time, there is a current set of results, and these are by default presented to the user in relevance order. That order is computed by the interest graph, as described herein. It is customized for each user, and is ordered based at least in part on what the system knows about that user's interests.

The browsing experience can be presented to users through a Web experience, as shown in FIGS. 12-15. It can also be presented as an online or offline custom application experience on a PC or on a device (such as a phone or tablet).

In some examples, the ranking of items during browsing is implemented in the system as follows:

a. Determine the set of items in the current result set. This may be based at least in part on the user choosing to look at a collection of items (in the system, this is done by visiting a particular spot), or a subset (by clicking on a spotlist or folder), or performing a search operation. In the example shown in FIG. 12, the user can also use the selector in the upper left to see all the items, only the ones that were last added, or all the ones added during the past week.

b. Run a computation (i.e., a subroutine) called ItemRanker (described below) on the result set to assign an overall rank to each item. The computation relies on the interest graph to compute a rank for each item indicating how interesting it is expected to be to the current user (i.e., the user for whom the items are being ranked).

Note that the activity counts used by ItemRanker, which are stored in the ItemScore data structure, are multiplied by a fractional value each day. This has the effect of causing older actions to be weighted less than more recent ones (producing exponential decay based at least in part on the age in days of the activity). The fractional value determines how quickly the usefulness of older activity attenuates. There are many other algorithms that could be used, including (but not limited to) using a fixed or adjustable linear scale factor based at least in part on the age of the activity, discarding data that is older than a certain window of time, or attenuating the data for a fixed period of time and treating all older activity as equal in weight and hence in importance. Also note that it is possible to use different age algorithms for different computations. For example, the system offers an alternative sort order for items on a spot that biases more for recent activity, by attenuating the weight of older activity more aggressively than it normally does. It is also possible to use different weights in the ranking algorithm for different computations or sort orders.

c. Present the resulting items to the user, sorted in overall relevance rank order (highest value first).

In some examples, the suggestion of a collection of items that might interest the user is implemented in the system as follows:

a. Determine the set of collections that the user has access to. In the system, the permissions are stored in a database, indexed by both collection and user.

b. Run a computation (i.e., a subroutine) called CollectionRanker (described below) on the result set to assign an overall rank to each item. The computation relies on the interest graph to compute a rank for each collection indicating how interesting it is expected to be to the current user (i.e., the user for whom the suggested collection of items is generated).

c. Present the collections above a threshold, sorted in overall relevance rank order (highest value first). The threshold is a constant value that represents a trade-off between precision against recall. Recall is the likelihood that the system will find something you are interested in, and precision is how well it weeds out the things that you do not wish to see. A higher threshold improves precision (shows fewer items, that are more likely to be useful) and a lower one improves recall (shows more items, and hence is more likely to include a particular one of interest).

1. Related Items

Figure 15:
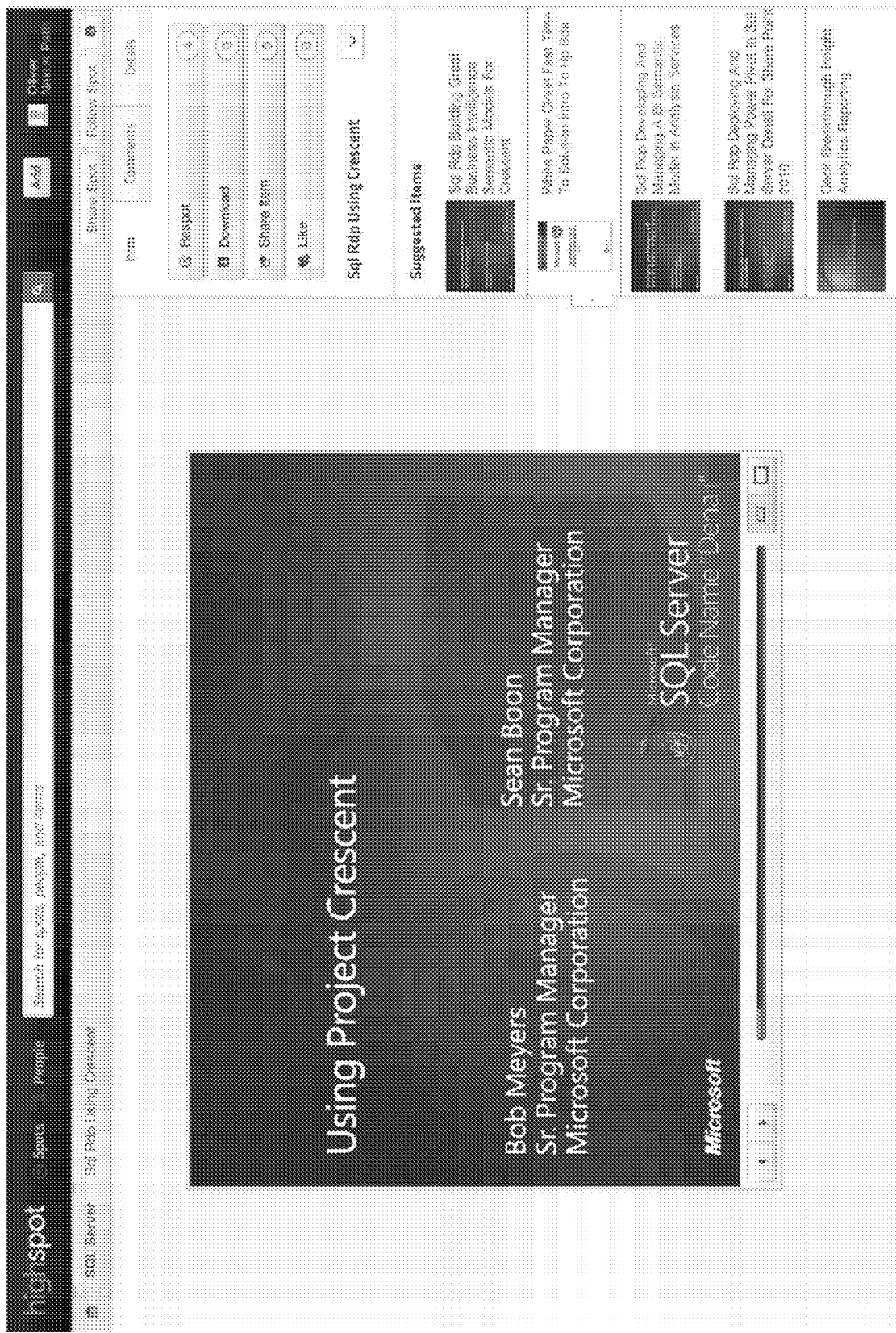
FIG. 15 is a display page illustrating an item with a list of related items in accordance with an embodiment of the present technology.

While browsing for items, users often find an item about a topic of interest and use that as a "seed"—they let the system identify and suggest related items for further exploration. The system supports an interest-graph based model for finding business information; whenever the user looks at an item, the system can suggest related items based at least in part on the interest graph. The items presented are customized for each user, based at least in part on what the system knows about them. FIG. 15 shows an item view, and the suggestions appear in the lower right hand part of the screen.

In some examples, the system identifies related items as follows:

a. Run a computation (i.e., a subroutine) called RelatedItemRanker (described in detail below) on the current item to yield a ranked set of items that have a relationship to the current one. The computation relies on the interest graph to compute a rank for each item indicating how interesting it is expected to be to the current user. It uses a variety of inputs to measure the strength of the relationship—textual similarity, the fact that the items are of interest to users with similar behavior, the appearance of the items in the same collections of sub-collections, and so forth. Note that in some embodiments the system will only consider related items that the current user has permission to access.

b. Present the resulting items to the user, sorted in overall rank order (highest value first).

2. Other Potential Uses

There are a number of other ways that the system can support browsing and the interest graph powering it can be enhanced.

- Augment the interest graph computation with real-time feedback. Regularly adjust the algorithms used to compute the interest graph and the weightings based at least in part on the effect on user behavior. For example, divide the user community into groups (sometimes called cohorts), present the results of different weights or algorithms to the different groups, and adjust the system based at least in part on the most successful approach.
- Voting and reputation. If users vote on the contributions of others, the voting patterns resemble commenting patterns, and can be added into the data structures that track interactions between users and measure the influence of a user on others in the community. For example, if one user votes for the contribution of another, the system can treat that the same way as making a comment. Each such vote represents an additional amount of influence that can be added to other indications, such as the number of followers they have or the number of times others commented on an item that a user uploaded.
- Rank subsets of an item. Based at least in part on the sections of video that other users have watched or otherwise interacted with, and the affinity of the current user to the other users, the system could identify and present the sections within the video most likely to be of interest. The same idea can be applied to other media types. For example, the system could identify and play parts of an audio stream. It could identify components within a structured document, such as a CAD diagram, to find the parts that are likely to be of most interest. It could rank the pages of a document or the slides in a presentation based at least in part on what is most likely to interest the user. These ranks could be used to create a digest (summary) of the item that is faster for users to review, such as a "highlights" synopsis of a video, or a summary document.
- Present derived information. In addition to indexing the contents of an item, the system could apply a variety of computations that derive new information based at least in part on the content, and apply the interest graph to presenting that derived data. For example, it might do voice recognition of an audio or video stream and present a transcript as well as the item. It might do a dependency analysis on a CAD diagram and link to dependent components, even if they are not present in the original diagram. Each of the derived items may be treated as a separate content item for ranking and affinity calculation purposes.
- Incorporate additional sources of social graph information. The patterns of email for each user can indicate the topics that they are interested in and the people they most frequently interact with. The interest graph could be enhanced by performing content and traffic analysis on email and on aliases that have been set up by users to communicate with each other. Another example is the user directory. Many organizations maintain directories that maintain the membership of users in groups and the relationship between groups. A common example is Active Directory. Such directories are used to enforce access permissions, set up email aliases, and a variety of other purposes. There are also HR and payroll systems that capture relationships among users as well. Another source of information is on-premise server systems. For example, by looking at the permission sets for file systems and the access patterns, additional social information would be available that is similar to what the system tracks internally. Another potential source is public social networks outside of the organization (such as Facebook, Twitter, Instagram, and the like). All of these systems have information about the social graph that could be incorporated into the interest graph. For example, if one user "follows" another person in the company on Twitter, that can be treated similarly to following somebody within the system and incorporated into the interest graph. Likewise when two people are "friends" on Facebook, or otherwise connected on a social networking site, this connection can be included in the interest graph. As another example, comments by one person on an item posted by another, which is similar to commenting on an item published within the system, can be incorporated into the interest graph.
- Use role/title information. If users are assigned roles or titles, either by self-selection or by the company, those with similar roles and titles are likely to have some interests in common—another signal that can be incorporated into the interest graph.
- Identify similar items as well as true duplicates. Often items are related but not identical. For example, a slide deck that contains some of the same slides as another, but reordered or intermixed with others. Or, a document that has been modified, but much of the substance is the same. Similarity could be used to do more aggressive deduplication, or to identify when content is related, or to identify when users have similar interests because they interact with similar documents as well as identical ones. Another option is to offer users the ability to construct new content from pieces of existing ones. For example, assembling a presentation from slides that come from multiple existing decks. This would reveal the relationships between the assembled and original decks, and would give additional signal on which slides of a presentation are the most valuable.
- Additional types of content analysis. There are a variety of ways to analyze content to reveal information that would be useful for the interest graph. For example, performing facial and feature recognition of images. The analysis could be used to find items that are about related topics. Facial recognition could be used to compare content images to user profile pictures, to identify content that is about people in the system. The system could automatically perform language translation on items of particular interest. Or it could create higher resolution previews, or graphical rendering/ visualization of data, or create 3D images.

Proactively get ready to deliver items likely to be of interest. Items likely to be of interest to a user can be downloaded to a device for device-optimized or offline access, or pre-cached in a content delivery network (CDN) for faster delivery to the browser. A group of items might be presented to the user together for faster viewing.

Target advertisements and promotional offers. The system may target offers to users based at least in part on their activities and interests (e.g., the items they are currently browsing). These might be sponsored by the organization they work for, by a partner, or by outside companies. For example, a company might allow vendors to compete for or purchase the right to market services to employees. Similarly, there might be a facility for "sponsoring" particular items and ranking sponsored items higher, highlighting sponsored items visually, indicating the nature of the sponsorship, and so on. Such sponsorship might be done manually, by an algorithm, by a business rule, by an expert system.

I. Information Feed

One way that users discover useful and compelling content online is through discovery. Discovery is opportunistic—the system learns about that user and what they are interested in, and presents items based at least in part on that understanding. For example, the system can track the information that users have viewed in the past, and find items that are similar or that were viewed by other people who looked at the same or similar information as the current user. In some embodiments, the information that the system identifies is presented to the user as a sequence of items, typically in exactly or approximately the order of the time that they were created or updated. This sequence is known as the feed.

Figure 17:
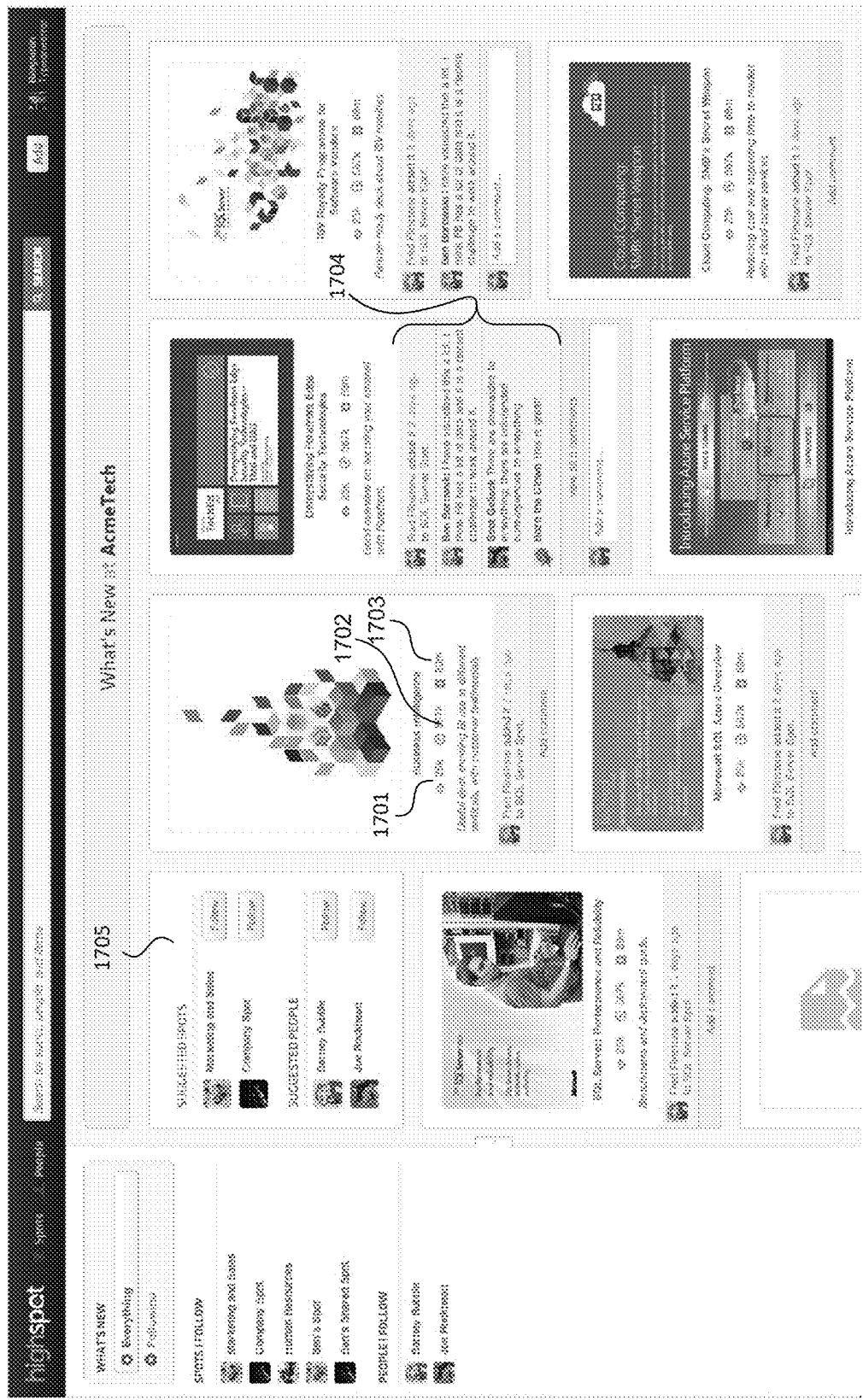
FIG. 17 is a display page illustrating a feed of business information for a user in accordance with an embodiment of the present technology.

The disclosed system creates a feed of information, such as business information, based at least in part on the interests of the user, which are analyzed by assembling an interest graph. FIG. 17 shows the feed for a user. Note that the items in the feed are documents, presentations, images, Web pages, and other information that help employees do their work. Also note that associated with each item is a summary of user signal—the amount of activity the item has sparked within the community of users who have access to it. In FIG. 17, there are three numbers reported for each item—the number of views 1701, the number of respots 1702, and the number of downloads 1703. A "respot" is a decision by one user to republish an item they find of interest into one of their own collections. Similarly, if users have commented on the item, a selection of those comments 1704 are also included in the feed. These user signals are shown in the feed to help users assess how useful the community has found the item to be. As is detailed below, in addition to the signal that is shown to other users, many other signals can be used to compute the interest graph.

In addition to the business content itself, the feed can also be used to recommend users whose activities may be of interest and collections of items that seem relevant. In FIG. 17, there is an entry in the feed containing such suggestions 1705.

The feed can be presented to users through a Web experience, as shown in FIG. 17, as an online or offline custom application experience on a PC or on a device (such as a phone or tablet), via push mechanisms like email or instant messaging, or in other social networks (such as Twitter, Yammer, Pinterest, or Facebook), and other outlets.

In some examples, the feed is implemented in the system as follows:

Determine which items are accessible to the user. This process may be performed using a software package, such as the Lucene software library. As described below, Lucene computes and uses an index that references every item in the system and enumerates the set of people who have access to them. The set of items accessible to the user is the candidate set.

Run a computation (i.e., a subroutine) called Item Ranker (described below) on the candidate set to assign an overall rank to each item. The computation relies on the interest graph to compute a rank for each item indicating how interesting it is expected to be to the current user (i.e., the user for whom the feed is generated).

Note that the activity counts used by ItemRanker, which are stored in the ItemScore data structure, are multiplied by a fractional value each day. This has the effect of causing older actions to be weighted less than more recent ones (with the scaling having an exponential effect based at least in part on the age in days of the activity). The fractional value determines how quickly the usefulness of older activity attenuates. There are many other algorithms that could be used, including (but not limited to) using a fixed linear scale factor based at least in part on the age of the activity, discarding data that is older than a certain window of time, or attenuating the data for a fixed period of time and treating all older activity as equal in weight and hence in importance.

Present the resulting items to the user, sorted in overall rank order (highest value first).

1. Result Deduplication

It is very common for the same item to appear many times across the internal networks of an organization. If that item is of strong interest to the user, it could easily appear many times in the feed, "polluting" the feed. To prevent feed pollution, the system identifies when two items are identical (even if they have been separately copied into different collections of information and/or given different filenames) and will only present such items once in the feed.

In some examples, the system implements de-duplication as follows:

As the contents of items are indexed, a hash code is computed for each item based at least in part on its contents (see below for details). This hash code is, with high probability, unique across all the items.

As the items are ranked for presentation in the feed using the interest graph, identical items are combined (grouped), though their individual ranks are recorded. When the ranked results are presented, the system presents the single item with the highest rank.

2. Other Potential Uses

There are a number of other ways that the feed can be used and the interest graph powering it can be enhanced.

Augment the interest graph computation with real-time feedback. Regularly adjust the algorithms used to compute the interest graph and the weightings based at least in part on the effect on user behavior. For example, divide the user community into groups (commonly called cohorts), present the results of different weights or algorithms to the different groups, and adjust the system based at least in part on the most successful approach.

Track more granular user behavior. Follow the mouse movements of a user to get additional information about their interests.

Voting and reputation. By providing ways for users to vote on the contributions of others, it is possible to build up additional social relationships (based at least in part on the person who votes and the contributor they are responding to) and additional signal (regarding the influence of a particular user).

Rank subsets of an item. Based at least in part on the sections of video that other users have watched or otherwise interacted with, and the affinity of the current user to the other users, the system could identify and present the sections within the video most likely to be of interest. Similarly with other media types, like audio, or with components of structured documents, like a CAD diagram. Similarly, it might rank the pages of a document or the slides in a presentation in terms of which are most likely to interest the user. These ranks could be used to create a digest (summary) of the item that is faster for users to review, such as a "highlights" synopsis of a video, or a summary document.

Present derived information. In addition to indexing the contents of an item, the system could apply a variety of computations that derive new information based at least in part on the content, and apply the interest graph to presenting that derived data. For example, it might do voice recognition of an audio or video stream and present the text that it has computed. It might do a dependency analysis on a CAD diagram and include dependent components in the feed, even if they are not present in the original diagram. Each of the derived items may be treated as a separate content item for ranking and affinity calculation purposes.

Incorporate additional sources of social graph information. The patterns of email for each user can indicate the topics that they are interested in and the people they most frequently interact with. The interest graph could be enhanced by performing content and traffic analysis on email and on aliases that have been set up by users to communicate with each other. Another example is the user directory. Many organizations maintain directories that maintain the membership of users in groups and the relationship between groups. A common example is Active Directory. Such directories are used to enforce access permissions, set up email aliases, and a variety of other purposes. There are also HR and payroll systems that capture relationships among users as well. Another source of information is on-premise server systems. For example, by looking at the permission sets for file systems and the access patterns, additional social information would be available that is similar to what the system tracks internally. Another potential source is public social networks outside of the organization (such as Facebook, Twitter, Instagram, and the like). All of these systems have information about the social graph that could be incorporated into the interest graph. For example, if one user "follows" another person in the company on Twitter, that can be treated similarly to following somebody within the system and incorporated into the interest graph. Likewise when two people are "friends" on Facebook, or otherwise connected on a social networking site, this connection can be included in the interest graph. As another example, comments by one person on an item posted by another, which is similar to commenting on an item published within the system, can be incorporated into the interest graph.

Use role/title information. If users are assigned roles or titles, either by self-selection or by the company, those with similar roles and titles are likely to have some interests in common—another signal that can be incorporated into the interest graph.

Identify similar items as well as true duplicates. Often items are related but not identical. For example, a slide deck that contains some of the same slides as another, but reordered or intermixed with others. Or, a document that has been modified, but much of the substance is the same. Similarity could be used to do more aggressive deduplication, or to identify when content is related, or to identify when users have similar interests because they interact with similar documents as well as identical ones. Another option is to offer users the ability to construct new content from pieces of existing ones. For example, assembling a presentation from slides that come from multiple existing decks. This would reveal the relationships between the assembled and original decks, and would give additional signal on which slides of a presentation are the most valuable.

Additional types of content analysis. There are a variety of ways to analyze content to reveal information that would be useful for the interest graph. For example, performing facial and feature recognition of images. The analysis could be used to find items that are about related topics. Facial recognition could be used to compare content images to user profile pictures, to identify content that is about people in the system.

Target advertisements and promotional offers. The system may target offers to users based at least in part on their activities and interests (e.g., the items they are currently browsing). These might be sponsored by the organization they work for, by a partner, or by outside companies. For example, a company might allow vendors to compete for or purchase the right to market services to employees. Similarly, there might be a facility for "sponsoring" particular items and ranking sponsored items higher, highlighting sponsored items visually, indicating the nature of the sponsorship, and so on. Such sponsorship might be done manually, by an algorithm, by a business rule, by an expert system.

J. Searching

One of the most common ways that users look for information online is to type a query into a search box. The system uses the query to identify a candidate set of items, collections, and people that match it, attempt to rank order those candidates based on what is most likely to satisfy that user's request, and present the results. The system uses the interest graph to support search across items within a particular company and between multiple companies. FIG. 18 is a display page 1800 illustrating a query and results page in accordance with some embodiments of the disclosed technology. In this example, a search and the set of results that have been returned by the system are displayed. In this example, a user has performed a search for "vpn" and the system has identified 31 results, including "Daewoo Engineering and Construction Deploy's Korea's Largest SSL VPN" 1810 and "Juniper Networks Enables Secure Remote Access For the Thai Technology Institute" 1820. The results are ranked based on how likely they are to interest the user, as explained below. For each result, the system highlights the elements of the search phrase that matched text associated with the item.

1. Basic Search

In a basic search, the user provides a string, and the system identifies items that the user has access to and that match the string. The items may include information which has been created by another user within the same organization (which will be referred to as an internal item) or by a user from elsewhere (an external item). The system allows items to be shared within and across organizations, and for their access to be restricted to particular sets of people.

In some examples, basic search is implemented in the system as follows:

Determine which items are both accessible to the user and contain words or strings from the search query. This process may be performed using a software package, such as the Lucene software library supported by the Apache Software Foundation. As described below, Lucene computes and uses an inverted index that reports, for every lexeme in the search query, the items that contain that lexeme. This reported set of items is the candidate set of items.

Compute a textual rank for each candidate item (i.e., an item in the candidate set) based on a similarity algorithm. This rank is based on the textual contents of the items and on the search phrase.

Run a computation (i.e., a subroutine) called Item Ranker (described below) on the candidate set to assign an overall rank to each item. The computation relies on the interest graph and the textual rank to compute the overall rank.

Present the resulting items to the user, sorted in overall rank order (highest value first).

2. Search Completion

Figure 19A:
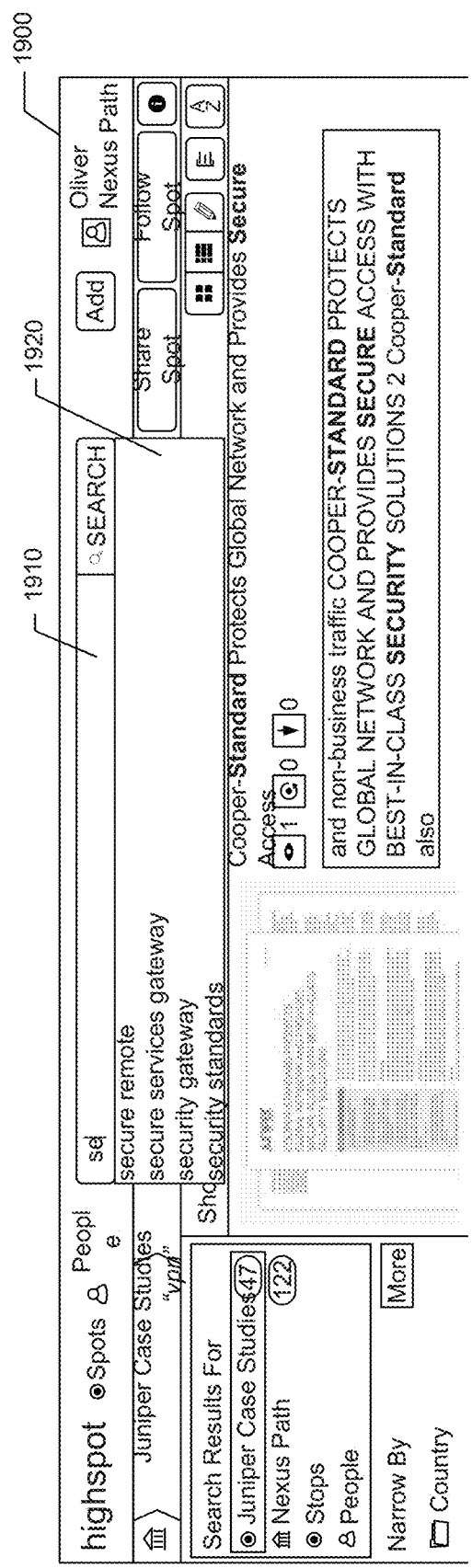
FIG. 19A is a display page illustrating a search completion feature.

Search completion is a feature that shows possible search queries while the user is typing in the search box (see FIG. 19A for an example). FIG. 19A is a display page 1900 illustrating a search completion feature in accordance with some embodiments of the disclosed technology. In this example, a user has typed "se" in the search box 1910 and the system has shown "secure remote," "secure services gateway," "security gateway," and "security standards" as possible search queries 1920. Search completion is a very useful shortcut for users, showing them search queries that are likely to be relevant and that have a good probability of yielding useful results.

In some examples, search completion is implemented in the system as follows:

As the user types, the system passes the partial search query to a computation called Completion Ranker (described below). Completion Ranker returns a ranked set of search completions that are most likely to be of interest to the user, based on the behavior of other users in the system and on the information in the interest graph.

Present the ranked set of completions to the user in a dropdown.

3. Search Completion with Counts and Groupings

Figure 19B:
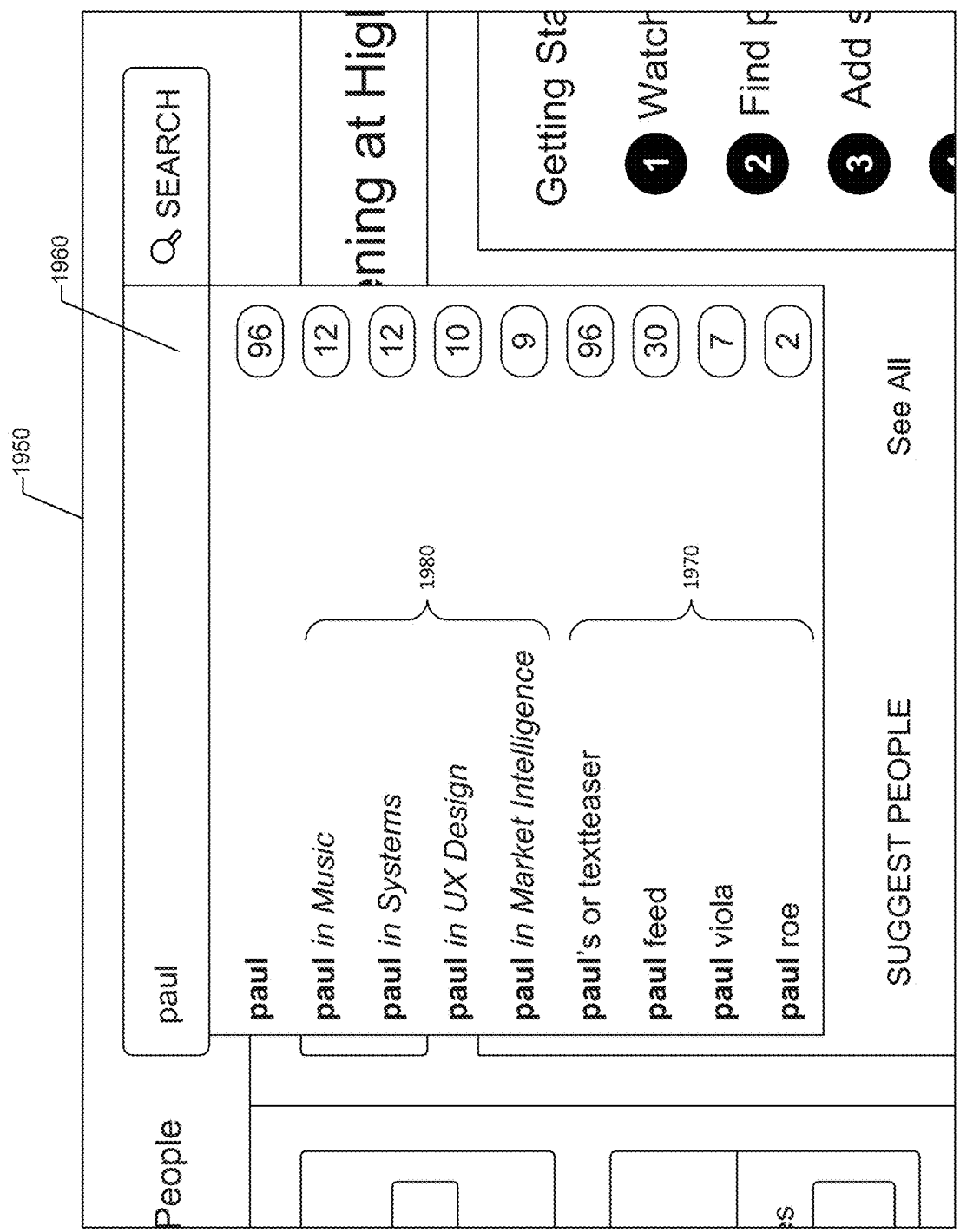
FIG. 19B is a display page illustrating a search completion and number of results feature.

Additionally, the set of the completions can include information about the number of results that would be returned by each query. This information can help the user to formulate a query that will return a satisfactory number of results. Additionally, some of the completions can include a speculative scoping of the search to a user specified collection, such as a spot. For example, for the query {vision}, one suggestion could be {vision in the Benefits Spot (5 docs)}. Selecting this suggestion will return the 5 documents that are contained in this spot. Similarly, the scope can a single user or group of users. For example {sql} could yield {sql by Robert Wahbe (20 docs)}. Selecting this would show the 20 docs uploaded by Robert that contain the term sql. FIG. 19B is a display page 1950 illustrating a search completion and "number of results" feature in accordance with some embodiments of the disclosed technology. In this example, a user has typed "paul" into search box 1960 and the system has shown "paul's or textteaser," "paul feed," "paul viola," and "paul roe" as possible search queries and their corresponding number of results (i.e., 96, 30, 7, and 2) 270. The system has also shown the number of results of "paul" in various collections, such as "Music" {12}, "Systems" {12}, "UX Design" {10}, and "Market Intelligence" {9} 1980.

4. De-Duplicate Search Results

Figure 20:
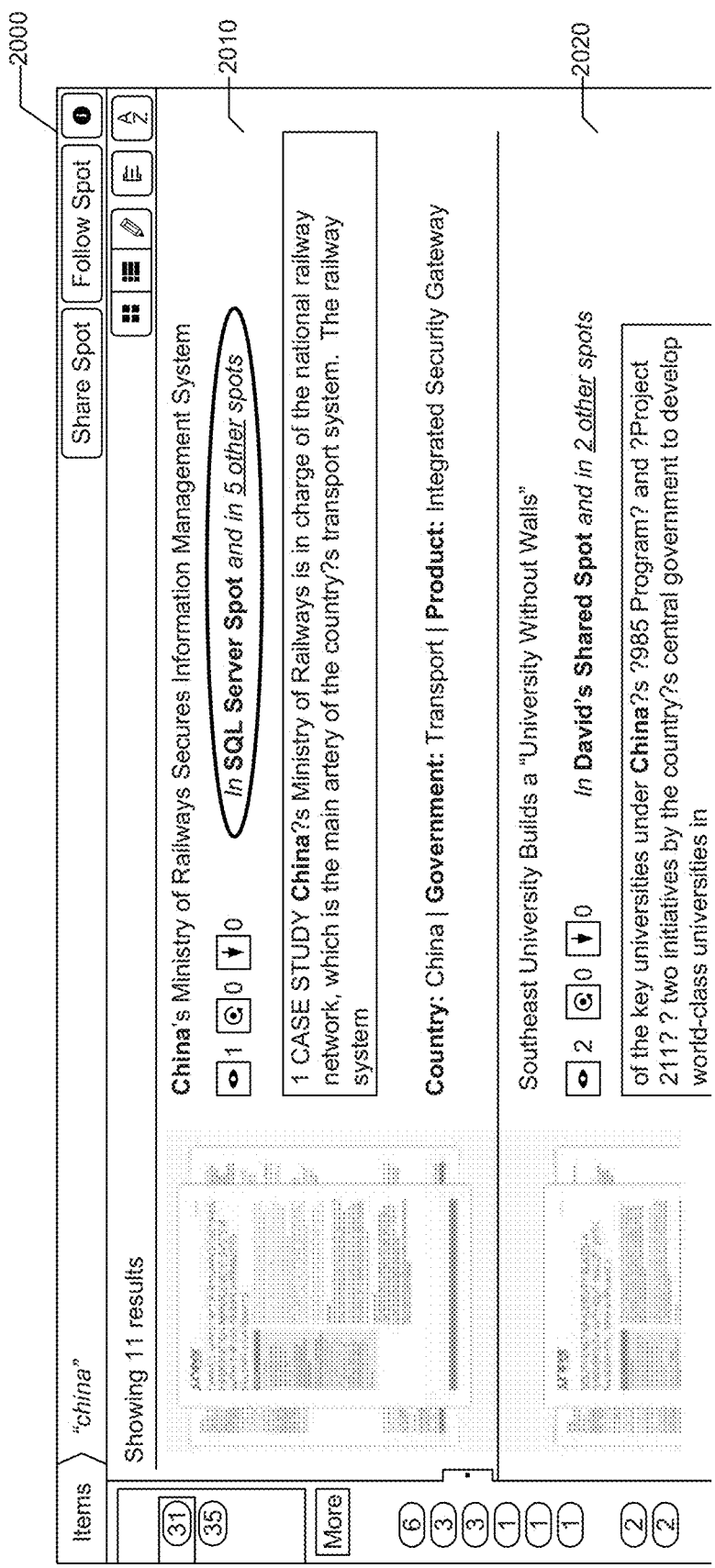
FIG. 20 is a display page illustrating de-duplication of identified search results.

For business information, it is common that the same item appears many times in many different collections of items. For example, a particularly useful presentation might be placed in an official repository, downloaded and emailed to many people, and then posted to a variety of different collections. The system identifies cases where an item has been duplicated, combines those into a single item in the results presented to the user, and uses the interest graph to choose the one most likely to interest that user. FIG. 20 is a display page 2000 illustrating de-duplication of identified search results in accordance with some embodiments of the disclosed technology. FIG. 20 shows a search that has found at least two duplicated items ("China's Ministry of Railways Secures Information Management System" 2010 and "Southeast University Builds a 'University Without Walls'" 2020) and combined each set of duplicated items into a single instance.

Figure 21:
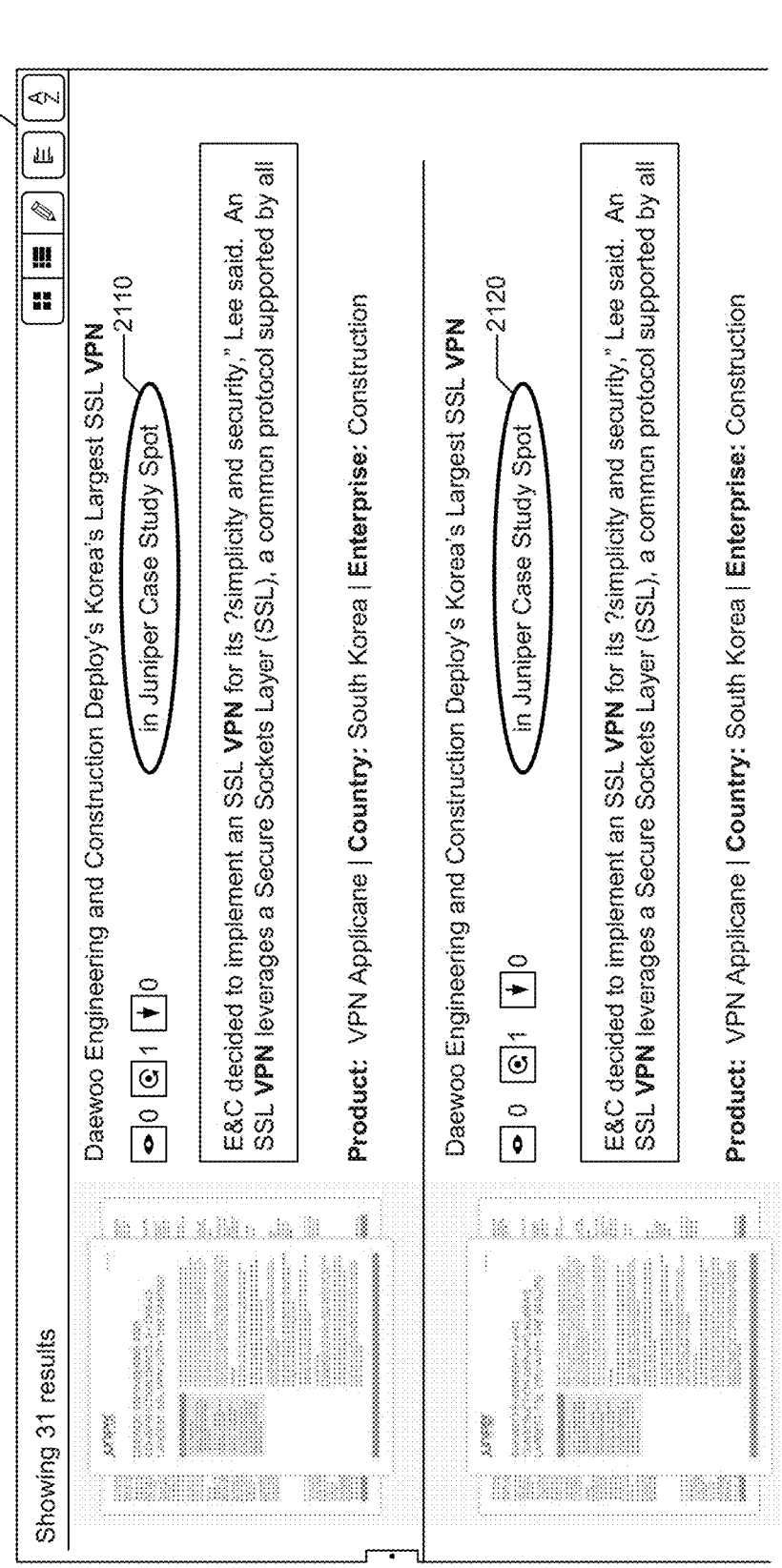
FIG. 21 is a display page illustrating the expansion of duplicated search results.

FIG. 21 is a display page 2100 illustrating the expansion of duplicated search results in accordance with some embodiments of the disclosed technology. FIG. 21 shows how a single item ("Daewoo Engineering and Construction Deploy's Korea's Largest SSL VPN") can be expanded to show the copies and, for example, each copy's location 2110 and 2120.

In some examples, the system implements de-duplication as follows:

As the contents of items are indexed, a hash code is computed for each item based on its contents (see below for details). This hash code is, with high probability, unique across all the items. When two items have matching hash codes, they are noted in the inverted index as having identical contents.

As the items are ranked using the interest graph, identical items are combined (grouped), though their individual ranks are recorded. When the ranked search results are presented, the system presents the single item with the highest rank (as shown in FIG. 20).

If the user requests it, the system expands the collapsed items to show duplicated matches, still ranked in order of likelihood to interest the user based on the interest graph.

5. Other Potential Uses

There are a number of other ways that the interest graph can power improved search behavior:

Rank subsets of an item. Based on the sections of video that other users have watched, and the affinity of the current user to the other users, the system can identify the sections within the video most likely to be of interest. Similarly, with other media types, like audio, or with components of structured documents, like a CAD diagram, the system can identify a section or sections thereof most likely to be of interest to a particular user. Similarly, the system might rank the pages of a document or the slides in a presentation in terms of which are most likely to interest the user based on the extent to which users have viewed portions thereof.

Search for derived information. In addition to indexing the contents of an item, the system can apply a variety of computations that derive new information based on the content, and apply the interest graph to searching that derived data. For example, the system can perform voice recognition of an audio or video stream and search the text that it has computed via the voice recognition. The system may perform a dependency analysis on a CAD diagram and include dependent components in the search operation, even though they are not present in the original diagram. The system may perform image recognition and search for the names or characteristics of objects and people that have been recognized.

Instant search. The system can present search results incrementally as the user is typing, rather than waiting for them to specify a full query.

Semantic search. Search queries can be semantically analyzed using techniques like latent semantic analysis and a variety of natural language processing algorithms that perform operations, such as relationship extraction, named entity recognition, and the like. Then, the system can do specialized operations appropriate for a particular domain or a particular semantic concept. For example, if the system determined that a search applied to a set of legal cases, it might automatically detect references to legal precedents and search through them as well as through the case itself. In manufacturing, the system could identify that a number was a reference to a part and extend its search to include the supporting information for that particular part.

K. Sharing

This disclosure describes the creation and use of an interest graph within a company, and between companies, to support sharing information (e.g., business information) via search, browsing, discovery, and measuring consumption, engagement, and influence based at least in part on that information. A piece of information is "consumed" when, for example, a user views the piece of information, such as a content item. "Engagement" measures user activity against the item—sharing it, adding it to another item collection, commenting on it, and so forth. The amount of "influence" of a user can be measured in a variety of ways. For example, one approach is to count the number of "followers" a person has—the other users who have asked to be notified when the user performs actions like commenting on a document. An interest graph expresses the affinity among people and information (for example, user-user affinity, user-item affinity, and/or item-item affinity)—the likelihood that a particular piece of information is of interest to a particular person. The information might be a document, a presentation, a video, an image, a web page, a report, or the like. The information might also be a collection of items, or a link to a collection of items or to a person. The interest graph is based at least in part on an understanding of relationships, monitoring of user behavior, and analysis of each piece of information. In some examples, there are three steps for computing the interest graph. The first step is to generate the data; the system provides mechanisms for the user to quickly browse, share, and organize information. By using those features, the users create a large amount of data, much of which is currently unavailable inside of a company. The next step is to gather the data, where the system logs user activities in a set of data structures. The third step is to compute the interest graph. By running a series of computations over the information gathered from users, the system computes data structures that are used for a variety of ranking operations. The disclosed techniques honor access restrictions that users specify for each item, so that only authorized people will see any piece of information.

1. Share Via Search

Figure 22:
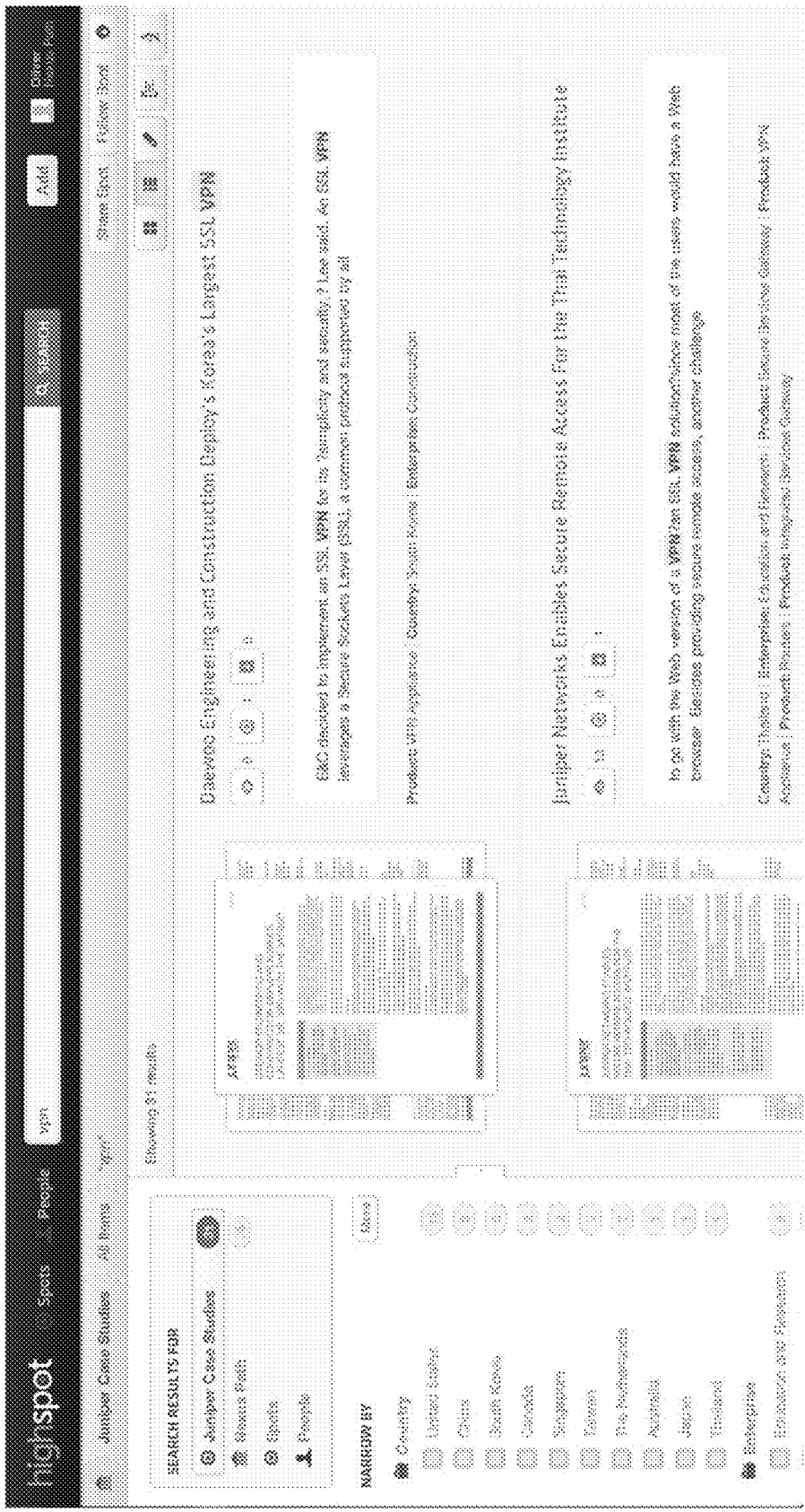
FIG. 22 illustrates how the disclosed system allows a user to provide a search query and retrieve the most relevant items in accordance with an embodiment of the present technology.

Search is a common means by which users find items that have been shared with them. FIG. 22 illustrates how the disclosed system allows a user to provide a search query and retrieve the most relevant items in accordance with an embodiment of the present technology. The system first identifies those items that match the query, and then ranks them based at least in part on how relevant the item is for that query and to that user. In this example, the user has searched for the query string "vpn", and the system has returned items that contain some reference to that phrase (e.g., an exact match or a partial match), ranked by relevance. Where possible, the system will include a highlighted set of text showing where in the description or contents of that item the query string appeared.

In some examples, ranking of items for a search query is implemented in the system as follows:

Determine which items are both accessible to the user and contain words from the search query. This process may be performed using a software package, such as the Lucene software library. As described below, Lucene computes and uses an inverted index that reports, for every lexeme in the search query, the items that contain that lexeme. This set of items is the candidate set of items.

Compute a textual rank for each candidate item based at least in part on a similarity algorithm. This rank is based at least in part on the textual contents of the items and on the search phrase.

Run a computation (i.e., a subroutine) called Item Ranker (described below) on the candidate set to assign an overall rank to each item. The computation relies on the interest graph and the textual rank to compute the overall rank.

Present the resulting items to the user, sorted in overall rank order (highest value first).

2. Share Via Browsing

Figure 23:
FIG. 23 shows a spot home page, which is the default view in the system when a user visits a spot in some embodiments.

In order to find useful and compelling content online, the system allows users to browse through organized collections of content. In the system, collections are called "spots," which can be further organized by placing content items into spotlists. A content item can be placed into any number of spotlists. The user navigates by choosing a collection by, for example, viewing a directory of spots, finding a link to the collection on another spot, having the system suggest it to them, searching, having a link shared with them by another user, and so on. Users can either look at the spot as a whole, or can look at a sub-collection by choosing a spotlist or a folder. FIG. 23 shows a spot home page, which is the default view in the system when a user visits a spot in some embodiments. On the lower left, under the word "Browse", a set of spotlists and folders are presented. For example, the spotlist "Implementor" is a spotlist with 48 items in a folder called "Audience". If the user clicks on a spotlist (e.g., "Implementor," "Decision Maker," "Proof of Concept"), only the items in that list are shown.

At any given time, there is a current set of results, and these are by default presented to the user in relevance order. That order is computed by the interest graph, as described below. It is customized for each user, and is ordered based at least in part on what the system knows about that user's interests.

The browsing experience can be presented to users through a Web experience, as shown in FIG. 23. It can also be presented as an online or offline custom application experience on a PC or on a device (such as a phone or tablet).

In some examples, the ranking of items during browsing is implemented in the system as follows:

Determine the set of items in the current result set. This may be based at least in part on the user choosing to look at a collection of items (in the system, this is done by visiting a particular spot), or a subset of items (by clicking on a spotlist or folder), or performing a search operation. In the example shown in FIG. 22, the user can also use the selector ("All Items") in the upper left of the screen to see all the items, only the ones that were last added, or all the ones added during the past week.

Run a computation (i.e., a subroutine) called Item Ranker (described below) on the result set to assign an overall rank to each item. The computation relies on the interest graph to compute a rank for each item indicating how interesting it is expected to be to the current user.

Present the resulting items to the user, sorted in overall relevance rank order (highest value first).

3. Share Via Discovery

Figure 24:
FIG. 24 shows an item feed, a sequence of items and how users have interacted with them, in accordance with an embodiment of the disclosed technology.

Another way that users find information that has been shared with them is via discovery. The system automatically suggests items that a user is likely to find interesting, based at least in part on what it knows about the user. FIG. 24 shows an item feed, a sequence of items and how users have interacted with them, in accordance with an embodiment of the disclosed technology. For example, the item at the top of the third column has been viewed 25,000 times (the number next to the icon shaped like an eye), has inspired five comments, and so forth. Also note in the upper left area of the feed, the system suggests people and spots (collections of items) that may be of interest.

In some examples, the system determines what to put in the feed as follows:

Determine which items are accessible to the user. This process may be performed using a software package, such as the Lucene software library. As described below, Lucene computes and uses an index that references every item in the system and enumerates the set of people who have access to them. The set of items accessible to the user is the candidate set.

Run a computation (i.e., a subroutine) called Item Ranker (described below) on the candidate set to assign an overall rank to each item. The computation relies on the interest graph to compute a rank for each item indicating how interesting it is expected to be to the current user.

Present the resulting items to the user, sorted in overall rank order (highest value first).

4. Measuring Consumption, Engagement, and Influence

Figure 25:
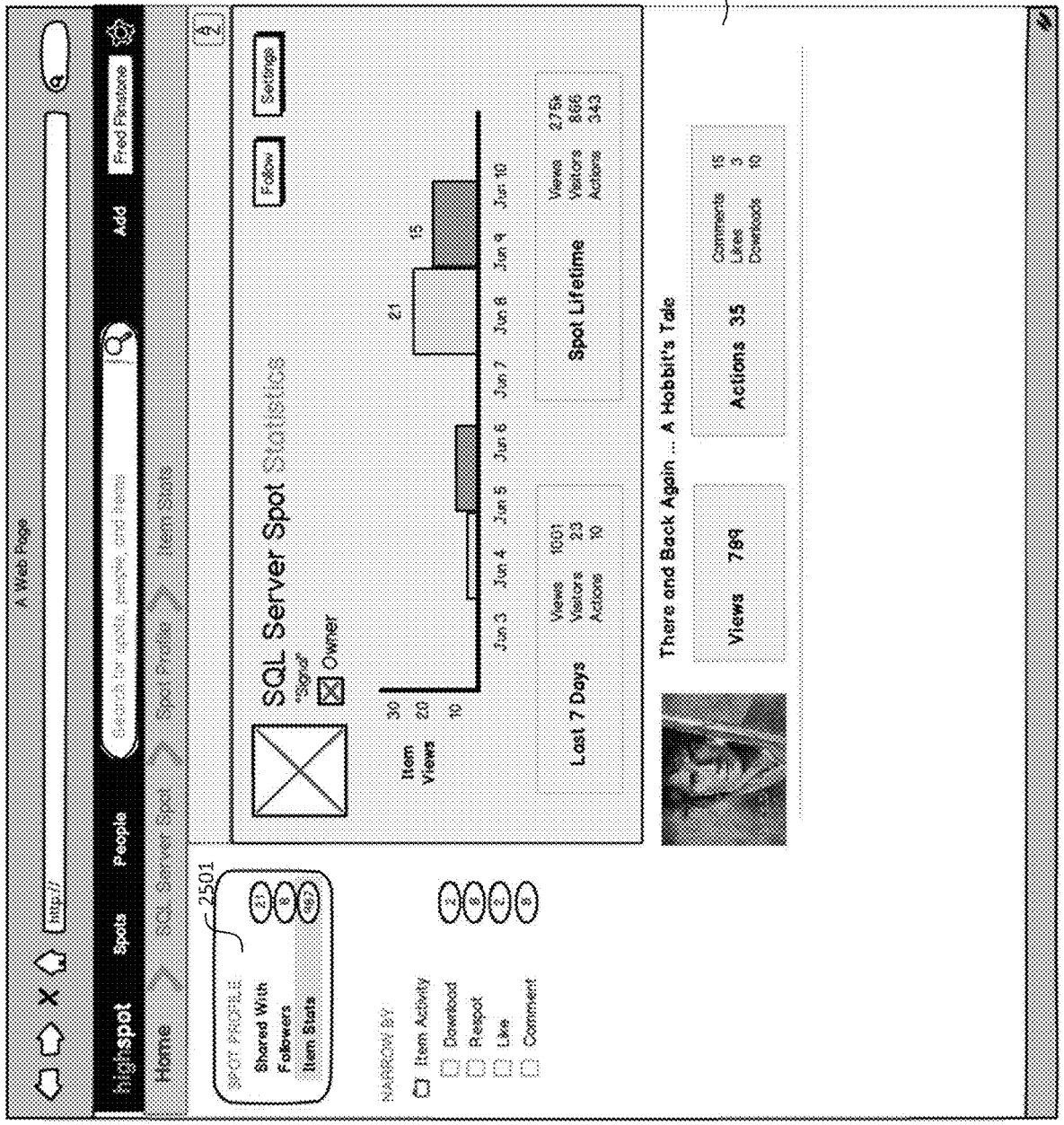
FIG. 25 shows statistics for a collection in accordance with an embodiment of the disclosed technology.

In some embodiments, the disclosed system allows a publisher to measure the degree to which shared items have been consumed, how engaged members of the community are around the information, and how much influence community members based at least in part on information sharing. FIG. 25 shows statistics for a collection in accordance with an embodiment of the disclosed technology. The summary header 2501 indicates how much activity has been generated by this collection. For example, the spot for the profile shown indicates that the spot has been shared 21 times, has 8 followers, and 987 stats. Additionally, items from this collection have been viewed 1001 times in the last 7 days and 275,000 times over the lifetime of this collection, or spot. Furthermore, this spot has been shared with 21 users. Rows below the summary header show items in the collection and how much activity each has garnered from the group of users with permission to access it. For example, row 2502 shows that the item labeled "There and Back Again . . . A Hobbit's Tale" has been viewed 789 times and that 35 actions have been performed with respect to this item, including 15 comments, 3 likes, and 10 downloads.

Figure 26:
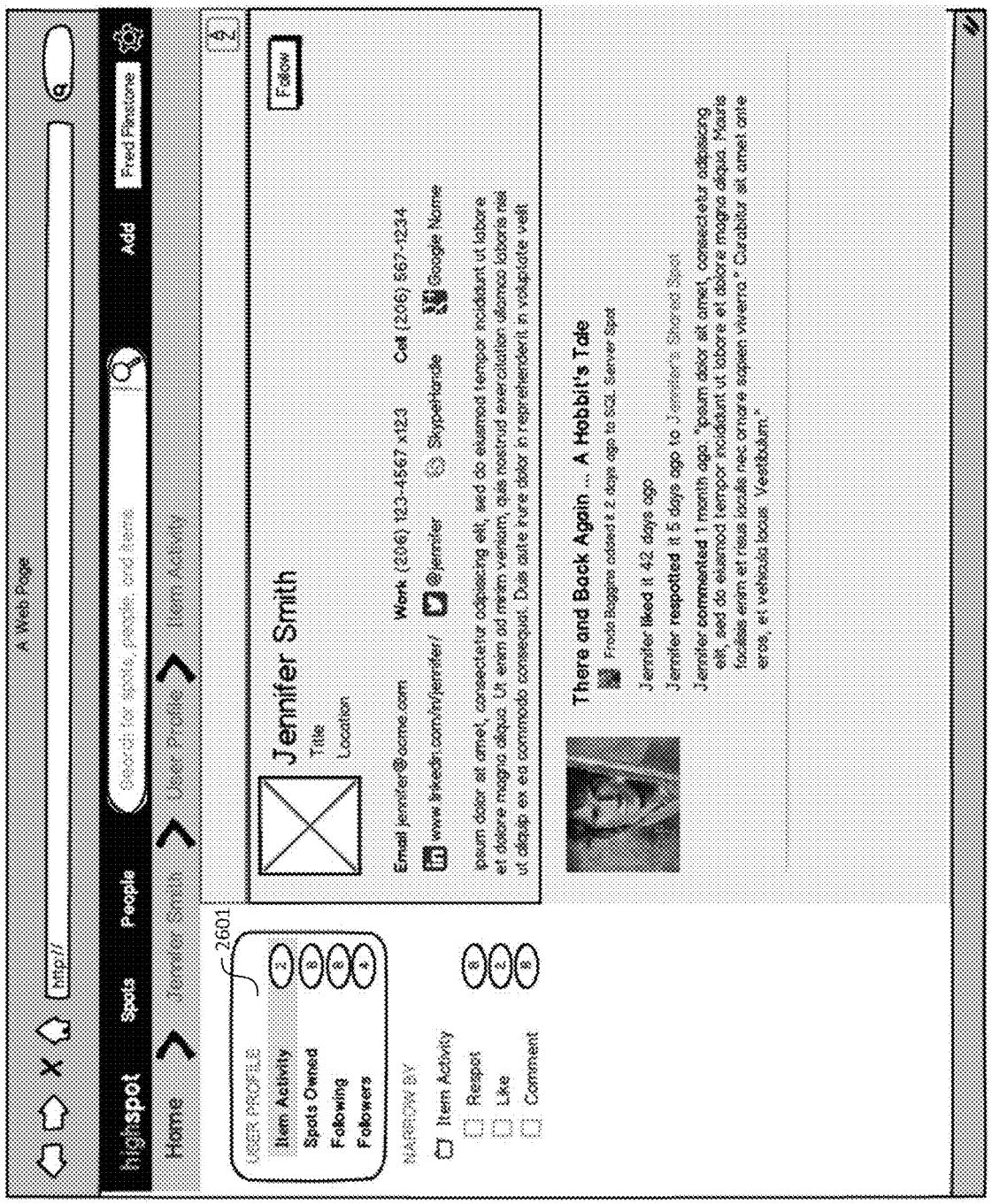
FIG. 26 shows statistics for an individual in accordance with an embodiment of the disclosed technology.

FIG. 26 shows statistics for an individual in accordance with an embodiment of the disclosed technology. The summary header 2601 shows a basic measure of the community influence and engagement that the corresponding user has (e.g. how many followers the user has and how many other users the user follows). Rows below the summary header show the activities they have performed on various items (which they have commented on, etc.), such as likes, respots, and comments. In addition to the basic statistics, the system may also compute complex measures of influence.

In some examples, the system measures these statistics as follows:

Using the ItemScore data structure (described in detail below), report all activities performed by a particular user on any item. These are captured by the values in the row U=current user ID (i.e., a row corresponding to a particular user). The system allows a publisher to sort users based at least in part on their activity, revealing the most and least active members.

Report on all activities performed by any user on a particular item by looking at the values in the column I=item ID (i.e., a column corresponding to a particular content item). This allows the publisher to determine which items are the most actively consumed and which the least. The system can sort based at least in part on total number of activities or any particular type of activity (e.g. number of views, number of downloads, etc.)

Sort the list of users based at least in part on the User-Influence data structure, described below. This will identify the most and least followed and connected users in the community.

5. Other Potential Uses

There are a number of other ways that the system can support sharing and the interest graph powering it can be enhanced.

Auto-categorize content. Based at least in part on content analysis and behavioral information, the system could suggest which items have affinity for one another (e.g., items for which interactions are often correlated, items that are regularly viewed together or in sequence, and so on) and hence would make sense to categorize together. The system could also automatically categorize content without user involvement.

Identify characteristics of high and low value content. The system could do feature analysis to discover what popular items (or unpopular items) have in common and report those commonalities to a user to help the user determine what to share. For example, type of item (presentation vs. document vs. video), length of item, language complexity, role of author, level of categorization, language, or other measurable characteristics. The analysis can be segmented by audience—users in a certain location, or with a certain title, or belonging to a certain group.

A/B testing. The system could allow publishers to set up sharing in different ways and measure effectiveness. There might be multiple versions of an item, or multiple ways to organize items. By presenting these different options to different subsets of the users (one subset would be shown the "A" version, and other would see "B"), the publisher could determine which option led to the greatest level of engagement by users.

Versioning and expiration. By detecting when items have identical or similar content (e.g. two presentations with multiple slides in common, or a document that shares most of its content with another), the system can detect that one item has been updated or has expired and hence the related ones may also be out of date or may need to be updated as well. For identical items, it could update all copies of the content automatically.

Recommended sharing. Based at least in part on the content of an item or a collection of items, and the relationships among users, the system could recommend people to include in permission lists for collections. It could also recommend whom to share individual items with.

Identify missing content needed by the community. By looking at the most common search queries that have yielded few to no results, or yielded results that have had few to no views, the system can identify unsatisfied needs of the community. A lack of search results often indicates that the needed material is missing or poorly organized. Where users are not clicking through and consuming the results, the items available may not be satisfying user needs.

Optimize the interest graph computation with real-time feedback. Constantly adjust the algorithms used to compute the interest graph and the weightings based at least in part on the effect on user behavior. For example, divide the user community into groups (sometimes called cohorts), present the results of different weights or algorithms to the different groups, and adjust the system based at least in part on the most successful approach.

Track more granular user behavior. Follow the mouse movements of a user to get additional information about their interests.

Voting and reputation. If users vote on the contributions of others, the voting patterns resemble commenting patterns, and can be added into the data structures that track interactions between users and measure the influence of a user on others in the community. For example, if one user votes for the contribution of another, the system can treat that the same way as making a comment. Each such vote represents an additional amount of influence that can be added to other indications, such as the number of followers they have or the number of times others commented on an item that a user uploaded.

Rank subsets of an item. Based at least in part on the sections of video that other users have watched or otherwise interacted with, and the affinity of the current user to the other users, the system could identify and present the sections within the video most likely to be of interest. The same idea can be applied to other media types. For example, the system could identify and play parts of an audio stream. It could identify components within a structured document, like a CAD diagram, to find the parts that are likely to be of most interest. It could rank the pages of a document or the slides in a presentation based at least in part on what is most likely to interest the user. These ranks could be used to create a digest (summary) of the item that is faster for users to review, such as a "highlights" synopsis of a video, or a summary document.

Present derived information. In addition to indexing the contents of an item, the system could apply a variety of computations that derive new information based at least in part on the content, and apply the interest graph to presenting that derived data. For example, it might do voice recognition of an audio or video stream and present a transcript as well as the item. It might do a dependency analysis on a CAD diagram and link to dependent components, even though they are not present in the original diagram.

Incorporate additional sources of social graph information. The patterns of email for each user indicates the topics that they are interested in and the people they most frequently interact with. The interest graph could be enhanced by performing content and traffic analysis on email and on aliases that have been set up by users to communicate with each other. Another example is the user directory. Many organizations maintain directories that maintain the membership of users in groups and the relationship between groups. A common example is Active Directory. Such directories are used to enforce access permissions, set up email aliases, and a variety of other purposes. There are also HR and payroll systems that capture relationships among users as well. Another source of information is on-premise server systems. For example, by looking at the permission sets for file systems and the access patterns, additional social information would be available that is similar to what the system tracks internally. Another potential source is public social networks outside of the organization (such as Facebook, Twitter, Instagram, and the like). An organization includes a structured body of users with associated roles within the organization and who have access to the information items within the organization. All of these systems have information about the social graph that could be incorporated into the interest graph. For example, if one user "follows" another person in the company on Twitter, that can be treated similarly to following somebody within the system and incorporated into the interest graph. Likewise when two people are "friends" on Facebook, or otherwise connected on a social networking site, this connection can be included in the interest graph. As another example, comments by one person on an item posted by another, which is similar to commenting on an item published within the system, can be incorporated into the interest graph.

Use role/title information. If users are assigned roles or titles, either by self-selection or by the company, those with similar roles and titles are likely to have some interests in common—another signal that can be incorporated into the interest graph.

Identify similar items as well as true duplicates. Often items are related but not identical. For example, a slide deck that contains some of the same slides as another, but reordered or intermixed with others. Or, a document that has been modified, but much of the substance is the same. Similarity could be used to do more aggressive deduplication, or to identify when content is related, or to identify when users have similar interests because they interact with similar documents as well as identical ones. Another option is to offer users the ability to construct new content from pieces of existing ones. For example, assembling a presentation from slides that come from multiple existing decks. This would reveal the relationships between the assembled and original decks, and would give additional signal on which slides of a presentation are the most valuable.

Additional types of content analysis. There are a variety of ways to analyze content to reveal information that would be useful for the interest graph. For example, performing facial and feature recognition of images. The analysis could be used to find items that are about related topics. Facial recognition could be used to compare content images to user profile pictures, to identify content that is about people in the system. The system could automatically perform language translation on items of particular interest. Or it could create higher resolution previews, or graphical rendering/visualization of data, or create 3D images.

Proactively get ready to deliver items likely to be of interest. They might be downloaded to a device for optimized or offline access, or pre-cached in a content delivery network (CDN) for faster delivery to the browser. A group of items might be presented to the user together for faster viewing.

Target advertisements and promotional offers. Based at least in part on user activities and interests, it is possible to target offers to them based at least in part on the items they are currently browsing. These might be sponsored by the organization they work for, by a partner, or by outside companies. For example, a company might allow vendors to compete to market services to employees. Similarly, there might be a facility for "sponsoring" particular items and hence ranking them more highly or highlighting them visually (possibly indicating the nature of the sponsorship). Such sponsorship might be done by hand, by an algorithm, by a business rule, or by an expert system.

L. Skim Preview

A system and method for implementing and using a "skim preview" technique for previewing items of information quickly is further disclosed. This technique can be applied to a wide variety of information, such as presentations, documents, video, images, and so on and can be used for a variety of applications, including browsing, searching, discovery, and so on.

In some embodiments, skim preview works by tracking the movement of a cursor or other pointing mechanism (e.g., mouse cursor, touch pad cursor, finger) across an item, such as an e-book, slide presentation, and so on and, based on the location of the cursor, showing a dynamically changing preview image for the item and a progress indicator. For example, while moving from the left edge of the item to the right edge (or right to left), each small motion by the cursor could cause a preview image of the next page of the item to be rendered. Thus, by sliding all the way across the item, all (or some) the preview images of pages of the item can be seen.

Figure 27:
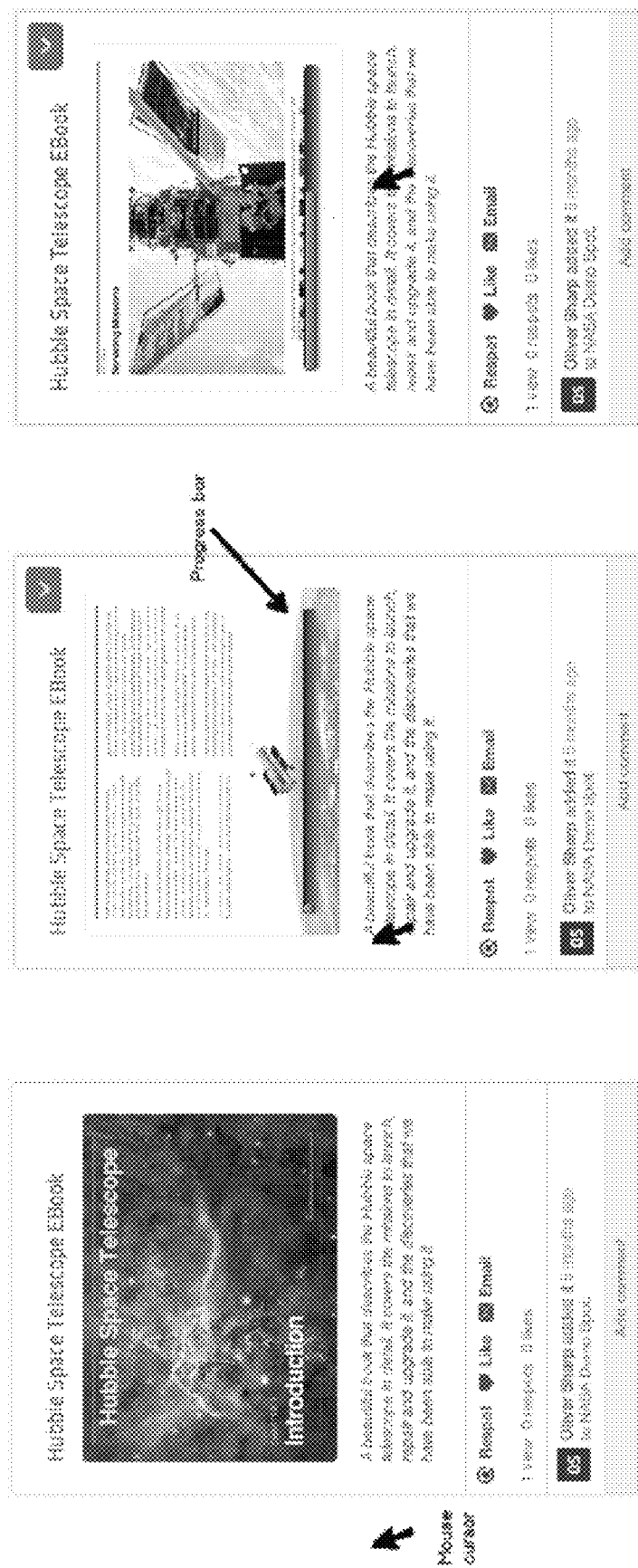
FIG. 27 is a display page illustrating three panes reflecting how skim preview works with an electronic book in accordance with some embodiments of the disclosed technology.

FIG. 27 is a display page illustrating three panes reflecting how skim preview works with an electronic book in accordance with some embodiments of the disclosed technology. In the first pane, the cursor has not yet touched the item, and the image shown is the title page. The cursor is moved to the right by the user. When the cursor touches the item in pane 2, the system computes the distance the cursor has moved from the item's left edge. Based on that computation, the system shows the preview image for a corresponding page in the document and updates the progress bar, which provides an indication of which page the user is viewing. As the user continues to move the cursor to the right, the preview image continually updates to show later pages in the book. Conversely, if moving to the left, the preview image continually updates to show earlier pages in the book. In pane 3, the user has moved more than half way across the item, and the preview image is of a corresponding page (i.e., a page more than half way through the item) and the progress bar has been updated to show how far the previewing has moved through the item. Although the example described above is from the context of an item written in a left-to-right language, one of ordinary skill in the art will recognize that the example could be adapted to skim preview items written in a right-to-left language, such that when the cursor is closer to the right of the item preview images of earlier pages of the item are rendered and preview images of later pages of the item are rendered as the cursor is moved from right to left. Similarly, the progress bar could be modified to reflect this difference in orientation.

In some embodiments, skim preview can be used to find a particular part of an item that is of interest, such as a particular page or image within the item, by moving the cursor across the item to view preview images of different parts of the item. Once the preview image of the particular part has been displayed, the user can click on that preview image to be taken to the corresponding part of the item. For example, the user could use skim preview to view preview images of presentation slides, find one corresponding to a slide of interest, then click on the preview image to open that particular slide in a full-size view.

In some embodiments, the area that is tracked for skim previewing referred to as a "skim surface." When the cursor is on or within the skim surface, movement of the cursor will be tracked and used to adjust the preview image to reflect the current position of the cursor. The skim surface can be the entire item, as shown in FIG. 27. Alternatively, the skim surface can be restricted to a part of the item, such as the bottom third of the area where the item pages are displayed, or it could be separate from the area where the item is displayed (for example, the skim surface could be above, below, or to the side of the item).

Figure 28:
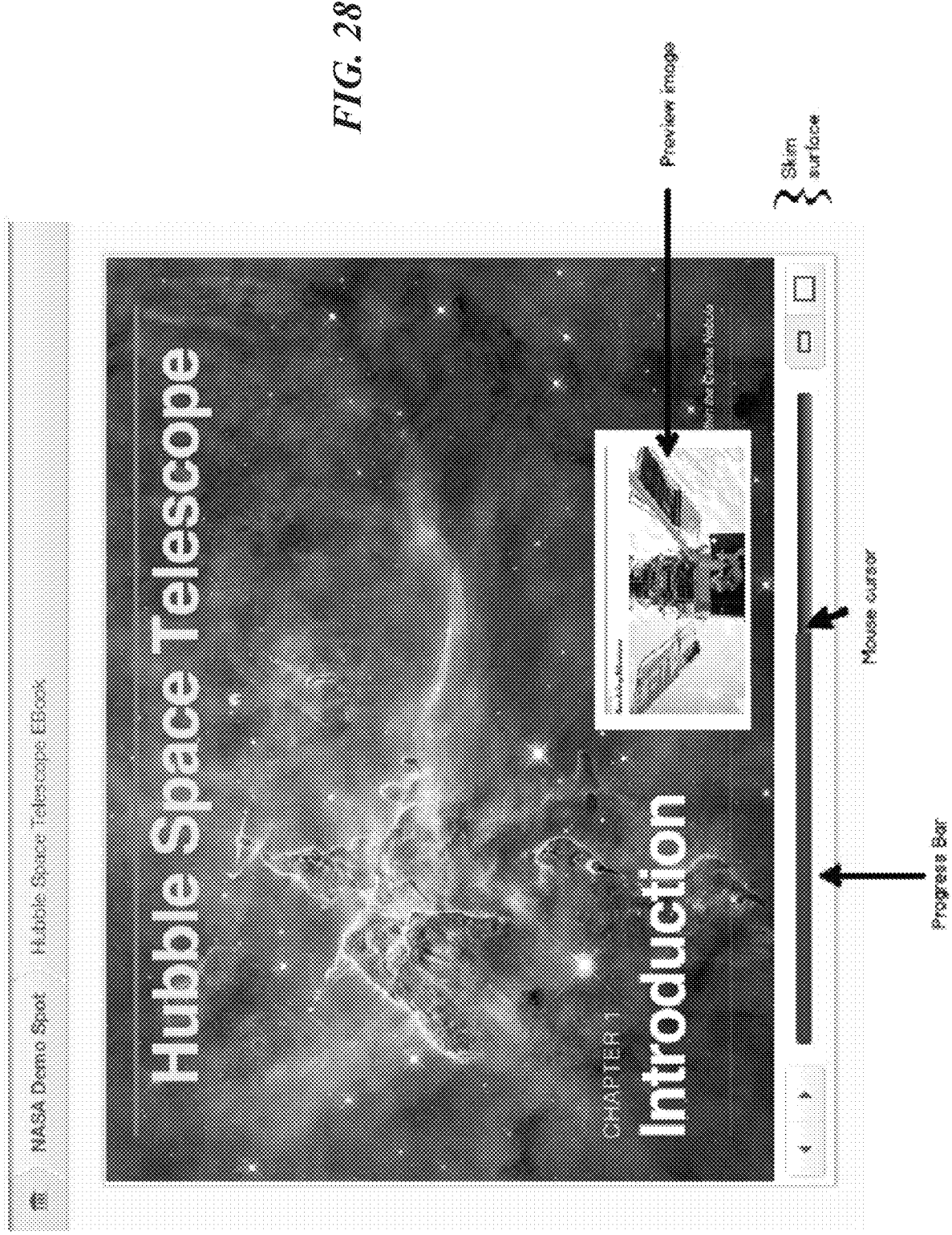
FIG. 28 is a display page illustrating previewing an item using a skim surface in accordance with some embodiments of the disclosed technology.

FIG. 28 is a display page illustrating previewing an item using a skim surface in accordance with some embodiments of the disclosed technology. In FIG. 28, a strip at the bottom of the reading experience being used as a skim surface. Sliding the cursor anywhere in the strip at the bottom causes the corresponding preview image to be displayed. When the cursor is moved from within the skim surface, movement of the cursor will not change the preview image. Thus, if the cursor is anywhere on the screen outside of the skim surface, movement of the cursor does not trigger skim preview. The preview image that is shown corresponds to the location in the skim surface where the cursor is currently positioned (or was positioned when the cursor left the skim surface). The progress bar provides an indication of where in the current item the currently displayed preview image is, relative to the current item as a whole.

1. Computing the Preview Images

To apply skim preview to an item, the system determines an appropriate set of images to show. In some embodiments, this set is:

a one-dimensional sequence, if skim preview is only supported in a single dimension (e.g., left to right and right to left (horizontally) or up and down and down and up (vertically), or, a multi-dimensional mosaic or set of sequences, if multiple dimensions are supported (e.g., left to right (and right to left) AND up and down (and down and up).

Figure 29:
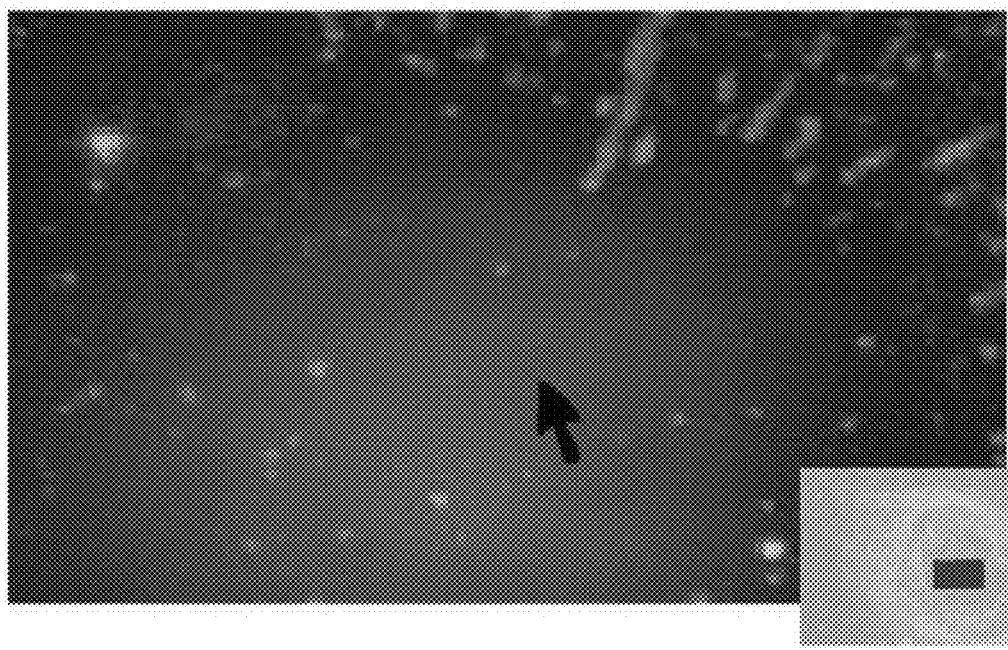
FIG. 29 is a display page illustrating a multi-dimensional skim preview in accordance with some embodiments of the disclosed technology.

FIG. 29 is a display page illustrating a multi-dimensional skim preview in accordance with some embodiments of the disclosed technology. In this example, a user can move between preview images of an item by moving, for example, the cursor left, right, up, or down. A mosaic of images could be navigated by tracking the cursor horizontally and vertically at the same time, as shown in FIG. 29. In some embodiments, an item may be split up into different sections (e.g., chapters of a book or DVD or sections of a newspaper). The disclosed system may enable a user to move between representative preview images of each section (e.g., the first page or screen of each section) by moving vertically and move between preview images of each element (e.g., page, slide, frame) or a subset of the elements of an item by moving horizontally.

For many types of content, there is a natural sequence or mosaic that can be computed from an item of information of that type. For example, in the case of a slide presentation, the natural sequence is a preview of each slide in order. Moving the cursor back and forth scrolls backwards and forwards through the slides. The sequence does not have to include every slide. For example, the system may select a subset of the slides, weighting some as being more important than others based on, for example, how frequently or how long each slide has been viewed by the users of the system.

Documents (including books, pamphlets, articles, and so forth) are naturally represented by an image of each of their individual pages but may be skim previewed using a subset of those individual pages based on weight or importance (e.g., how frequently or how long the page has been viewed by users of the system).

Videos are a sequence of still images, often a very large number of them, so it is typically appropriate to preview by sampling periodic images from that sequence (one still image per second of video (or any predetermined number of still images per unit of time), for example). As the user skims, they see an approximation of the video. They can quickly move back and forth, previewing any part of the video they are interested in.

The system can compute sequences that represent interesting visual aspects of the item being viewed. This can be applied to items that do not have a natural set of preview images, or it might be used as an alternative to the natural previews. For example, if the user were to skim over the profile image of a person, some set of images representing the history of their activity or contributions over time could be previewed. By sliding from the left to the right and right to left, the visual representation would represent a timeline. It could contain the title page of items the person has authored or uploaded, pictures that relate to the person or to the person's activities over time, comments and other contributions the person has made, and the like. Alternatively, the sequence might be the set of people the person has interacted with, the set of roles the person has had historically, and so on. The preview images may be sequenced chronologically, by importance, or based on any other metric.

For a group of people, the preview images could be the union of the images for each person in the group, or profile pictures of each member (sorted alphabetically, by order of joining the group, or by a computed metric. An example of a computed metric would be "influence", such as the number of followers the user has or the amount of activity that has happened against items that the user has added to the system.

The preview images for a collection of items might show a title page of each item in it, sorted chronologically, by popularity, based on a manual order defined by their owner, and/or by some measure of importance based on the amount of user activity that has been applied to each item in the collection. For example, the total number of times that an item has been viewed by any user, or the total amount of time that users have spent viewing the item.

For an organization (like a company or government), or a community (like a country, city, or the like), skim preview might show a historical timeline of events for the organization or community, images that represent the people that are part of those entities, a historical record of the people who led them, or an image on a map of their location or influence. For example, the skim preview for the Roman Empire might show a series of map images that represent the extent of the empire over time, so users could skim back and forth to see the growth and end of the empire over time. As another example, skimming over an image of the United States might show a portrait and some vital statistics for each President of the United States, in order of time.

Preview images for a graph might show values for different historical periods, allowing users to scan for historical trends and compare those against the current value. For example, the skim preview could display, for a particular year, a bar graph showing the lifespan distribution. Each bar graph may break out, for each decade (e.g., ages 0-9, 10-19, 20-29), the percentage of the population who lived to that range of ages. By skimming back and forth, a user could visually see how lifespan distributions have changed over time.

Preview images for an image, map, diagram, etc. might show pieces of the image, map, diagram, etc., allowing the user to examine the whole item as if they were moving a magnifying glass around to see a part of it more closely. In this case, it might be appropriate to skim both vertically and horizontally, as shown in FIG. 29. By moving the cursor up and down as well as sideways, the user can skim across a 2-D space, previewing any part of the image, map, diagram, etc.

Preview images for a web page might use a sequence (rendered horizontally, perhaps, if the page is short and wide, and vertically if it is tall and slender) or it might use a mosaic (if it is large enough to need skimming horizontally and vertically to see all of its contents).

2. Applications for Skim

Skim can be used to support a variety of user activities.

3. Browsing

Users often find information by browsing through bodies of content. A piece of content is often linked to related items, or items are grouped together. The user navigates through the items by category or by link, looking for something they are interested in. With skim preview, when an item is referenced, a small version of the item can be shown and the user can move their cursor over it to preview contents of the item.

Figure 30:
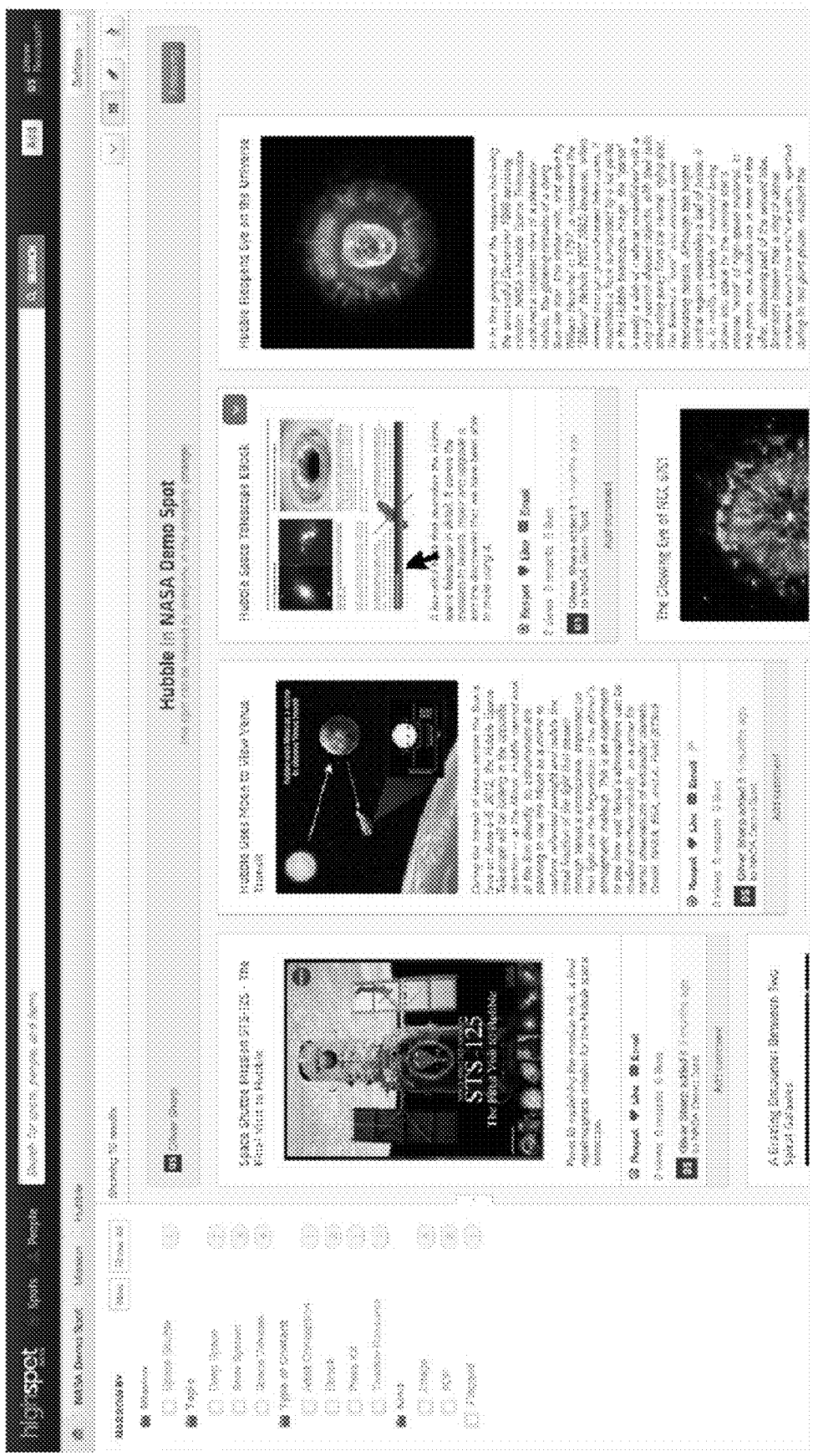
FIG. 30 is a display page illustrating skim preview applied to browsing a collection of items in accordance with some embodiments of the disclosed technology.

FIG. 30 is a display page illustrating skim preview applied to browsing a collection of items called a spot in accordance with some embodiments of the disclosed technology. The items shown are all associated with space exploration. The user has placed the cursor on a book about the Hubble space telescope to preview the contents of the book.

4. Search

Figure 31:
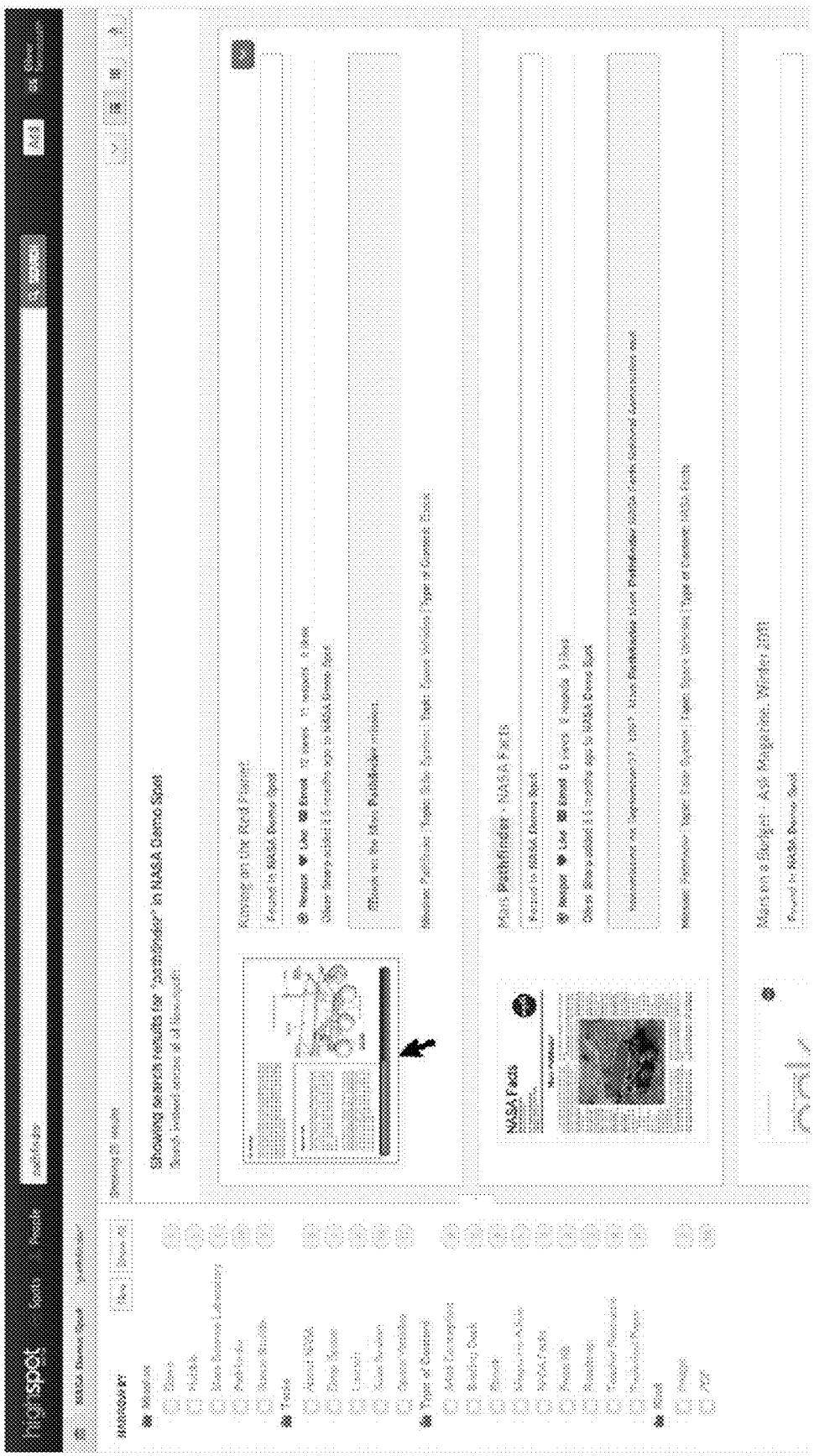
FIG. 31 is a display page illustrating skim preview in connection with search results in accordance with some embodiments of the disclosed technology.

Another way to find information is to search for it. FIG. 31 is a display page illustrating skim preview in connection with search results in accordance with some embodiments of the disclosed technology. Skim preview allows a user to preview the contents of search results, thereby providing more information than a static image and a short description can reveal. In this example, the user searched for the phrase "pathfinder", and the page shows the items that match that query. The user can move the cursor over each search result to use skim preview and preview contents of the search result.

5. Discovery

Figure 32:
FIG. 32 is a display page illustrating skim preview in connection with a feed in accordance with some embodiments of the disclosed technology.

In discovery, the system suggests item to the user that they may be interested in. Skim preview supports discovery by allowing users to see not just a thumbnail and possibly a description of an item, but they can also slide their cursor across any item and preview contents of the item. A feed is a page that is automatically populated with items that the system determines the user might find interesting based on, for example, the user's expressed interests or browsing habits or an importance of the item using, for example, techniques disclosed in U.S. Provisional Patent Application Nos. 61/745,365, 61/800,042, 61/800,322, or 61/800,497, all of which are incorporated by reference in their entireties. FIG. 32 is a display page illustrating skim preview in connection with a feed in accordance with some embodiments of the disclosed technology. In some examples, the user can skim preview any item in a feed.

6. Organizing

Figure 33:
FIG. 33 is a display page illustrating the use of skim preview to view the contents of an item of information to quickly access its contents and create metadata for the item, to aid in finding, viewing, managing, and retrieving the item in accordance with some embodiments of the disclosed technology.

When a user is sharing items with other people or creating a repository for themselves, skim preview allows them to quickly learn more about the item and figure out, for example, the best way to organize it. FIG. 33 is a display page illustrating the use of skim preview to view the contents of an item of information to quickly access its contents and create metadata for the item, to aid in finding, viewing, managing, and retrieving the item in accordance with some embodiments of the disclosed technology. In FIG. 33, the user is editing the metadata for an item (e.g., its title, description, and so forth) and is assigning the item to lists and folders that collect related information together. The user can use skim preview to preview contents of the item to determine, for example, who the author of the item is, the title of the item, how to organize the item based on its contents, and so on.

7. Analyzing

Figure 34:
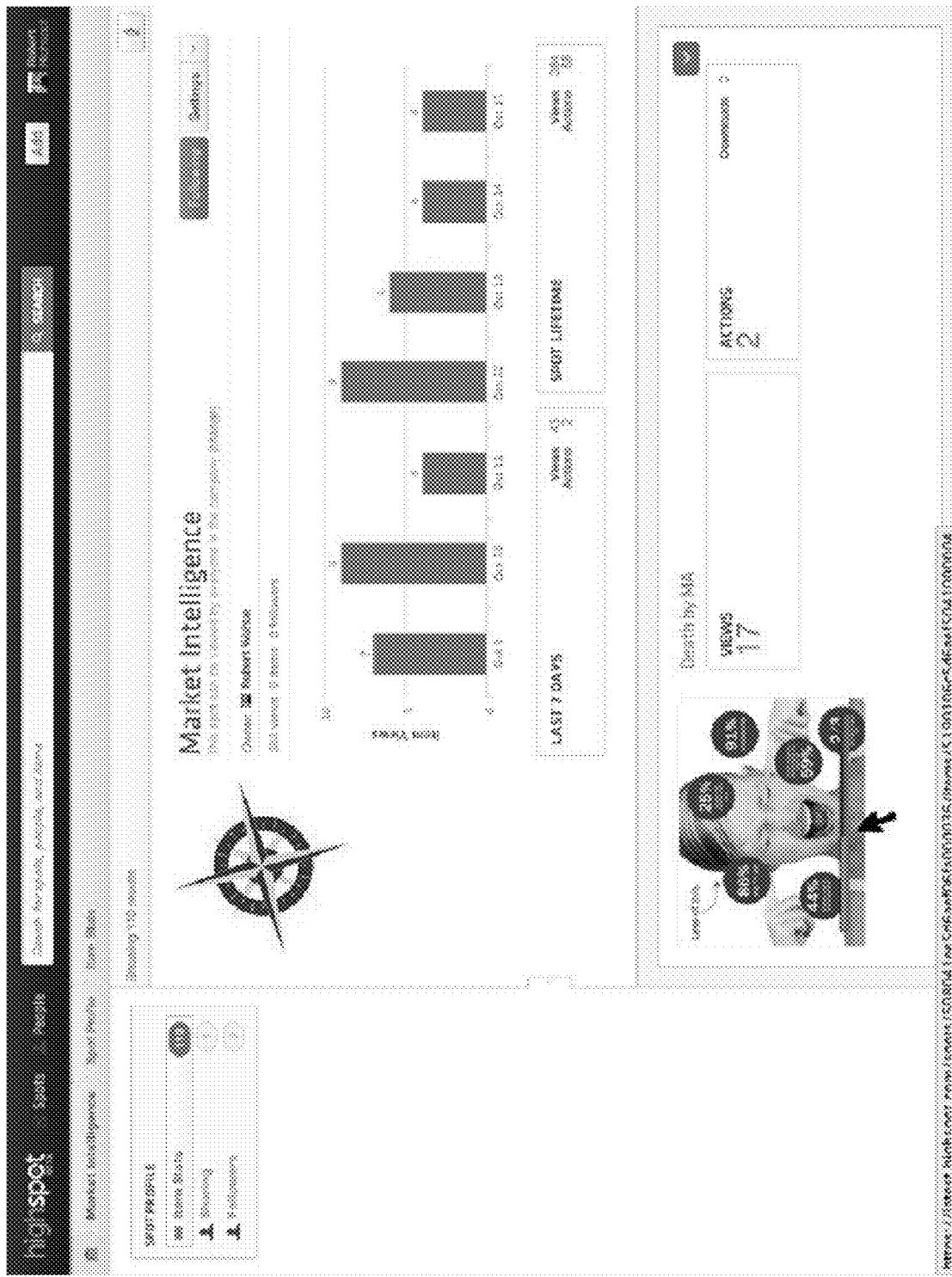
FIG. 34 is a display page illustrating skim preview in connection with an analysis of a particular collection of items in accordance with some embodiments of the disclosed technology.

Users may want to analyze the way that people are engaging with items. For example, they might want to find the most popular items in a collection, and understand how often they are being accessed or acted upon. FIG. 34 is a display page illustrating skim preview in connection with an analysis of a particular collection of items in accordance with some embodiments of the disclosed technology. In this example, FIG. 34 shows overall statistics for the collection, and detailed information about a particular item, summarizing how much activity has been associated with that item. The user is skim previewing the item to view its content within the context of the usage analysis.

8. Skim Implementation

In some embodiments, skim preview works by dividing the skim surface into ranges, each range corresponding a particular preview image. For example, if there are four images to display, the first (e.g., left-most) fourth of the skim surface corresponds to page 1, the second fourth of the skim surface corresponds to page 2, and so on. When the cursor is hovering anywhere in the left-most fourth of the skim surface, the first preview image will be shown. That preview image will continue to be shown as the user moves the cursor to the right, until the cursor enters the second fourth of the skim surface. At that point, the currently-displayed preview image is replaced by the second preview image. If the cursor moves back into the first fourth, the first preview image is re-displayed and if the cursor moves further to the right into the third fourth, the third preview image is displayed. One of ordinary skill in the art will understand that the example provided above uses a one dimensional, horizontal sequence but that the example could be adapted to use a vertical sequence or a multidimensional sequence. In this example, the system waits for move events and each time a move event is received, the system checks to see whether the correct preview image is being displayed. If not, the system updates the display.

9. Preparation

In some embodiments, the system starts with the following values:

Integer DisplayWidth=width of the display area for preview images, in pixels

Integer NumPages=the number of pages to preview for this item

Image PreviewPages[1 . . . Num Pages]=array of preview images

Integer LeftEdge=the pixel offset for the left edge of the skim surface

The PreviewPages array can be computed in a variety of ways. For example, the system might use a word processing program to generate a PDF file of the document. Each page of the PDF file could then be converted, using a graphics package like ImageMagick® by ImageMagick Studio LLC, into one of the preview images.

Next, the system computes the number of pixels that will be "allocated" to each image:

NumPixelsPerImage=DisplayWidth/NumPages if (NumPixelsPerImage <1) then NumPixelsPerImage=1

Begin by displaying the first image in the PreviewPages array. Set up the viewing environment so that when the cursor moves across the preview image, events will be generated and sent to the routine ProcessMouseMove( ), shown below. For example, if this code is part of a web page that is being viewed in a browser such as Google Chrome, the browser will detect when the cursor is hovering over the item and will generate a JavaScript event that is routed to the code each time the cursor moves.

10. Handling Mouse Events

In some embodiments, the routine that processes the events works as follows:

```
ProcessMouseMove(Integer XLocation, Integer YLocation)
{
    // compute page to render
    Integer OffsetWithinSurface = XLocation - LeftEdge
    Integer PageToRender = OffsetWithinSurface / NumPixelsPerImage
    UpdateDisplayedImage(PreviewPages[PageToRender])
    UpdateProgressBar((PageToRender / NumPages) * 100)
}
```

UpdateDisplayedImage( ) is a function that displays the specified image. In some cases, the function may scale preview images to properly render the preview images in the allocated display area. For example, one or more preview images corresponding to elements of the item may be too tall to fit in the display area. In that case, the preview images can be scaled to fit the allocated display area, typically preserving the aspect ratio of the original. Note that different preview images within a single document may have different scales and aspect ratios. For example, suppose that the item being displayed is a PDF file containing the advertising material for a product launch. Different pages within the file may contain a large poster, a banner, portrait-formatted 8½"×11" brochure pages, and presentation slides in landscape format. To properly display such a mixture of images, the function can pad each preview image as well, so that the preview image will be shown in the center of the display area. Also, images often are not easily legible if they are scaled up, so the system will also pad preview images that are smaller than the display area.

The following display algorithm is configured to handle any mixture of image sizes and aspect ratios and maps each into a display area of any height and width. The height and width of the display area are specified in pixels by ViewingAreaHeight and ViewingAreaWidth. A pair of functions called PixelHeight and PixelWidth return the height and width in pixels of an image that is passed to them, respectively. When the image has been scaled and padded (as needed) to center it and to fit within both dimensions of the display area, the DisplayImage function is called, which takes four arguments: the image, the amount to scale down the image, the amount of horizontal padding to display to the left of the image, and the amount of vertical padding to display above the image. The DisplayImage( ) function arranges for the image to be rendered; in a browser, for example, the DisplayImage( ) function would update the image tag and associated HTML declarations on the web page to render the preview image with the appropriate padding and scaling specified.

```
UpdateDisplayedImage(Image)
{
    Float VerticalScale = PixelHeight(Image) / ViewAreaHeight
    Float HorizontalScale = PixelWidth(Image) / ViewAreaWidth
    Float Scaling
    Integer VerticalPadding = 0, HorizontalPadding = 0
    If (VerticalScale > HorizontalScale) { // anchor scaling on height
        If (ViewAreaHeight > PixelHeight(Image)) { // needs padding
            VerticalPadding = (ViewAreaHeight - PixelHeight(Image)) / 2
            Scaling = 1
        }
        Else
            Scaling = VerticalScale
        Integer DisplayWidth = PixelWidth(Image) / Scaling
        If (ViewAreaWidth > DisplayWidth)     // needs padding
            HorizontalPadding = (ViewAreaWidth - DisplayWidth) / 2
    }
    else {          // anchor scaling on width
        If (ViewAreaWidth > PixelWidth(Image)) { // needs padding
            HorizontalPadding = (ViewAreaWidth - PixelWidth(Image)) / 2
            Scaling = 1
        }
        Else
            Scaling = HorizontalScale
        Integer DisplayHeight = PixelHeight(Image) / Scaling
        If (ViewAreaHeight > DisplayHeight)
            VerticalPadding = (ViewAreaHeight - DisplayHeight) / 2
    }
    DisplayImage(Image, Scaling, HorizontalPadding, VerticalPadding)
}
```

UpdateProgressBar( ) is a function that takes a percentage value and displays a progress bar showing that percentage completed.

To generalize this implementation into two dimensions, make the array of preview images two dimensional, and also compute the offset from YLocation to determine the value to use in the Y dimension. With reference to the above implementation, the ProcessMouseMove( ) function in two dimensions would work as follows:

```
ProcessMouseMoveIn2D(Integer XLocation, Integer YLocation)
{
    // compute page to render
    Integer HorizontalOffset = XLocation - LeftEdge
    Integer VerticalOffset = YLocation - TopEdge
    Integer HorizontalPage = HorizontalOffset / NumHorizPixelsPerImage
    Integer VerticalPage = VerticalOffset / NumVerticalPixelsPerImage
    UpdateDisplayedImage(PreviewPages[HorizontalPage,VerticalPage])
    UpdatePreviewIndicator(OriginalImage,
        HorizontalOffset, DisplayWidth,
        VerticalOffset, DisplayHeight)
}
```

This code uses an enhanced array of preview pages that is two-dimensional and, instead of a one-dimensional bar, displays a two-dimensional map of the total image along with an indicator to show where the current preview is located. UpdatePreviewIndicated( ) is a function that takes as arguments the original image that is being skimmed, the current mouse offsets horizontally and vertically, and the height and width of the display area. UpdatePreviewIndicated( ) shows an indicator to the user of the area of the image that is currently being previewed (an example is demonstrated in FIG. 3).

11. Enhancements

In some embodiments, the system uses predictive prefetch to optimize rendering time. The system can track the path of the cursor and predict where the user is most likely to go next. This might be based on extrapolating the existing path, or on historical patterns other users have followed. Based on the prediction, the preview images that would be needed next can be loaded ahead of time. Then, if the user does follow the predicted arc or arcs, the images are ready to be displayed immediately.

In some embodiments, the system visually weights items that are more important. The system can compute how likely a particular preview image is to contain content of interest to the user. For example, the system might estimate importance based on the amount of time that other users have spent looking at one part of the item vs. another with parts receiving more attention having a higher important than parts receiving less attention. In some embodiments, the system may estimate importance based on the behavior of users who have similar behavior to the current user. The system can adjust the visual weight of a preview based on estimated importance. For example, the size of the preview image might be adjusted such that preview images with high estimates of importance may be enlarged while preview images with low estimates of importance are reduced in size.

In some embodiments, the percentage of the skim surface corresponding to a preview image may be proportional to the estimated importance of the preview image. For example, as the user moves the cursor across the skim surface at a constant speed, more important preview images are shown for a longer period of time than less important preview images. In this manner, preview images that a user is more likely to want to see, such as first pages of chapters within in a book or first screens/title screens of chapters within a film, may be displayed longer as part of the skim preview and, therefore, easier for the user to find.

In some embodiments, the system allows a user to adjust the images shown based on speed of cursor movement. If the user is moving the cursor quickly, it may not be useful to show all of the preview images as they will not be all legible. Accordingly, in some embodiments the system could present only certain images, rather than all of them. The system might also use visual weighting, as above, to determine the most important subset of the images to show.

In some embodiments, the system allows the user select the preview images. The user could select, for example, which frames from a video are to be used as preview images. Alternatively, the user could define "cover pages" for items—a customized initial preview image that is displayed before skim preview is activated. For example, the first slide of a presentation might not represent its content well—it might, for example, be notes to the audience about how long the presentation will be, but not describe the content. In that case, the user can choose a different slide to use as the initial preview (or cover page), or they might upload a custom image to use as the cover page instead. In some embodiments, the system may auto-compute each cover page and/or auto-detect that the default cover page is not a good one. The system may be able to recognize that the default first preview image is not a good one because, for example, the first preview image does not contain any text, is a video test pattern, is blank, etc. In response to determining that a cover page is not preferable, the system can use heuristics to choose a better cover page or to warn a user so that the user would know to choose a better cover page. For example, the system might search through the initial frames of a video until it finds a frame that is not a test pattern and is not blank, or one that has words on it. For a presentation, the system might look for a slide that contains words in a large font, and not just images or small text.

In some embodiments, the system may support skim preview of audio. For example, if an item includes an audio track (e.g. it is a sound clip, or a video with accompanying sound), the system may sample the audio by, for example, playing short bursts (e.g., a half second, one second, five seconds) of sound taken at periodic intervals from the original recording. The system might play a small fraction of each second of audio as the cursor is moved, allowing the user to hear an approximation of the sampled content as they skim across the item. The audio track might be all that a user experiences as the user skim previews, or the sampled audio might be played in conjunction with a visual skim previewing experience.

M. Creating the Interest Graph

The choice and ordering of items during browsing relies on the interest graph. The workflow for creating the interest graph is summarized in FIG. 16. In some examples, the process of building the interest graph includes generating the data, gathering the data, and computing the interest graph.

Step 1: Generating the Data

In some examples, an interest graph is computed from a number of different data sources and benefits greatly from having the largest possible amount of data to analyze. Machine learning research and practice consistently shows that accuracy improves dramatically as the number of data sources and the amount of data increases. This is referred to as user signal.

Therefore, step 1 is generating the data, which means encouraging users to engage in activities that generate signal. Historically, activities that provide the most useful data have been overly complex inside of companies, and hence have not occurred as often as they otherwise might.

For example, sharing files with others in a rich online experience (like a web site that offers a structured view, supports search, and enables browsing) has been cumbersome to set up. As a result, people often settle for simple sharing solutions, such as relying on email attachments or on keeping all their files in a shared disk drive. The disclosed system provides a simple and easy to use sharing solution that encourages users to interact more heavily with each other's information and hence to generate more signal.

Browsing files on a web site generally involves downloading them to the local computer and viewing them in a program like Microsoft Word or PowerPoint, which is quite slow. Accordingly, users are discouraged from browsing as many items as they might otherwise do. The disclosed system provides a much faster way to browse (called "skim" preview), which offers very fast viewing of items and collections of items. Skim allows users to explore information online without requiring them to download anything or launch any applications on their machine, encouraging far more browsing. In some examples, skim works by tracking the way that the user slides their mouse across an item's thumbnail. Based at least in part on how far the mouse has moved horizontally across the thumbnail, a preview of that part of the item is shown. For example, if the user is running the mouse over the thumbnail for a presentation, as the mouse moves left to right, each slide of the presentation is shown in succession. By sliding the mouse back and forth, at any desired speed, the user can quickly view all the slides. Similarly, for a document, the thumbnails show each page of the document. There is an equivalent browsing experience for each type of information supported by the system. In seconds, the user can see every part of the item—it is much faster than the traditional method of downloading the file to a client application.

Another example is organizing information. The traditional approach is to use a directory structure, which provides a limited way to establish a taxonomy and to associate related files. Another approach is to use metadata tagging, where items are assigned a set of properties. These systems have been deployed extensively within companies and are generally felt to be rigid and awkward—most users resist them and the vast majority of information is never put into them. Our approach is to offer lists and folders that support dragging and dropping items into multiple places, a model that is familiar to users from other domains like organizing music into playlists. The system offers three levels of hierarchy: (1) spots, which are collections of items that can be found via a directory or search. (2) folders, which exist within a spot and optionally allow users to group a set of lists together. (3) lists, which are simple groups of items. An item can be in zero, one, or many different lists. Users can place individual items into lists or can drag a group into a list. This is a much simpler structuring model than is traditionally used by systems like enterprise content managers. Each user can create their own hierarchy, if they wish, and can take an item from one spot and put it into another one (using an operation called respot). So users might create a spot called "Widget Marketing", which contains all the marketing material for widgets. Within that spot, they might have a folder called "vertical markets" containing lists like "manufacturing", "media", etc. They might have another folder called "sales stage" with lists like "pre-sale", "proof-of-concept", "post-sale". Any piece of information can be put into any number of lists, allowing for a flexible browsing experience based at least in part on spots, folders, and lists.

The first step towards creating an effective interest graph is to provide an information management environment that makes it much easier and faster for users to engage in useful data-generating activities and generate as much user signal as possible to be analyzed.

Step 2: Gathering the Data

The next step is to gather the necessary data. Producing an accurate interest graph relies on detailed analysis of data from a variety of sources. Table 1, at the bottom of this section, lists and defines input data structures used by the system.

1. User Behavior

A source of data is the way that users interact with each piece of information. The system tracks actions that a user performs on any item (share, download, copy from one collection to another, recommend, comment, etc.) and monitors how much time they spend looking at each part of a document, presentation, video, training program, or the like.

Traditional content systems invoke other programs when users wish to view the contents of a document—for example, such an environment might download a presentation and invoke Microsoft PowerPoint to let the user read it. What users do inside of a program like PowerPoint is usually opaque to the content manager. And, most such editing programs (e.g. word processors or presentation programs) do not track and report which parts of the file users spend time on, and how much time. Therefore user engagement with each piece of information does not generate any signal that can be analyzed.

The disclosed system presents high resolution previews and views of various document types that are instantly available online and can be quickly browsed using skim preview—no download is required, and no software applications need to be installed or invoked on the user's machine. The system monitors all views and previews, tracking how often they happen and how long the user spends looking at any part of the item.

The actions that users have taken on items and their viewing behavior are captured in the ItemScore, CollectionScore, and RecentActivity data structures. In addition, the system creates a feedback loop—whenever it presents items that might be of interest to the user, the click-through behavior is tracked in ClickThroughs.

2. Item Analysis

The system extracts as much data as possible by analyzing each item of information:

- In some examples, the system uses the software package called Lucene to parse the text, apply Porter stemming analysis, create an inverted index, and compute a similarity score for a query string against the index. The index tracks the number of times each word appears and also records collections of words that appear together, to support searching for phrases. Each word in the index is stemmed, meaning that it is divided into its component parts. This allows, for example, a search for the word "run" to match a document that contains "running". Note that there are a variety of other algorithms for stemming (e.g. suffix-stripping and lemmatization), assembly of the index (e.g. a suffix tree or n-gram tree), and scoring a query (e.g. compression distance, Dice's coefficient) that would also serve. This information is stored in InvertedIndex.
- For each item, the system computes a content vector that expresses how many times any particular word appeared in it. The result is stored in ContentVectors.
- Each piece of metadata is extracted—documents created within Microsoft Office, for example, have a section that captures tags like the author, date, description, and so forth. A similar model exists for images in JPEG format and for many other file types. The resulting <field name, value> pairs are added to InvertedIndex.
- For each piece of information, the system computes a large hash function of the contents of the document (using, for example, the SHA-256 algorithm, although there are a variety of cryptographic hash functions with low collision rates that would also serve). The hash is, with high probability, unique for each piece of content in the system. It allows us to quickly recognize when the same item has been added to the system multiple times, by the same or by different users. The hashes are stored in ItemHashCodes.

3. Social Graph

Another valuable clue to user interest is the set of people to whom they are connected. The system computes the social graph, which captures the connections between people. Such connections can take many different forms; for example:

- They may both belong to the same group of users.
- They may both have similar access permissions to a collection of items. The strength of this indicator is inversely proportional to the number of other people who have similar permissions. In other words, if only two people have access to a body of documents, that is a much stronger indicator of mutual interest than if two people have access to information that is also available to hundreds or thousands of other people.
- A user A may choose to follow another user B, which means that user A will be notified when user B performs certain kinds of actions. This creates an asymmetrical connection—user A is likely to be interested in something that user B cares about, but it is weaker evidence that user B will share interests with user A.
- A user may own a collection of information and grant access to another.
- A user may invite another user to join the service—accepting that invitation represents a stronger connection than simply receiving it.
- A user may have created a link to another user.
- The system examines the social graph, distilling it into UserConnectedness.

4. Information Graph

The system has a variety of ways that information can be categorized—it provides a hierarchy of collections and any piece of information can be in any number of those collections. One collection may have a link to another. As a result, there is also an information graph capturing the relationships between items of information. The system stores that graph in the ItemConnectedness data structure. Different types of collections imply different levels of relationship between the items.

Similarly, the system aggregates these individual relationships between items into a measure of connectedness between collections, stored in CollectionConnectedness.

5. Queries

The system offers search, both within a collection and across many of them. There is valuable information in the phrases that users search on, and their subsequent decisions whether or not to click through on the results presented. The system keeps track of all queries that have been performed in QueryCount, the ones that are most popular in PopularQueries, and the subsequent click-through decisions by users in ClickThroughs.

TABLE 1

Input Data Structures

ItemScore - total activity applied to an item by each user
ItemScore is an array [U, I] of tuples, where U is the number of users in the system and I is the number of items.
Each tuple = <weightedsum, <action$_1$, action$_2$, . . . , action$_n$>, views, <preview$_1$, preview$_2$, . . . , preview$_m$>>
The tuple contains a count of each allowed type of action for an item (e.g. "downloaded"), a count of the number of times it is viewed, and a count of the amount of time each part of it (e.g. a page of a document) was previewed. The tuple also contains a weighted sum of these counts; weights are adjusted depending on the relative importance of each of the counts.
CollectionScore - total activity applied to a collection of items by each user
CollectionScore is an array [U, C] of element, where U is the number of users in the system and C is the number of collections. Each element is the same tuple as for ItemScore.
RecentActivity - a log of recent activities each user has done with every item
RecentActivity is an array [U, I] of tuples, where U is the number of users and I is the number of items.

TABLE 1-continued

Input Data Structures

Each tuple = <<action$_1$, timestamp$_1$>, <action$_2$, timestamp$_2$>, . . . <action$_n$, timestamp$_n$>>
The tuple is the set of recent actions performed by the user on the item, each with a time stamp.
ClickThroughs - a log of the result when each item was presented to each user
Clickthroughs is an array [U, I] of tuples, where U is the number of users and I is the number of items.
Each tuple = <<context, position$_1$, click_number$_1$>, . . .>
The tuple contains the set of times this item was presented to this user. The system records the context (e.g. "search query"), the position of the item in the presented list (e.g. "the item was the third result"), and which of the selected items from that result set it was (e.g. "the item was selected second" or "the item was never selected").
ContentVectors - a representation of the content of every document. In some examples, the system uses the Mahout software package to create a normalized vector space model (VSM) representation for every item, using term-frequency inverse document frequency (TF-IDF) weighting to compute the values in each vector. Collocation-based n-gram analysis with log-likelihood ratio test improves the accuracy of the weighting. There are other algorithms for vectorizing content that would also serve.
ContentVectors is an array [I, T] of values, where I is the number of items and T is the number of n-gram terms that appear in any of those items. The value is a weighted count of the number of times that term appears in that item.
InvertedIndex - an index of a set of documents
In some examples, the disclosed system uses the Lucene indexing package to create an inverted index from a set of documents. This index contains every lexeme that appears in any item. For each lexeme, it enumerates the set of documents that contain it. Each document is also annotated to reflect the set of individuals who are allowed to access it, and the Lucene search contains a mask to choose only those items that are visible to the user.
ItemHashCodes - a pointer to the items corresponding to any hash code present in the system
The system computes a cryptographic hash value of the contents of every item. In some examples, the system uses SHA-256, but there are a variety of other algorithms that similarly compute a value for any item that has a very low probability of colliding with the value for any other.
ItemHashCodes is an array [H] of item lists, where H is the number of unique hash values present across all items. List contains the set of items that correspond to that hash value.
UserConnectedness - the degree to which each user is connected to every other user in the social graph
UserConnectedness is an array [U, U] of tuples, where U is the number of users.
Each tuple = <weightedsum, <<strength$_1$, type$_1$>, <strength$_2$, type$_2$>, . . .>>
The tuple enumerates the strength and type of each connection between this pair of users (from X –> Y, if the tuple is element [X, Y] of the array). The type might be "appear in the same access control list" or "X invited Y to join the community and that invitation was accepted". The strength can be the same for every connection of a particular type or it can be weighted (e.g. "the value is one divided by the number of people on the shared access control list"). The system computes a weighted sum across the connections, factoring in their strengths.
ItemConnectedness - the degree to which every item is connected in the information graph to every other item.
ItemConnectedness is an array [I, I] of tuples, where I is the number of items. The tuple has the same form as the one for UserConnectedness.
CollectionConnectedness - the degree to which each collection of information is connected to every other collection.
CollectionConnectedness is an array [C, C] of tuples, where C is the number of collections. The tuple has the same form as the one for UserConnectedness.
QueryCount - the queries that have been executed
QueryCount is an array [Q, U] of tuples, where Q is the number of queries that have been executed on the system and U is the number of users.
Each tuple = <querystring, count, <<clickeditem$_1$, click$_1$>, <clickeditem$_2$, click$_2$>, . . .>
The tuple expresses the number of times that user U has executed query Q.
querystring is the text of the query, count is the number of times it was executed, and the next value is the set of results from those queries. Each item in the set is a pair - the item that was clicked, and its position in the clickstream of user choices (e.g. "first item clicked", "second item clicked", etc).

Step 3: Computing the Interest Graph

In some examples, the system computes the interest graph by taking the raw user signal (captured in the input data structures described in the previous section) and processing that data through a series of intermediate computations.

Each of the intermediate computations is called "Compute <X>", where <X> is the name of the output that it generates. For example, "Compute UserUserAffinity" produces the UserUserAffinity data structure. The system runs these intermediate computations at periodic intervals and the outputs are updated over time as additional user data is gathered. Table 2 enumerates the intermediate data structures that are produced by these algorithms.

TABLE 2

Intermediate Data Structures

UserInfluence - measure of how much social influence each user has on others
UserInfluence [U] is an array of real numbers representing the influence of each of the U users in the system.
<X><Y>Affinity - a measurement of the affinity for every X to every Y
These are a family of data structures that represent affinity - the likelihood of a user to be interested in another user, an item, or a collection, or the likelihood that an interest in one item implies an interest in another. In each case, affinity can be represented as a real number from 0 to 1 on a logarithmic scale, where 1 represents extremely strong predicted affinity and 0 represents none. Note that an alternative model is to make zero represent "no information," negative numbers represent negative affinity (the belief that an item or not likely to be of interest), and positive numbers represent positive affinity.
UserUserAffinity is an array [U, U] with affinity from every user to every other user
UserItemAffinity is an array [U, I] with affinity from every user to every item
UserCollectionAffinity is an array [U, C] with affinity from every user to every collection
ItemItemAffinity is an array [I, I] with affinity from every item to every other item
ItemClusters - divides the items in the system into clusters whose content is related
ItemClusters is an array [I] of tuples, where I is the number of items.
Each tuple = <<$cluster_1$, $membershipweight_1$>, <$cluster_2$, $membershipweight_2$>, . . .>
The tuple enumerates the clusters that the item is in and the weight of its membership to each cluster. In some examples, the system uses a non-uniform weight (so called "fuzzy clustering"), though it is also possible to make membership boolean.

When the system displays a set of values to the user, it invokes one of the ranking computations. Each of these is called "<Y> Ranker", depending on what kind of values they are ranking. Ranking computations are given an argument and then compute a set of ranked results based at least in part on that argument and on a set of other inputs.

Figure 16:
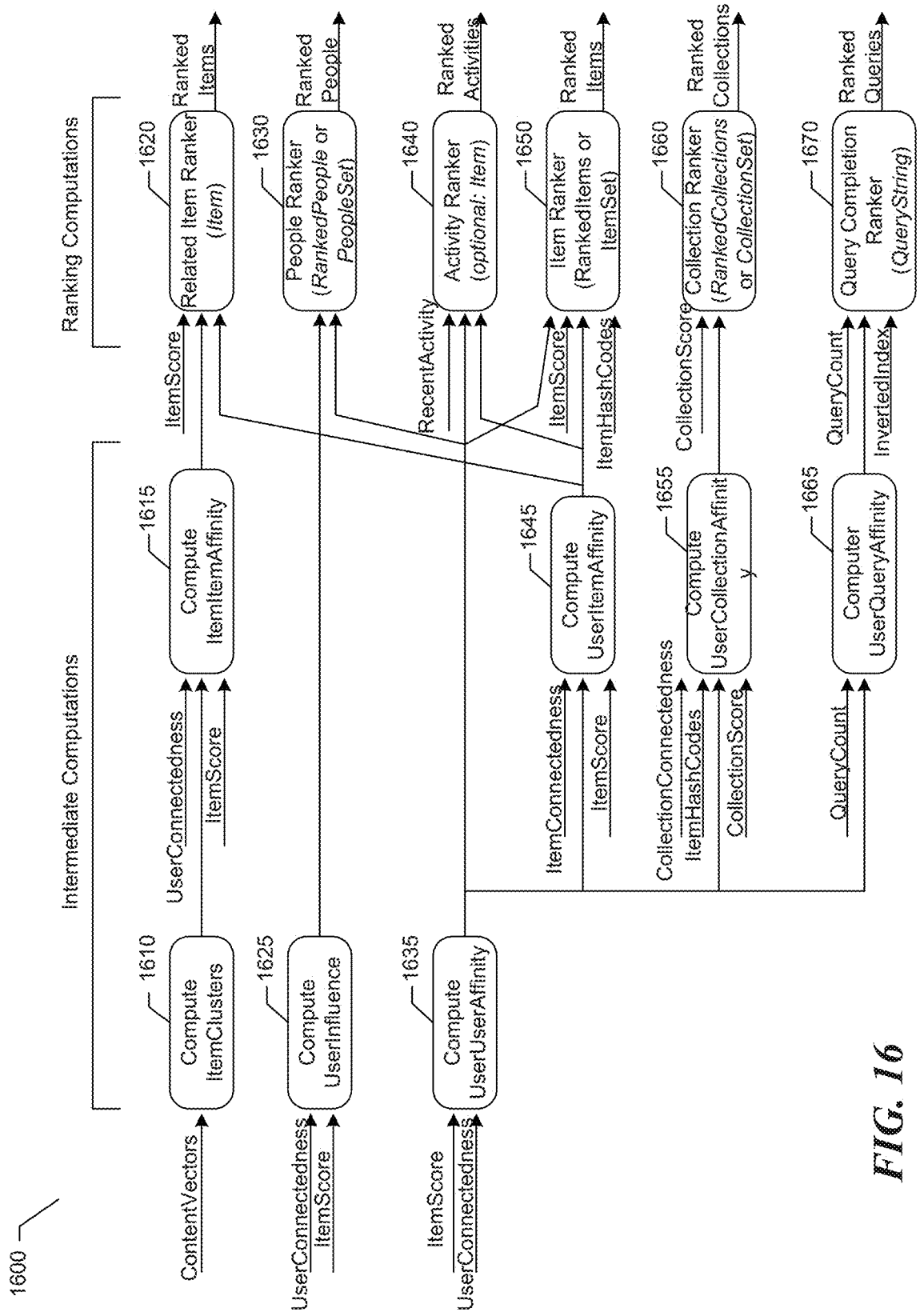
FIG. 16 is a block diagram illustrating processing of the system in accordance with an embodiment of the present technology.

FIG. 16 is a block diagram illustrating processing of the system in some examples. FIG. 16 shows the processing steps of the system and how the data flows through the system. Each named arrow represents an input data structure capturing raw user signal. Each rounded rectangle represents a computation. For example, "Compute ItemClusters" 1610 is an intermediate computation with one input, the ContentVectors data structure. Its output (ItemClusters) is fed into the "Compute ItemItemAffinity" 1615 computation, along with two other inputs—the ItemConnectedness and the ItemScore data structures.

The system uses the ranking computations to produce output that users can see. For example, suppose the user is looking at an item, and the system wants to display a set of related items next to it. The goal is to identify the items that are most likely to interest the user. For example, if a salesperson is looking at a presentation about a particular product, they might also be interested in a price sheet for the product, white papers on how to use that product most effectively, presentations and documents about related products that work with it, etc.

The system uses the ranking computation called RelatedItemRanker 1620 to identify and rank related items. When the user pulls up a particular item on a web site, the system hands that item to RelatedItemRanker, which returns the ranked set of items (in a RankedItems data structure) that it has identified as being most likely to be of interest to the user. The computation relies on one input data structure—the popularity of items (ItemScore) and the results from two intermediate computations—the likelihood that the current user would be interested in any particular item (UserItemAffinity), and the degree of similarity between any two items (ItemItemAffinity).

The following data structures are used to hold groups of different types.

TABLE 3

Group Data Structures

<value>Set - a set of <values>
This family of data structures holds an unordered set of items of type <value>.
ItemSet is an array [I] of items, PeopleSet is an array [P] of people, and CollectionSet is an array [C] of collections
Ranked<value> - a set of <values>, with an associated ranking
This family of data structures holds a set of items of type <value> with an associated rank that represents an ordering. Note that ranks are real numbers, allowing the structure to both establish an ordering and to measure the "distance" between two items in terms of their rank.
RankedItems is an array [I] of ranked items, RankedPeople is an array [P] of ranked people, RankedCollections is an array [C] of collections, RankedQueries is an array [Q] of ranked queries, and RankedActivities is an array [A] of ranked activities 6. Intermediate Computations These computations operate on input data structures and on the results produced by other intermediate computations. In each case, they produce a data structure as output with the results.

These functions or algorithms compute the degree of affinity between pairs of things. "Affinity" means the likelihood that interest in one of those items means interest in the other. Note that affinity is not symmetrical; a salesperson who is looking at a particular product description might be highly likely to look at the price sheet containing that product (among hundreds of others), but somebody looking at the price sheet is much less likely to care about any particular product's description.

7. Compute ItemClusters

This algorithm operates on ContentVectors, applying a clustering algorithm to compute ItemClusters that represent groups of items that have related textual content. In some examples, the system uses the Mahout software package to perform this computation, applying canopy generation to identify cluster centroids, then using k-means clustering based on the cosine of the Euclidean distance between documents as a similarity metric. One of ordinary skill in the art will recognize that other clustering algorithms can be used.

8. Compute ItemItemAffinity

This algorithm computes the degree of affinity between pairs of items in the system.

The inputs are ItemConnectedness (the degree to which the items are "close" in the information graph), ItemScore (the amount of interactions users have had with items), and ItemClusters (the degree to which the contents of items are related). Here is the algorithm:

```
Compute_ItemItemAffinity(ItemConnectedness, ItemScore, ItemClusters)
{
    FrequentGroups = AssociationRuleAnalysis(ItemScore)
    For every pair of items (I, J)
        ItemItemAffinity [I, J] = A * ItemConnectedness [I, J] +
            B * ItemScore [*, J].weightedsum +
            C * number of appearances of I & J in FrequentGroups
}
```

AssociationRuleAnalysis determines which pairs of items are frequently viewed together. In some examples, the system uses the algorithm known as Apriori to determine these pairs. One of ordinary skill in the art will recognize that there are a variety of similar algorithms that could also be used. The weighting parameters A, B, and C allow the system to balance the importance of items being placed in related collections, the popularity of particular items with users, and the degree to which other users have viewed both items.

9. Compute UserUserAffinity 1635

This algorithm computes the degree of affinity between pairs of users—the likelihood that each user is interested in what the other one does. The inputs are ItemScore (which captures how users have interacted with items) and User-Connectedness (the degree to which they are connected in the social graph). The algorithm is:

```
Compute_UserUserAffinity(ItemScore, UserConnectedness)
{
    UserBehaviorSimilarity = PearsonCorrelation(ItemScore)
    For every pair of users (I, J)
        UserUserAffinity[I, J] = A * UserBehaviorSimilarity [I, J] +
            B * tanh(UserConnectedness [I, J])
}
```

The system uses, for example, the Mahout software to compute the Pearson correlation of behavior across the weighted sum of item scores. The user connectedness value is normalized into the range 0-1 using hyperbolic tangent. Then the values are weighted, to reflect the relative importance of behavior vs. the social graph. The weighting parameters A and B allow the system to balance the importance of these values. Note that one of ordinary skill in the art will recognize that numerous other algorithms can be used to compute behavioral similarity (e.g., Euclidean distance or the Tanimoto Coefficient) and normalization (e.g., the logistic function or Z-scores).

10. Compute UserItemAffinity 1645

This algorithm computes the degree of affinity between every user and every item in the system. The inputs are UserUserAffinity (from above), ItemScore, and ItemConnectedness. The algorithm is:

```
Compute_UserItemAffinity(UserUserAffinity, ItemScore, ItemConnectedness)
{
    For every item I, for every user U {
        ActivitySum = UserInterest = 0
        For every user U2
            ActivitySum += UserUserAffinity[U, U2] * ItemScore[I, U2].weightedsum
        For every item I2
            UserInterest += ItemScore[I2, U] * tanh(ItemConnectedness [I, I2])
        UserItemAffinity[U,I] = A * ActivitySum + B * UserInterest
    }
}
```

The system computes the sum of the activity that other users have performed on the item (weighted by affinity to those users) and the sum of item activities that the current user has performed (weighted by the affinity of the current item to those other items). Those two values are combined in a weighted sum, based on the relative importance of behavior vs. item connectivity. In some examples, connectedness is normalized using hyperbolic tangent, but one of ordinary skill in the art will recognize that other algorithms could be used.

11. Compute UserCollectionAffinity 1655

This algorithm computes the degree of affinity between every user and every collection, where a collection is a grouping of items. Note that collections can overlap, can be organized into a hierarchy, or can be disjoint—the model works in any of those cases. The inputs are UserUserAffinity (from above), CollectionConnectedness (the degree to which collections are connected), ItemHashCodes (the hash values of every item), and CollectionScore (the activities user have performed on each collection). The algorithm is:

```
Compute_UserCollectionAffinity(UserUserAffinity, CollectionConnectedness,
        ItemHashCodes, CollectionScore)
{
    For every collection C, for every collection C2 {
        For every item I in C, for every item I2 in C2
            if (ItemHashCode[I] = ItemHashCode[I2])
                CollectionSimilarity [C, C2] += SharedItemWeight
    }
    For every collection C, for every user U {
        ActivitySum = UserInterest = 0
        For every user U2
            ActivitySum += UserUserAffinity[U, U2] * CollectionScore[C, U2].weightedsum
```

```
    For every collection C2
      UserInterest += CollectionScore[C2, U] *
         (tanh(CollectionConnectedness [C, C2]) +
           CollectionSimilarity [C, C2])
    UserCollectionAffinity[U,C] = A * ActivitySum + B * UserInterest
  }
}
```

The system computes the frequency with which the same item appears in every pair of collections, using a constant weight. The system then computes the sum of the activity other users have performed on the collection (weighted by the affinity to those users) and the sum of collection activities that the current user has performed (weighted by the affinity of the current collection to those collections based on both behavior and similarity of content). Note that connectedness is normalized using hyperbolic tangent, but other algorithms could be used. These values are then combined in a weighted sum, where the weights reflect the relative importance of user behavioral similarity vs. structural relationships and similarity of content.

12. Compute UserQueryAffinity 1665

This algorithm computes the degree of affinity between every user and every query that has been executed on the system. The inputs are UserUserAffinity (from above) and QueryCount (a summary of the queries that have been executed by each user). The algorithm is:

```
Compute_UserQueryAffinity(UserUserAffinity, QueryCount)
{
  For every query Q, for every user U {
    ActivitySum = 0
    For every user U2
      ActivitySum += UserUserAffinity [U, U2] * QueryCount[Q, U2].count
    UserQueryAffinity[Q, U] = A * ActivitySum
  }
}
```

The system computes the sum of the number of times other users have executed this particular query, weighted by the affinity with that other user. The result is then multiplied by a weight to compute affinity for this user and the query.

13. Compute UserInfluence

This algorithm computes the amount of influence that each User has within the community of users on the system. Its inputs are UserConnectedness (the degree of connectivity in the social graph), and ItemScore. The algorithm is:

```
Compute_UserInfluence(UserConnectedness, ItemScore)
{
  For every user U, for every user U2
    UserInfluence[U] += A * UserConnectedness.weightedsum[U, U2]
  For every user U, for every item I that user U was responsible for creating
    For every user U2
      UserInfluence[U] += B * ItemScore[I, U2].weightedsum }
```

The system computes a weighted sum of how connected other users are to a particular user, and for how much activity has been generated by the items that the particular user created.

14. Ranking Computations

The ranking computations produce ranked lists of items; a typical use for ranking computations is to produce lists that are displayed to users in various contexts. For example, ItemRanker is used in deciding which items to display to users as the result of a search query. ItemRanker takes candidate items that might match the query, and orders them appropriately.

Each ranking computation is invoked on an input. Using that input and data structures that are passed to it (per the workflow in FIG. 16), the computation produces a ranked set as the output.

15. Related Item Ranker 1620

This algorithm is invoked on an item and also gets ItemScore, ItemItemAffinity, and UserItemAffinity. The algorithm is:

```
RelatedItemRanker(Item, ItemScore, ItemItemAffinity, UserItemAffinity)
{
  For each item I
    Score = 0
    For each user U
      Score += ItemScore[I, U].weightedsum
    RankedItems[I].rank = (A * Score) * (1 + ItemItemAffinity[Item, I]) +
       (B * UserItemAffinity[CurrentUser, I])
}
```

The system finds the items most related to Item by computing a weighted sum. The factors are the total amount of user activity against other items, weighted by the affinity of those other items to this one, and the current user's affinity to the item.

16. Activity Ranker 1640

When this algorithm is invoked, it is optionally given an item and also gets RecentActivity (the set of activities that have recently been performed on the system, such as the set of activities performed during the last year, month, week, day, hour, or portion thereof), UserUserAffinity, and UserItemAffinity. If an item is provided, it returns the set of activities that have been performed on that item, ranked in terms of how likely they are to interest the current user. If no item is provided, it returns the list of activities on any item in the system, ranked in terms of how likely they are to interest the current user. The algorithm is:

```
ActivityRanker(optionak Item, RecentActivity, UserUserAffinity, UserItemAffinity)
{
  if Item was provided
    RankedActivities = set of activities in RecentActivity performed on Item
  else
    RankedActivities = RecentActivity
  For each activity A in RankedActivities
    RankedActivities[A].rank = B * ActivityValue(A) *
      (C * (1 + UserUserAffinity[CurrentUser, A.user])) *
      (D * (1 + UserItemAffinity[CurrentUser, A.item]))
}
```

The system chooses a candidate set of activities. For each activity in the candidate set of activities, the system computes a ranking using a weighted product of the intrinsic interest for that type of activity, the affinity of the current user with the user who performed the activity, and the affinity of the current user for the item on which the activity was performed.

17. Item Ranker

This algorithm is invoked on a set of items, which is either unranked (an ItemSet) or already ranked with a preliminary ranking (a RankedItems set) and also gets ItemScore, ItemHashCodes, and UserItemAffinity. The algorithm is:

```
ItemRanker(InputSet, ItemScore, ItemHashCodes, UserItemAffinity, UserUserAffinity)
{
  Remove duplicate items from InputSet (using ItemHashCodes)
  For every item I in InputSet
    For every user U
      Score += A * ItemScore[I, U] * (1 + UserUserAffinity[CurrentUser,U])
    RankedItems[I].rank = (B * Score) * (C * (1 + UserItemAffinity[I, CurrentUser]))
    If InputSet is ranked
      RankedItems[I].rank *= D * InputSet[I].rank
}
```

The system computes the sum of user actions against each item in the set, weighted by the affinity of the current user to the other users and then computes the weighted product of that sum, the affinity of the user to the item, and the existing rank of each item (if it was provided). The weights reflect the relative importance of user behavior directly against the items vs. the predictability of user interest vs. the effectiveness of the original input ranking. The output is a ranking for each unique item in the set.

18. Collection Ranker 1660

This algorithm is invoked on a set of collections, which is either unranked (a CollectionSet) or ranked (a RankedCollections set) and also gets CollectionScore. The algorithm is:

```
CollectionRanker(InputSet, CollectionScore, UserUserAffinity, UserCollectionAffinity)
{
  For every collection C in InputSet (
    Score = 0
    For every user U
      Score += A * CollectionScore[C, U] * (1 + UserUserAffinity[CurrentUser, U])
    RankedCollections[C].rank =(B * Score)*
      (D * (1 + UserCollectionAffinity[I, CurrentUser))
    if InputSet is ranked
      RankedCollections[C].rank *= E * InputSet[C].rank
  }
}
```

The system computes the sum of user actions against each collection, weighted by the affinity of the current user to the other users and then computes the weighted product of that sum, the affinity of the user to the collection, and the existing rank of each collection (if it was provided). The weights reflect the relative importance of user behavior directly against the collections vs. the predictability of user interest vs. the effectiveness of the original collection ranking. The output is a ranking for each collection in the input set.

19. People Ranker 1630

This algorithm is invoked on a set of people, which is either unranked (a PeopleSet) or ranked (a RankedPeople set) and also gets UserUserAffinity and UserInfluence. The algorithm is:

```
PeopleRanker(InputSet, UserUserAffinity, UserInfluence)
{
  For every user U in InputSet
    RankedPeople[U].rank = (A * UserInfluence[U]) *
      (B * (1 + UserUserAffinity+CurrentUser, U]))
    If InputSet is ranked
      RankedPeople[U].rank *= C * InputSet[U].rank
}
```

For each of the users being ranked, the system computes the weighted product of their influence on other users, the affinity of the current user to the other users, and the existing rank of that user (if it was provided). The weights reflect the relative importance of influence, affinity, and the effectiveness of the original ranking. The output is a ranking for each user in the input set.

20. Query Completion Ranker 1670

This algorithm is invoked on a partial query string, and computes the set of completions for it (suggested full queries the user might have in mind) and also gets QueryCount, UserQueryAffinity, and the InvertedIndex. This algorithm returns up to COMPLETION_MAX ranked query completions. COMPLETION_MAX may be defined by a user or an administrator of the system. The algorithm is:

```
QueryCompletionRanker(QueryPrefix, QueryCount, InvertedIndex)
{
  RankedQueries = set of queries in QueryCount that begin with QueryPrefix
    rank for query Q = (A * QueryPrefix[Q].count) +
      (B * (1 + UserQueryAffinity[Q, CurrentUser]))
  if (number of queries in RankedQueries < COMPLETION_MAX) {
    QueryLexemes = set of lexemes in InvertedIndex that begin with QueryPrefix
    Sort QueryLexemes by the number of times the lexeme appears in the index
    Copy from QueryLexemes into RankedQueries until you reach
      COMPLETION_MAX or have copied them all. Assign each the rank
      A * (count of appearances of lexeme in index)
  }
}
```

The system computes query completions from the set of queries that have already been executed and from textual analysis of the inverted index. In some cases, the system biases towards the former, but fills out the potential query list from the latter as needed to reach the desired number of completions. The rank for previously executed queries is a weighted sum of the number of times the query has been executed and the affinity of the current user to each query. The rank for matching lexemes is the count of that lexeme's appearances, weighted accordingly. The output is a ranked set of query completions.

N. Conclusion

Figure 35:
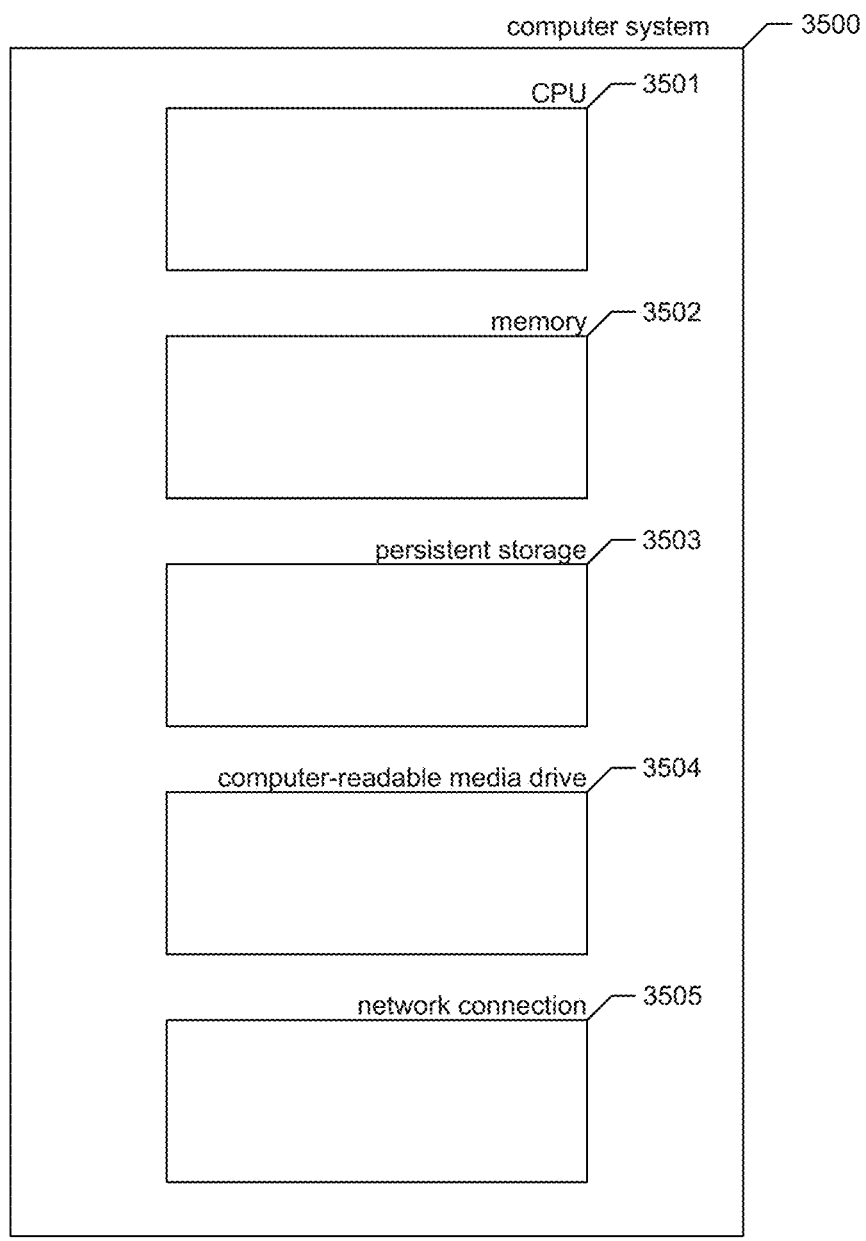
FIG. 35 is a block diagram illustrating some of the components that may be incorporated in at least some of the computer systems and other devices on which the system or facility operates and with which the system or facility interacts.

FIG. 35 is a block diagram illustrating some of the components that may be incorporated in at least some of the computer systems and other devices on which the system operates and interacts with in some examples. In various examples, these computer systems and other devices 3500 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit ("CPU") 3501 configured to execute computer programs; a computer memory 3502 configured to store programs and data while they are being used, including a multithreaded program being tested, a debugger, the facility, an operating system including a kernel, and device drivers; a persistent storage device 3503, such as a hard drive or flash drive configured to persistently store programs and data; a computer-readable storage media drive 3504, such as a floppy, flash, CD-ROM, or DVD drive, configured to read programs and data stored on a computer-readable storage medium, such as a floppy disk, flash memory device, a CD-ROM, a DVD; and a network connection 3505 configured to connect the computer system to other computer systems to send and/or receive data, such as via the Internet, a local area network, a wide area network, a point-to-point dial-up connection, a cell phone network, or another network and its networking hardware in various examples, including routers, switches, and various types of transmitters, receivers, or computer-readable transmission media. While computer systems configured as described above may be used to support the operation of the facility, those skilled in the relevant art will readily appreciate that the facility may be implemented using devices of various types and configurations, and having various components. Elements of the facility may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Application Protocol ("WAP").

The foregoing discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer.

Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave, a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular numbers respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference, including U.S. patent application Ser. No. 14/136,322, filed Dec. 20, 2013. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. In some cases, various steps in the algorithms discussed herein may be added, altered, or removed without departing from the disclosed subject matter. Those skilled in the relevant art will appreciate that features described above may be altered in a variety of ways. For example, the order of the logic may be rearranged, sublogic may be performed in parallel, illustrated logic may be omitted, other logic may be included, etc.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A computer-implemented method of identifying information of interest within an organization comprising:
   determining use data that characterizes relationships among information items in the organization with respect to users within the organization, the organization including a structured body of users with associated roles within the organization and with access to at least a subset of the information items within the organization;
   generating interest graph data structures indicating affinity among the information items based on the determined use data;
   wherein each interest graph data structure expresses;
      for each of a plurality of pairs of information items, an affinity between a first information item and a second information item in the pair, and
      an affinity between at least one user and one information item that is computed based in part on the affinities between the pairs of information items, and
      wherein the affinity between the at least one user and one information item represents a degree to which the one information item is of interest to the at least one user;
   receiving a request for a feed or set of information items from a particular user; and
   responding to the request by providing one or more items selected from the information items in the organization based on the generated interest graph data structure.

2. The computer-implemented method of claim 1, wherein the organization is a business enterprise or a legal entity.

3. The computer-implemented method of claim 1,
   wherein a relationship between a first user and a respective information item corresponds to an activity performed by the first user on the respective information item,
   wherein the activity is querying, browsing, opening, viewing, editing, critiquing, bookmarking, liking, sharing, downloading, collecting, or curating the information item,
   wherein determining the use data includes tracking the activity, and
   wherein tracking the activity is performed using web browser software without downloading additional software or documents.

4. The computer-implemented method of claim 1, wherein a relationship between two users corresponds to:
   an organizational relationship between the two users with respect to the roles of the two users with the organization,
   an activity performed by the two users together within the organization,
   a pair of relationships respectively between the two users and a respective information item, or
   any combination thereof.

5. The computer-implemented method of claim 1, wherein responding to the request comprises:
   combining multiple, similar results into one result;
   ordering multiple results by:
      a recency of an information item,
      a popularity of an information item,
      a popularity of a collection of information items,
      an authority of the particular user,
      the interest data, or
      any combination thereof; and
   presenting the multiple results based on the ordering,
      wherein the request is generated automatically, and
      wherein responding to the request comprises generating a message to be sent by email or other messaging system.

6. The computer-implemented method of claim 5, further comprising:
   generating automated requests for feeds based on:
      a user-specified frequency,
      a number of items provided based on the generated interest data,
      popularity of relevant information items,
      popularity of users who own or performed activities on the provided information items, or
      any combination thereof.

7. The computer-implemented method of claim 5, further comprising:
   determining the recency of a respective information item based on a number of activities performed on the respective information item in the last hour, day, week, or other time period.

8. The computer-implemented method of claim 5, further comprising:
   determining the popularity of a respective information item based on:
      a number of activities performed on the respective information item,
      an authority of users who performed activities on the respective information item,
      a popularity of collections of information items to which the respective information item belongs, or
      any combination thereof.

9. The computer-implemented method of claim 5, further comprising:
   determining the authority of the particular user based on a number of activities performed on information items created by the particular user.

10. The computer-implemented method of claim 5, further comprising:
    determining the popularity of a first collection of information items based on a number of activities performed on the information items in the first collection of information items.

11. The computer-implemented method of claim 1, further comprising:
    determining an affinity between a first user and a second user based on:
       a relationship between the first user and the second user,
       an interest indicated by the first user with respect to the second user,
       an affinity between the first user and a second user and a relationship between the second user and the first information item,
       an affinity between the first user and a collection to which the first information item belongs, or
       any combination thereof.

12. The computer-implemented method of claim 1, further comprising:

determining an affinity between a user and a collection of information items based on a relationship between the user and the collection.

13. The computer-implemented method of claim 1, further comprising determining additional use data characterizing relationships among users and information items across the organization and at least one other, independent organization.

14. A system to identify information of interest within an organization, the system comprising:
- at least one hardware processor;
- at least one memory having contents configured to, when executed by the at least one processor, perform a method comprising:
  - determining use data that characterizes relationships among information items in the organization with respect to users within the organization, the organization including a structured body of users with associated roles within the organization and with access to at least a subset of the information items within the organization;
  - generating interest graph data structures indicating affinity among the information items based on the determined use data;
    - wherein each interest graph data structure expresses;
      - for each of a plurality of pairs of information items, an affinity between a first information item and a second information item in the pair, and
      - an affinity between at least one user and one information item that is computed based in part on the affinities between the pairs of information items, and
    - wherein the affinity between the at least one user and one information item represents a degree to which the one information item is of interest to the at least one user;
  - receiving a request for a feed or set of information items from a particular user; and
  - responding to the request by providing one or more items selected from the information items in the organization based on the generated interest graph data structure.

15. The system of claim 14, wherein the organization is a business enterprise or a legal entity.

16. The system of claim 14,
- wherein a relationship between a first user and a respective information item corresponds to an activity performed by the first user on the respective information item,
- wherein the activity is querying, browsing, opening, viewing, editing, critiquing, bookmarking, liking, sharing, downloading, collecting, or curating the information item,
- wherein determining the use data includes tracking the activity, and
- wherein tracking the activity is performed using web browser software without downloading additional software or documents.

17. The system of claim 14, wherein responding to the request comprises:
- combining multiple, similar results into one result;
- ordering multiple results by:
  - a recency of an information item,
  - a popularity of an information item,
  - a popularity of a collection of information items,
  - an authority of the particular user,
  - the interest data, or
  - any combination thereof; and
- presenting the multiple results based on the ordering,
  - wherein the request is generated automatically, and
  - wherein responding to the request comprises generating a message to be sent by email or other messaging system.

18. The system of claim 17, wherein the method performed by the processor further comprises:
- determining the recency of a respective information item based on a number of activities performed on the respective information item in the last hour, day, week, or other time period.

19. The system of claim 17, wherein the method performed by the processor further comprises:
- determining the popularity of a respective information item based on:
  - a number of activities performed on the respective information item,
  - an authority of users who performed activities on the respective information item,
  - a popularity of collections of information items to which the respective information item belongs, or
  - any combination thereof.

20. A computer-readable storage medium excluding transitory signals and carrying instructions that, when executed, are capable of causing a computing system to perform a method comprising:
- determining use data that characterizes relationships among information items in an organization with respect to users within the organization, the organization including a structured body of users with associated roles within the organization and with access to at least a subset of the information items within the organization;
- generating interest graph data structures indicating affinity among the information items based on the determined use data;
  - wherein each interest graph data structure expresses;
    - for each of a plurality of pairs of information items, an affinity between a first information item and a second information item in the pair, and
    - an affinity between at least one user and one information item that is computed based in part on the affinities between the pairs of information items, and
  - wherein the affinity between the at least one user and one information item represents a degree to which the one information item is of interest to the at least one user;
- receiving a request for a feed or set of information items from a particular user; and
- responding to the request by providing one or more items selected from the information items in the organization based on the generated interest graph data structure.

* * * * *